(12) United States Patent
Hirano

(10) Patent No.: US 8,045,979 B2
(45) Date of Patent: Oct. 25, 2011

(54) INFORMATION COMMUNICATION TERMINAL, MOBILE TELEPHONE, CONTENTS DISTRIBUTING APPARATUS, CONTENTS DISTRIBUTING SYSTEM, AND PROGRAM PRODUCT

(75) Inventor: Toshie Hirano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 798 days.

(21) Appl. No.: 12/086,690

(22) PCT Filed: Dec. 7, 2006

(86) PCT No.: PCT/JP2006/324421
§ 371 (c)(1),
(2), (4) Date: Jun. 18, 2008

(87) PCT Pub. No.: WO2007/072687
PCT Pub. Date: Jun. 28, 2007

(65) Prior Publication Data
US 2009/0163135 A1 Jun. 25, 2009

(30) Foreign Application Priority Data

Dec. 20, 2005 (JP) ................................. 2005-366489

(51) Int. Cl.
*H04W 4/00* (2009.01)
(52) U.S. Cl. ............... 455/432.3; 455/456.3; 455/414.3; 709/203; 709/217; 709/219; 709/226
(58) Field of Classification Search ............... 455/456.2, 455/456.3, 408, 410, 411, 414.1, 414.3, 422.13, 455/432.3; 709/203, 217, 219, 226; 370/235
See application file for complete search history.

(56) References Cited

U.S. PATENT DOCUMENTS

| | | | | |
|---|---|---|---|---|
| 6,871,065 B2 * | 3/2005 | Yamaguchi | ................ | 455/414.1 |
| 6,909,897 B2 * | 6/2005 | Kikuchi | ........................ | 455/433 |
| 7,024,697 B2 * | 4/2006 | Nitaki | .............................. | 726/26 |
| 7,609,402 B2 * | 10/2009 | Chang et al. | ................. | 358/1.15 |
| 2002/0022453 A1 * | 2/2002 | Balog et al. | ...................... | 455/41 |

FOREIGN PATENT DOCUMENTS

| | | |
|---|---|---|
| JP | 4-42647 A | 2/1992 |
| JP | 7-154452 A | 6/1995 |
| JP | 8-317040 A | 11/1996 |
| JP | 9-51374 A | 2/1997 |
| JP | 9-261322 S | 10/1997 |
| JP | 10-178465 A | 6/1998 |

(Continued)

*Primary Examiner* — Dominic E Rego
(74) *Attorney, Agent, or Firm* — Birch, Stewart, Kolasch & Birch, LLP

(57) ABSTRACT

Provided is a mobile telephone easily associating ringing tones and an address book. A control unit implementing the mobile telephone includes an input unit accepting input of data, an instruction detecting unit detecting an instruction for executing an action specific to the mobile telephone based on the input data, a flag setting unit setting for each address a flag for discriminating an address to be assigned a ringing tone from an address not to be assigned the ringing tone, a ringing tone retrieving unit retrieving the ringing tones assignable to the address book, a registrant-by-registrant basis ringing tone assigning unit executing an operation for assigning the ringing tone to each address book based on an entered instruction and the result of the retrieval by the ringing tone retrieving unit, and an output unit writing the flag set by the flag setting unit in a storage unit.

20 Claims, 47 Drawing Sheets

FOREIGN PATENT DOCUMENTS

| | | |
|---|---|---|
| JP | 11-331368 | 11/1999 |
| JP | 2000-115292 A | 4/2000 |
| JP | 2001-168952 A | 6/2001 |
| JP | 2002-57759 A | 2/2002 |
| JP | 2002-261875 A | 9/2002 |
| JP | 2003-259010 A | 9/2003 |
| JP | 2005-94081 A | 4/2005 |
| JP | 2005-142631 A | 6/2005 |
| JP | 2005-191912 A | 7/2005 |
| KR | 1020010028301 A | 4/2001 |
| KR | 1020020061800 A | 7/2002 |
| KR | 1020050050342 A | 5/2005 |
| TW | 200522671 A | 7/2005 |

* cited by examiner

| NO. 1110 | RINGING TONE NAME 1112 | FILE NAME 1114 | ARTIST NAME 1116 | FLAG 1118 |
|---|---|---|---|---|
| 001 | MELODY 1 | melody001.audio | AAA | NULL |
| 002 | MELODY 2 | melody002.audio | BBB | NULL |
| 003 | MELODY 3 | melody003.audio | CCC | NULL |
| 004 | MELODY 4 | melody004.audio | DDD | NULL |
| 005 | MELODY 5 | melody005.audio | EEE | NULL |
| ... | ... | ... | ... | ... |

| NO. 1120 | NAME 1122 | 1ST TELEPHONE NO. 1124 | 2ND TELEPHONE NO. 1126 | E-MAIL ADDRESS 1128 |
|---|---|---|---|---|
| 001 | MAI | 090-**- | 074353  | mai@***** |
| 002 | HARADA | ... | | |
| 003 | MNGR. TANAKA | | | |
| 004 | MAKI | ... | | |
| 005 | TETSUJI | ... | | |
| ... | ... | | | |

FIG.16

| 1610 | 1612 | 1614 | 1616 | 1618 |
|---|---|---|---|---|
| NO. | RINGING TONE NAME | FILE NAME | ARTIST NAME | FLAG |
| 001 | MELODY 1 | melody001.audio | AAA | NULL |
| 002 | MELODY 2 | melody002.audio | BBB | NULL |
| 003 | MELODY 3 | melody003.audio | CCC | NULL |
| ... | ... | ... | ... | ... |
| 010 | MELODY 10 | melody010.audio | EEE | NULL |
| ... | ... | ... | ... | ... |

| 1620 | 1622 | 1624 | 1626 | 1628 |
|---|---|---|---|---|
| NO. | NAME | TELEPHONE NUMBER | GROUP NAME | FLAG |
| 001 | TANAKA | 090-**-** | NULL | NULL |
| 002 | YAMAOKA | ... | NULL | NULL |
| 003 | FATHER | ... | FAMILY | NULL |
| 004 | MOTHER | ... | FAMILY | NULL |
| 005 | SISTER | ... | FAMILY | NULL |
| 006 | BROTHER | ... | FAMILY | NULL |
| 007 | YUMI | ... | SCHOOL | NULL |
| 008 | NAO | ... | SCHOOL | NULL |
| 009 | EMI | ... | SCHOOL | NULL |
| 010 | MARI | ... | SCHOOL | NULL |
| 011 | KENJI | ... | SCHOOL | NULL |
| 012 | SHOHEI | ... | SCHOOL | NULL |
| 013 | OTSUKA | ... | PART-TIME JOB | NULL |
| 014 | TAKASIMA | ... | PART-TIME JOB | NULL |
| 015 | CHIEF | ... | PART-TIME JOB | NULL |
| 016 | JUNPEI | ... | LOCAL | NULL |
| 017 | HIROKO | ... | LOCAL | NULL |
| 018 | MASAYUKI | ... | LOCAL | NULL |
| 019 | MAKI | ... | LOCAL | NULL |
| 020 | RINA | ... | LOCAL | NULL |
| 021 | ENGLISH CONVERSATION | ... | SHOP | NULL |
| 022 | CAFE | ... | SHOP | NULL |
| 023 | SCHOOL | ... | SHOP | NULL |
| 024 | PART-TIME JOB | ... | SHOP | NULL |
| 025 | BEAUTY SHOP | ... | SHOP | NULL |
| ... | ... | ... | ... | NULL |

FLASH MEMORY

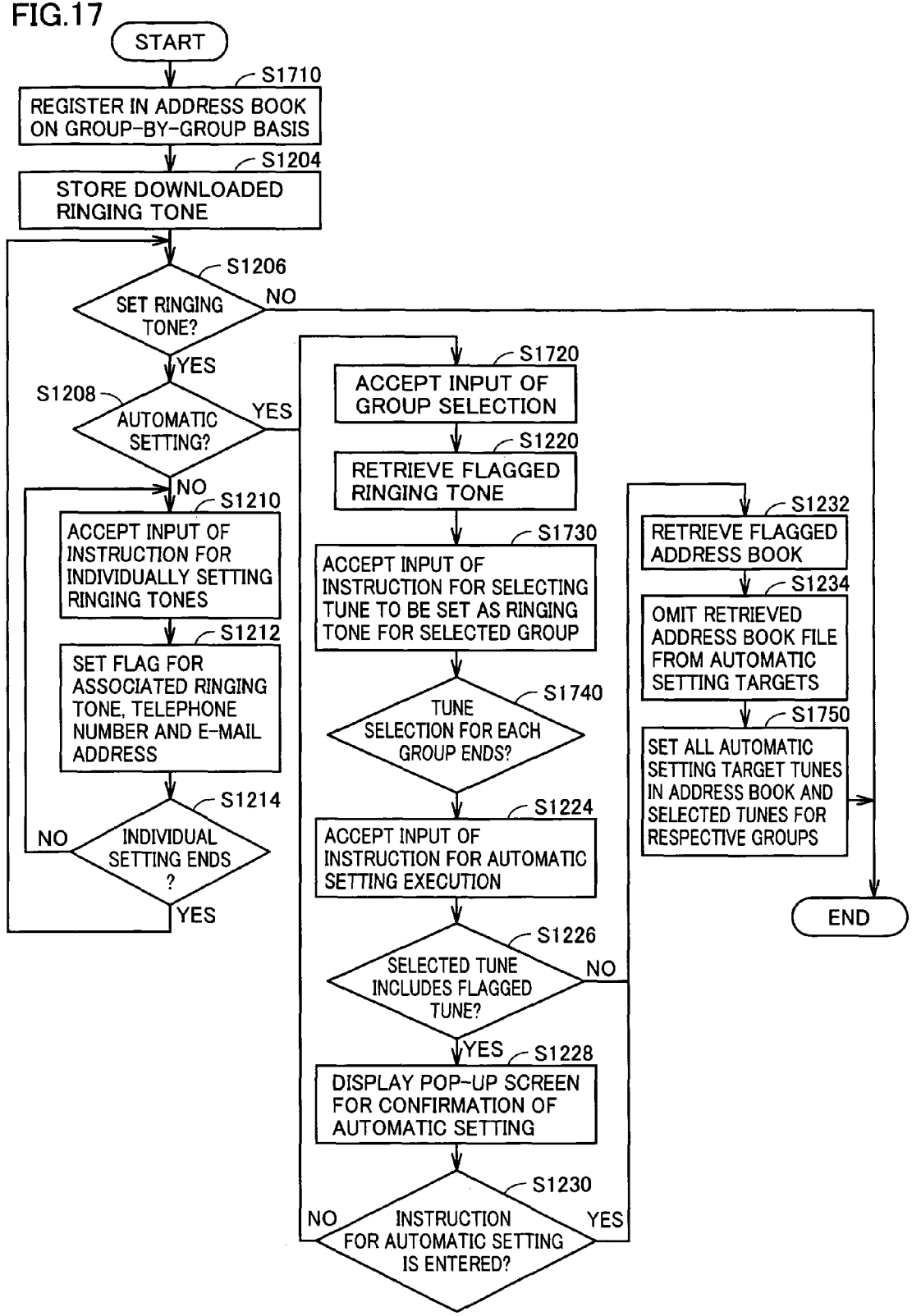

FIG.18

| GROUP NAME | UNSPECIFIED | FAMILY | SCHOOL | PART-TIME JOB | LOCAL | SHOP |
|---|---|---|---|---|---|---|
| REGISTRANT | TANAKA YAMAOKA | FATHER MOTHER SISTER BROTHER | YUMI NAO EMI MARI KENJI SHOHEI | OTSUKA TAKASIMA CHIEF | JUNPEI HIROKO MASAYUKI MAKI RINA | ENGLISH CONVERSATION CAFE SCHOOL PART-TIME JOB BEAUTY SHOP |

| INDEX KEY | RINGING TONE | MANUAL SET TARGET | FLAG B |
|---|---|---|---|
| 1 | MELODY 1 | MOTHER | O |
| 2 | MELODY 2 | | |
| 3 | MELODY 3 | | |
| 4 | MELODY 4 | JUNPEI | O |
| 5 | MELODY 5 | PART-TIME JOB | O |
| 6 | MELODY 6 | | |
| 7 | MELODY 7 | | |
| 8 | MELODY 8 | | |
| 9 | MELODY 9 | | |
| 10 | MELODY 10 | | |

FLASH MEMORY

FIG.21

| GROUP NAME | NAME | SET RINGING TONE |
|---|---|---|
| UNSPECIFIED | TANAKA | MELODY 10 |
| | YAMAOKA | MELODY 9 |
| FAMILY | FATHER | MELODY 8 |
| | MOTHER | MELODY 1 |
| | SISTER | MELODY 9 |
| | BROTHER | MELODY 8 |
| SCHOOL | YUMI | MELODY 7 |
| | NAO | MELODY 7 |
| | EMI | MELODY 6 |
| | MARI | MELODY 7 |
| | KENJI | MELODY 6 |
| | SHOHEI | MELODY 6 |
| PART-TIME JOB | OTSUKA | MELODY 5 |
| | TAKASIMA | MELODY 3 |
| | CHIEF | MELODY 5 |
| LOCAL | JUNPEI | MELODY 4 |
| | HIROKO | MELODY 2 |
| | MASAYUKI | MELODY 1 |
| | MAKI | MELODY 1 |
| | RINA | MELODY 2 |
| SHOP | ENGLISH CONVERSATION | MELODY 1 |
| | CAFE | MELODY 1 |
| | SCHOOL | MELODY 1 |
| | PART-TIME JOB | MELODY 5 |
| | BEAUTY SHOP | MELODY 1 |

RAM

FIG.22

| GROUP NAME | UNSPECIFIED | FAMILY | SCHOOL | PART-TIME JOB | LOCAL | SHOP |
|---|---|---|---|---|---|---|
| RINGING TONES SELECTED FOR AUTOMATIC SETTING | MELODY 9<br>MELODY 10 | MELODY 8<br>MELODY 9 | MELODY 6<br>MELODY 7 | MELODY 5<br>MELODY 3 | MELODY 2<br>MELODY 1 | MELODY 1 |
| REGISTRANTS NOT BEARING AUTOMATIC SETTING FLAG A | TANAKA<br>YAMAOKA | FATHER<br>SISTER<br>BROTHER | YUMI<br>NAO<br>EMI<br>MARI<br>KENJI<br>SHOHEI | OTSUKA<br>TAKASIMA<br>CHIEF | HIROKO<br>MASAYUKI<br>MAKI<br>RINA | ENGLISH CONVERSATION<br>CAFE<br>SCHOOL<br>BEAUTY SHOP |

2210, 2220, 2230, 2240, 2250, 2260

950 RAM

FIG.24

| 2410 | 2420 | 2430 | 2440 | 2450 | 2460 |
|---|---|---|---|---|---|
| NO. | RINGING TONE NAME | FILE NAME | ARTIST NAME | RELATION | OTHER TAG INFORMATION |
| 001 | MELODY 1 | melody001.audio | AAA | OTHER | ... |
| 002 | MELODY 2 | melody002.audio | BBB | FAMILY | ... |
| 003 | MELODY 3 | melody003.audio | CCC | FAMILY | ... |
| 004 | MELODY 4 | melody003.audio | CCC | WOMAN FRIEND | ... |
| ... | MELODY 5 | ... | ... | WOMAN FRIEND | ... |
| ... | MELODY 6 | ... | ... | WOMAN FRIEND | ... |
| ... | MELODY 7 | ... | ... | MAN FRIEND | ... |
| ... | MELODY 8 | ... | ... | MAN FRIEND | ... |
| ... | MELODY 9 | ... | ... | ELDER | ... |
| ... | MELODY 10 | ... | ... | ELDER | ... |
| ... | MELODY 11 | ... | ... | SHOP | ... |
| ... | MELODY 12 | ... | ... | SHOP | ... |
| ... | MELODY 13 | ... | ... | SHOP | ... |
| ... | MELODY 14 | ... | ... | YOUNGER | ... |
| ... | ... | ... | ... | ... | ... |

HARD DISK

FIG.25

| 2510 | 2520 | 2530 | 2540 | 2550 |
|---|---|---|---|---|
| NO. | NAME | TELEPHONE NUMBER | RELATION | RINGING TONE NAME |
| 001 | TANAKA | 090-**-** | OTHER | NULL |
| 002 | YAMAOKA | ... | OTHER | NULL |
| 003 | FATHER | ... | FAMILY | NULL |
| 004 | MOTHER | ... | FAMILY | NULL |
| 005 | SISTER | ... | FAMILY | NULL |
| 006 | BROTHER | ... | FAMILY | NULL |
| 007 | YUMI | ... | WOMAN FRIEND | NULL |
| 008 | NAO | ... | WOMAN FRIEND | NULL |
| 009 | EMI | ... | WOMAN FRIEND | NULL |
| 010 | MARI | ... | WOMAN FRIEND | NULL |
| 011 | HIROKO | ... | WOMAN FRIEND | NULL |
| 012 | MAKI | ... | WOMAN FRIEND | NULL |
| 013 | RINA | ... | WOMAN FRIEND | NULL |
| 014 | KENJI | ... | MAN FRIEND | NULL |
| 015 | SHOHEI | ... | MAN FRIEND | NULL |
| 016 | JUNPEI | ... | MAN FRIEND | NULL |
| 017 | OTSUKA | ... | ELDER | NULL |
| 018 | CHIEF | ... | ELDER | NULL |
| 019 | TAKASIMA | ... | YOUNGER | NULL |
| 020 | MASAYUKI | ... | YOUNGER | NULL |
| 021 | ENGLISH CONVERSATION | ... | SHOP | NULL |
| 022 | CAFE | ... | SHOP | NULL |
| 023 | SCHOOL | ... | SHOP | NULL |
| 024 | PART-TIME JOB | ... | SHOP | NULL |
| 025 | BEAUTY SHOP | ... | SHOP | NULL |
| ... | ... | ... | ... | NULL |

940

FLASH MEMORY

FIG.26

| NO. | TUNE TITLE | RELATION | ASSIGNMENT FLAG |
|---|---|---|---|
| 001 | MELODY 1 | OTHER | NULL |
| 002 | MELODY 2 | FAMILY | NULL |
| 003 | MELODY 3 | FAMILY | NULL |
| 004 | MELODY 4 | WOMAN FRIEND | NULL |
| 005 | MELODY 5 | WOMAN FRIEND | NULL |
| 006 | MELODY 6 | WOMAN FRIEND | NULL |
| 007 | MELODY 7 | MAN FRIEND | NULL |
| 008 | MELODY 8 | MAN FRIEND | NULL |
| 009 | MELODY 9 | ELDER | NULL |
| 010 | MELODY 10 | ELDER | NULL |
| 011 | MELODY 11 | SHOP | NULL |
| 012 | MELODY 12 | SHOP | NULL |
| 013 | MELODY 13 | SHOP | NULL |
| ... | ... | ... | ... |

FIG.29

| | | | | 940 |
|---|---|---|---|---|
| 2910 | 2920 | 2930 | 2940 | 2950 |

| NO. | NAME | TELEPHONE NUMBER | RELATION | RINGING TONE NAME |
|---|---|---|---|---|
| 001 | TANAKA | 090-**-** | OTHER | NULL |
| 002 | YAMAOKA | ... | OTHER | NULL |
| 003 | FATHER | ... | FAMILY | NULL |
| 004 | MOTHER | ... | FAMILY | MELODY 2 |
| 005 | SISTER | ... | FAMILY | NULL |
| 006 | BROTHER | ... | FAMILY | NULL |
| 007 | YUMI | ... | WOMAN FRIEND | NULL |
| 008 | NAO | ... | WOMAN FRIEND | NULL |
| 009 | EMI | ... | WOMAN FRIEND | NULL |
| 010 | MARI | ... | WOMAN FRIEND | NULL |
| 011 | HIROKO | ... | WOMAN FRIEND | NULL |
| 012 | MAKI | ... | WOMAN FRIEND | MELODY 4 |
| 013 | RINA | ... | WOMAN FRIEND | NULL |
| 014 | KENJI | ... | MAN FRIEND | NULL |
| 015 | SHOHEI | ... | MAN FRIEND | NULL |
| 016 | JUNPEI | ... | MAN FRIEND | MELODY 7 |
| 017 | OTSUKA | ... | ELDER | NULL |
| 018 | CHIEF | ... | ELDER | NULL |
| 019 | TAKASIMA | ... | YOUNGER | NULL |
| 020 | MASAYUKI | ... | YOUNGER | NULL |
| 021 | ENGLISH CONVERSATION | ... | SHOP | NULL |
| 022 | CAFE | ... | SHOP | NULL |
| 023 | SCHOOL | ... | SHOP | NULL |
| 024 | PART-TIME JOB | ... | SHOP | MELODY 13 |
| 025 | BEAUTY SHOP | ... | SHOP | NULL |
| ... | ... | ... | ... | ... |

| 3010 | 3020 |
|---|---|
| NAME | RELATION |
| TANAKA | OTHER |
| YAMAOKA | OTHER |
| FATHER | FAMILY |
| SISTER | FAMILY |
| BROTHER | FAMILY |
| YUMI | WOMAN FRIEND |
| NAO | WOMAN FRIEND |
| EMI | WOMAN FRIEND |
| MARI | WOMAN FRIEND |
| HIROKO | WOMAN FRIEND |
| RINA | WOMAN FRIEND |
| KENJI | MAN FRIEND |
| SHOHEI | MAN FRIEND |
| OTSUKA | ELDER |
| CHIEF | ELDER |
| TAKASIMA | YOUNGER |
| MASAYUKI | YOUNGER |
| ENGLISH CONVERSATION | SHOP |
| CAFE | SHOP |
| SCHOOL | SHOP |
| BEAUTY SHOP | SHOP |
| ... | ... |

| 3030 | 3040 |
|---|---|
| TUNE TITLE | RELATION |
| MELODY 1 | OTHER |
| MELODY 3 | FAMILY |
| MELODY 5 | WOMAN FRIEND |
| MELODY 6 | WOMAN FRIEND |
| MELODY 8 | MAN FRIEND |
| MELODY 9 | ELDER |
| MELODY 10 | ELDER |
| MELODY 11 | SHOP |
| MELODY 12 | SHOP |

FIG.31

| | | | | ⌐940 |
|---|---|---|---|---|
| 2910 | 2920 | 2930 | 2940 | 2950 |

| NO. | NAME | TELEPHONE NUMBER | RELATION | RINGING TONE NAME |
|---|---|---|---|---|
| 001 | TANAKA | 090-**-** | OTHER | MELODY 1 |
| 002 | YAMAOKA | ... | OTHER | MELODY 1 |
| 003 | FATHER | ... | FAMILY | MELODY 3 |
| 004 | MOTHER | ... | FAMILY | MELODY 2 |
| 005 | SISTER | ... | FAMILY | MELODY 3 |
| 006 | BROTHER | ... | FAMILY | MELODY 3 |
| 007 | YUMI | ... | WOMAN FRIEND | MELODY 5 |
| 008 | NAO | ... | WOMAN FRIEND | MELODY 5 |
| 009 | EMI | ... | WOMAN FRIEND | MELODY 5 |
| 010 | MARI | ... | WOMAN FRIEND | MELODY 6 |
| 011 | HIROKO | ... | WOMAN FRIEND | MELODY 5 |
| 012 | MAKI | ... | WOMAN FRIEND | MELODY 6 |
| 013 | RINA | ... | WOMAN FRIEND | MELODY 4 |
| 014 | KENJI | ... | MAN FRIEND | MELODY 8 |
| 015 | SHOHEI | ... | MAN FRIEND | MELODY 8 |
| 016 | JUNPEI | ... | MAN FRIEND | MELODY 7 |
| 017 | OTSUKA | ... | ELDER | MELODY 10 |
| 018 | CHIEF | ... | ELDER | MELODY 9 |
| 019 | TAKASIMA | ... | YOUNGER | MELODY 3 |
| 020 | MASAYUKI | ... | YOUNGER | MELODY 10 |
| 021 | ENGLISH CONVERSATION | ... | SHOP | MELODY 12 |
| 022 | CAFE | ... | SHOP | MELODY 11 |
| 023 | SCHOOL | ... | SHOP | MELODY 12 |
| 024 | PART-TIME JOB | ... | SHOP | MELODY 13 |
| 025 | BEAUTY SHOP | ... | SHOP | MELODY 11 |
| ... | ... | ... | ... | ... |

FIG.32

| RELATION | OTHER | FAMILY | WOMAN FRIEND | MAN FRIEND | ELDER | YOUNGER | SHOP |
|---|---|---|---|---|---|---|---|
| 3210 — RINGING TONES EXHIBITING ADDITIONAL INFORMATION MATCHING | MELODY 1 | MELODY 3 | MELODY 5 MELODY 6 | MELODY 8 | MELODY 9 MELODY 10 | | MELODY 11 MELODY 12 |
| 3220 — REGISTRANTS EXHIBITING THE SAME RELATIONS AND NOT BEARING FLAG A | TANAKA YAMAOKA | FATHER SISTER BROTHER | YUMI NAO EMI MARI HIROKO RINA | KENJI SHOHEI | OTSUKA CHIEF | TAKASIMA MASAYUKI | ENGLISH CONVERSATION CAFE SCHOOL BEAUTY SHOP |
| 3230 | | | | | | | |

FIG.34

| 3410 | 3412 | 3414 | 3416 | 3418 |
|---|---|---|---|---|
| NO. | NAME | TELEPHONE NUMBER | NUMBER OF OUTGOING CALLS | NUMBER OF INCOMING CALLS |
| 001 | A | 090-**-** | 10 | 100 |
| 002 | B | ... | 20 | 200 |
| 003 | C | ... | 30 | 300 |
| 004 | D | ... | 40 | 400 |
| 005 | E | ... | 50 | 500 |
| ... | ... | ... | ... | ... |

| 3420 | 3422 | 3424 | 3426 | 3428 |
|---|---|---|---|---|
| NO. | RINGING TONE NAME | FILE NAME | ARTIST NAME | DATE & TIME OF DOWNLOAD |
| 001 | MELODY 1 | melody001.audio | AAA | 10/01/2005 |
| 002 | MELODY 2 | melody002.audio | BBB | 09/01/2005 |
| 003 | MELODY 3 | melody003.audio | CCC | 08/01/2005 |
| ... | ... | ... | ... | ... |

FLASH MEMORY

| 3710 | NO. | RINGING TONE NAME 3712 | FILE NAME 3714 | ARTIST NAME 3716 | FLAG 3718 |
|---|---|---|---|---|---|
| | 001 | MELODY 1 | melody001.audio | AAA | NULL |
| | 002 | MELODY 2 | melody002.audio | BBB | NULL |
| | 003 | MELODY 3 | melody003.audio | CCC | NULL |
| | 004 | MELODY 4 | melody004.audio | DDD | NULL |
| | 005 | MELODY 5 | melody005.audio | EEE | NULL |
| | ... | ... | ... | ... | ... |

| 3720 | NO. | NAME 3722 | 1ST TELEPHONE NO. 3724 | 2ND TELEPHONE NO. 3726 | E-MAIL ADDRESS 3728 | ARTIST NAME 3730 | RINGING TONE NAME 3732 |
|---|---|---|---|---|---|---|---|
| | 001 | MAI | 090-**_ | 074353 | mai@**** | AAA | |
| | 002 | HARADA | | | ... | CCC | |
| | 003 | MNGR. TANAKA | | | ... | EEE | |
| | 004 | MAKI | | | ... | XXX | |
| | 005 | TETSUJI | | | ... | YYY | |
| | ... | ... | ... | ... | ... | ... | |

US 8,045,979 B2

INFORMATION COMMUNICATION TERMINAL, MOBILE TELEPHONE, CONTENTS DISTRIBUTING APPARATUS, CONTENTS DISTRIBUTING SYSTEM, AND PROGRAM PRODUCT

TECHNICAL FIELD

The invention relates to associating of a party on the other end of communications via mobile communication terminals with sound data, and particularly to a technology of reducing a load of the on the mobile communication terminal due to such associating.

BACKGROUND ART

In the mobile telephones and other portable communication terminals, sound data that can be stored has been increasing owing to increase in memory capacity or a data compression technology. The mobile telephone has a function by which a user of the mobile telephone receiving an incoming call for telephone or e-mail can easily determine that it is made by a specific caller. Thereby, the user can discriminate the A specific callers such as a family, friends and the like from unspecified callers.

Technologies for identifying a party on the other end have been disclosed, e.g., in Japanese Patent Laying-Open Nos. 2001-168952, 2002-261875 and 2005-094081 (publications 1, 2 and 3).

Technologies relating to download of sound data have been disclosed, e.g., in Japanese Patent Laying-Open No. 2003-259010 (publication 4). Further, technologies for reproducing sound based on downloaded sound data have been disclosed, e.g., in Japanese Patent Laying-Open No. 2005-191912 (publication 5).

Publication 1: Japanese Patent Laying-Open No. 2001-168952
Publication 2: Japanese Patent Laying-Open No. 2002-261875
Publication 3: Japanese Patent Laying-Open No. 2005-094081
Publication 4: Japanese Patent Laying-Open No. 2003-259010
Publication 5: Japanese Patent Laying-Open No. 2005-191912

DISCLOSURE OF THE INVENTION

Problems to be Solved by the Invention

The association of registrants constituting an address book with sound data is implemented by an operation of a user of the mobile telephone or another terminal. When the number of sound data items is large, i.e., when the number of tunes that can be set as a ringing tone increases, this results in a problem that a complicated operation is required for them. Further, when many tunes are present, downloaded tunes may be not used.

The invention has been made for overcoming the above problem, and an object of the invention is to provide an information communication terminal that can easily associate tunes with registrants constituting an address book.

Another object is to provide an information communication terminal allowing deletion of tunes that will not be used for notification of an incoming call.

Still another object is provide a program product for causing an information communication terminal to function as a terminal that can easily associate tunes with registrants constituting an address book.

Yet another object is to provide a content distributing device capable of distributing tunes that can be easily associated with registrants constituting an address book of an information communication terminal.

Further another object is to provide a program product for causing a computer to operate as a content distributing device capable of distributing tunes that can be easily associated with registrants constituting an address book of an information communication terminal.

Means for Solving the Problems

For achieving the above object, an information communication terminal according to an aspect of the invention includes a communication unit (902) capable of communications with at least a plurality of communication other-end parties; a content data storing unit storing multiple kinds of contents data; a storing unit storing identification data for identifying the plurality of communication other-end parties and assignment data for assigning the contents data to the communication other-end party; and an assigning unit assigning the contents data to the communication other-end party based on the assignment data.

Preferably, a type of the contents data includes one of sound, music and image.

Preferably, the identification data includes an address book of the communication other-end party.

Preferably, the address book includes one of a name of the communication other-end party, information for representing whether the name is a private person, a company or a group, a telephone number of the communication other-end party, data for specifying a position of the communication other-end party, an e-mail address of the communication other-end party, a name of a group containing the address book, information for specifying a communication device used by the communication other-end party and attribute information of the communication other-end party.

Preferably, the attribute information includes one of an age of the communication other-end party, sex or taste, and a relation between the communication other-end party and a user of the information communication terminal.

Preferably, the relation is associated with each of the contents data and the communication other-end party. The assigning unit assigns the contents data to the communication other-end party based on the relation.

Preferably, a genre for classifying items is associated with the contents data and the communication other-end party. The assigning unit assigns the contents data to communication other-end party based on the genre.

Preferably, the information communication terminal further includes a history storing unit storing a history of communications between the communication other-end party and the information communication terminal. The assigning unit assigns the contents data to the communication other-end party based on the history.

Preferably, the contents data includes one of sound and music. The assignment data includes performer or producer identification data for identifying a performer or a producer of the sound or the music. The identification data is associated with the identification data of the performer or the producer. The assigning unit assigns the contents data to the communication other-end party based on the performer or producer identification data.

Preferably, the contents data includes an image. The assignment data includes a performer or producer identification data for identifying a performer or a producer of the image. The identification data is associated with the performer or producer identification data. The assigning unit assigns the contents data to the communication other-end party based on the performer or producer identification data.

Preferably, the assignment data includes one of a flag representing a state of use of the contents data, and association data representing association between the contents data and the communication other-end party to which the contents data is assigned.

Preferably, the assigning unit sets, in the assigned contents data, a flag representing the fact that the contents data is already assigned to the communication other-end party.

Preferably, the information communication terminal further includes an input unit accepting an operation for associating the contents data with the communication other-end party. The assigning unit includes a producing unit producing, based on the operation, data representing the fact that the contents data is associated with the communication other-end party, and an associating unit associating the data produced by the producing unit with the contents data.

Preferably, the assigning unit automatically associates the identification data with the contents data.

Preferably, the information communication terminal further includes a random number generating unit for generating random number data. The assigning unit associates the identification data with the contents data based on the random number data.

Preferably, the assigning unit associates the contents data with the communication other-end party according to an arrangement defined based on each of the plurality of identification data items and an arrangement defined based on each of the plurality of contents data items.

Preferably, the information communication terminal further includes a detecting unit detecting update of the data on the information communication terminal. The assigning unit associates the contents data with the communication other-end party when the update is detected.

Preferably, the detecting unit detects the update of the contents data in the contents data storing unit. The assigning unit assigns the updated contents data to the communication other-end party.

Preferably, the detecting unit detects the update of the identification data. The assigning unit assigns the contents data to the communication other-end party based on the updated identification data.

Preferably, the information communication terminal further includes a detecting unit detecting elapsing of a predetermined period. The assigning unit assigns the contents data to the communication other-end party after elapsing of the period.

Preferably, the information communication terminal further includes a detecting unit detecting an incoming call. The assigning unit assigns the contents data to the communication other-end party in response to the detection of the incoming call.

Preferably, the information communication terminal further includes an output unit performing an output operation based on the contents data.

Preferably, the contents data includes sound data. The output unit includes a speaker outputting a sound or music based on the sound data.

Preferably, the contents data includes image data. The output unit includes a display unit displaying an image based on the image data.

Preferably, the contents data includes control data for controlling vibration of the information communication terminal. The output unit includes a vibration unit vibrating based on the control data.

Preferably, the output unit includes a light-emitting unit emitting light in a preset color.

Preferably, the contents data further includes data for performing assignment of the contents data to the communication other-end party.

Preferably, the data for performing the assignment includes one of a flag representing a state of use of the contents data, and data associated with the contents data.

Preferably, the data associated with the contents data includes a title of the contents corresponding to the contents data, a name of a performer or a producer of the contents, a genre of the contents, a time of production of the contents and information representing the number of the data items associated with the contents data.

Preferably, the information communication terminal includes one of a radio communication device and a wired communication device.

Preferably, the radio communication device includes one of a telephone, a PHS (Personal Handyphone System) and a transceiver.

Preferably, the wired communication device includes one of a telephone and a facsimile machine.

Preferably, the information communication terminal includes one of a portable information terminal transmitting information and an image display device transmitting information.

Preferably, the information communication terminal further includes a changing unit changing all of the contents data stored in the contents data storing unit.

Preferably, the information communication terminal further including a select unit selecting the plurality of contents data items stored in the contents data storing unit, and a changing unit collectively and simultaneously changing the contents data items selected by the select unit.

According to another aspect, the invention provides a mobile telephone. The mobile telephone includes a speech communication unit performing wireless speech communications; contents data storing unit storing a plurality of contents data items; a storing unit storing identification data for identifying a plurality of communication other-end parties and assignment data for assigning the contents data with the communication other-end party; and an assigning unit assigning the contents data with the communication other-end party based on the assignment data.

According to another aspect, the invention provides a content distributing device. The contents distributing device includes a receiving unit receiving information from each of a plurality of information communication terminals; a storing unit storing a plurality of distribution data items for distribution, and a database including attribute data associated with each of the distribution data items. The attribute data is associated with information for identifying an other-end party of the communications performed by the information communication terminal. The contents distributing device includes a request detecting unit detecting a request for distribution of the distribution data stored in the storing unit based on the information received by the receiving unit. The request includes sender information for specifying the information communication terminal requesting the distribution. The contents distributing device includes a transmitting unit transmitting the distribution-requested distribution data to the information communication terminal specified by the sender information; and a feedback detecting unit detecting reception of feedback information transmitted from each of the information communication terminals based on the information received by the receiving unit. The feedback information includes attribute data associated with the distribution data stored in the information communication terminal having sent the request. The contents distributing device includes an updating unit updating the database based on the attribute data included in the feedback information.

Preferably, the database further stores a distribution record of the distribution data. The contents distributing device further includes a producing unit producing list data representing a list of the distribution data being transmittable to the information communication terminal requesting the distribution, based on the distribution record. The transmitting unit transmits the list data to the information communication terminal.

Preferably, the distribution data includes one of sound data, music data and image data.

According to another aspect, the invention provides a content distributing system. The contents distributing system includes an information communication terminal. The information communication terminal includes a communication unit capable of communications with at least a plurality of communication other-end parties, a content data storing unit storing multiple kinds of contents data, a storing unit storing identification data for identifying the plurality of communication other-end parties and assignment data for assigning the contents data to the communication other-end party, and an assigning unit assigning the contents data to the communication other-end party based on the assignment data. The contents distributing system includes a content distributing device connected to the information communication terminal via a communications line. The contents distributing device includes a receiving unit receiving information from each of a plurality of information communication terminals, and a storing unit storing a plurality of distribution data items for distribution and a database including attribute data associated with each of the distribution data items. The attribute data is associated with information for identifying an other-end party of the communications performed by each of the information communication terminals. The content distributing device includes a request detecting unit detecting a request for distribution of the distribution data stored in the storing unit based on the information received by the receiving unit. The request includes sender information for specifying the information communication terminal requesting the distribution. The content distributing device includes a transmitting unit transmitting the distribution-requested distribution data to the information communication terminal specified by the sender information, and a feedback detecting unit detecting reception of feedback information transmitted from each of the information communication terminals based on the information received by the receiving unit. The feedback information includes attribute data associated with the distribution data stored in the information communication terminal having sent the request. The content distributing device includes an updating unit updating the database based on the attribute data included in the feedback information.

According to another aspect, the invention provides a program product for controlling an information communication terminal provided with a storage device. The program product causes the information communication terminal to execute the steps of performing communications with at least a plurality of communication other-end parties; preparing multiple kinds of contents data in the storage device; preparing identification data for identifying the plurality of communication other-end parties and assignment data for assigning the contents data to the communication other-end party; and assigning the contents data to the communication other-end party based on the assignment data.

According to another aspect, the invention provides a program product for operating a computer as a content distributing device. The program product causes the comparator to execute the step of preparing a plurality of distribution data items for distribution, and a database including attribute data associated with each of the distribution data items; and the step of receiving information from each of the plurality of information communication terminals. The attribute data is associated with information for identifying an other-end party of the communications performed by each of the information communication terminals. The program product causes the comparator to execute the step of detecting a request of distribution of the prepared distribution data based on the received information. The request includes sender information for specifying the information communication terminal requesting the distribution. The program product causes the computer to execute the step of sending the distribution-requested distribution data to the information communication terminal specified by the sender information; and the step of detecting reception of the feedback information transmitted from each of the information communication terminals based on the received information. The feedback information includes attribute data associated with the distribution data stored in the information communication terminal having sent the request. The program product causes the computer to execute the step of updating the database based on the attribute data included in the feedback information.

EFFECT OF THE INVENTION

According to the information communication terminal of the invention, the association between the address book data and the output data can be implemented, e.g., by arrangement of data or the like. Therefore, since the user of the information communication terminal is not required to perform an associating operation on each address book data item, convenience will be improved.

The information communication terminal according to another aspect of the invention can make more effective use of the downloaded contents. The information communication terminal of still another aspect allows easy assignment, and allows easy determination about whether unassigned contents are to be deleted or not, after execution of the assignment. Consequently, a memory in the information communication terminal can be effectively used. According to the information communication terminal of a yet another aspect, it is expected that downloaded contents increase owing to improved convenience and the terminal can contribute to development of industries involved in contents distribution. The information communication terminal of a further another aspect can collectively and simultaneously change the plurality of contents to be reproduced. For example, a plurality of contents can be replaced with contents related to Christmas. This can interest users of the information communication terminals.

BRIEF DESCRIPTION OF THE DRAWINGS

FIG. 11 conceptually illustrates a form of data storage in a flash memory 940.

FIG. 16 conceptually shows a form of data storage in flash memory 940.

FIG. 17 is a flowchart illustrating a procedure of processing executed by control unit 1500.

FIG. 18 illustrates a correspondence between groups and registrants based on data illustrated in FIG. 16.

FIG. 19 illustrates a form of data storage in flash memory 940.

FIG. 21 illustrates a form of storage, in a RAM 950, of data produced after assignment of the ringing tones.

FIG. 22 illustrates the assignment of the registrants to the ringing tones in each group.

FIG. 24 illustrates a form of data storage on hard disk 250 of a computer system 200.

FIG. 25 illustrates a form of data storage in flash memory 940.

FIG. 26 illustrates a form of data storage in RAM 950.

FIG. 29 illustrates a state that is set in advance by a user before the assignment of the ringing tone is performed based on "relation".

FIG. 30 illustrates a form of the data storage in RAM 950.

FIG. 31 illustrates a form of the data storage in flash memory 940 after the assignment of the ringing tones to the registrants.

FIG. 32 illustrates matching between the ringing tone and the registrants using the "relation" as a key.

FIG. 34 illustrates a form of the data storage in flash memory 940.

FIG. 37 illustrates a form of data storage in flash memory 940.

DESCRIPTION OF THE REFERENCE SIGNS 100 mobile telephone, 110 base station, 120 network, 200 computer system, 210 CPU, 220 mouse, 230 keyboard, 240 RAM, 250 hard disk, 260 CD-ROM drive, 262 CD-ROM, 280 monitor, 904 monitor, 904 first casing, 906 second casing

BEST MODES FOR CARRYING OUT THE INVENTION

Embodiments of the invention will now be described with reference to the drawings. In the following description, the same parts bear the same reference numbers and the same names, and implement the same functions. Therefore, description thereof is not repeated.

First Embodiment

Figure 1:
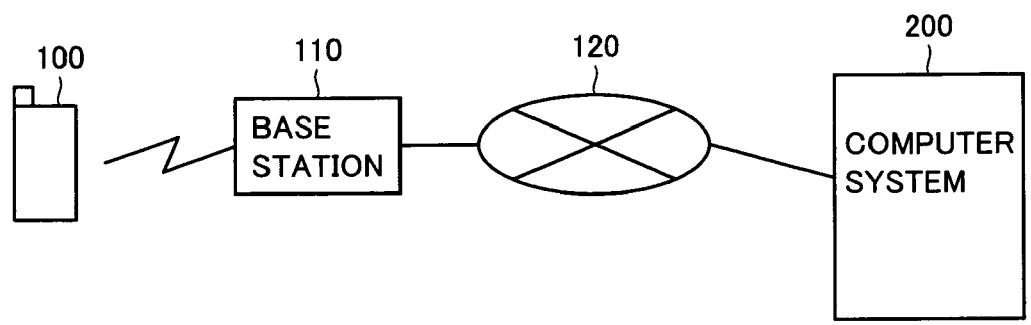
FIG. 1 illustrates a structure of a system formed of a mobile telephone 100 and a device providing ringing tones according to a first embodiment of the invention.

Referring to FIG. 1, description will now be given on a manner of use of a mobile telephone 100 according to a first embodiment of the invention. FIG. 1 illustrates a structure of a system formed of mobile telephone 100 and a device providing ringing tones.

Mobile telephone 100 performs communications with a base station 110 via a radio communication line. Base station 110 is connected to a computer system 200 that can distribute ringing tones over a network 120. Devices other than mobile telephone 100 may be connected as information communication terminals to computer system 200. For example, a PHS (Personal Handyphone System), a stationary telephone, a transceiver, a facsimile or other information processing devices may be connected. The information communication terminal may be a television set, a display of a car navigation system or other image display devices. Communications by wire system may be employed for connection between the information communication terminal and the computer system instead of the radio communications. Network 120 may be the Internet or another public communication line, and also may be a private communication line. A communication scheme is not particularly restricted.

Figure 2:
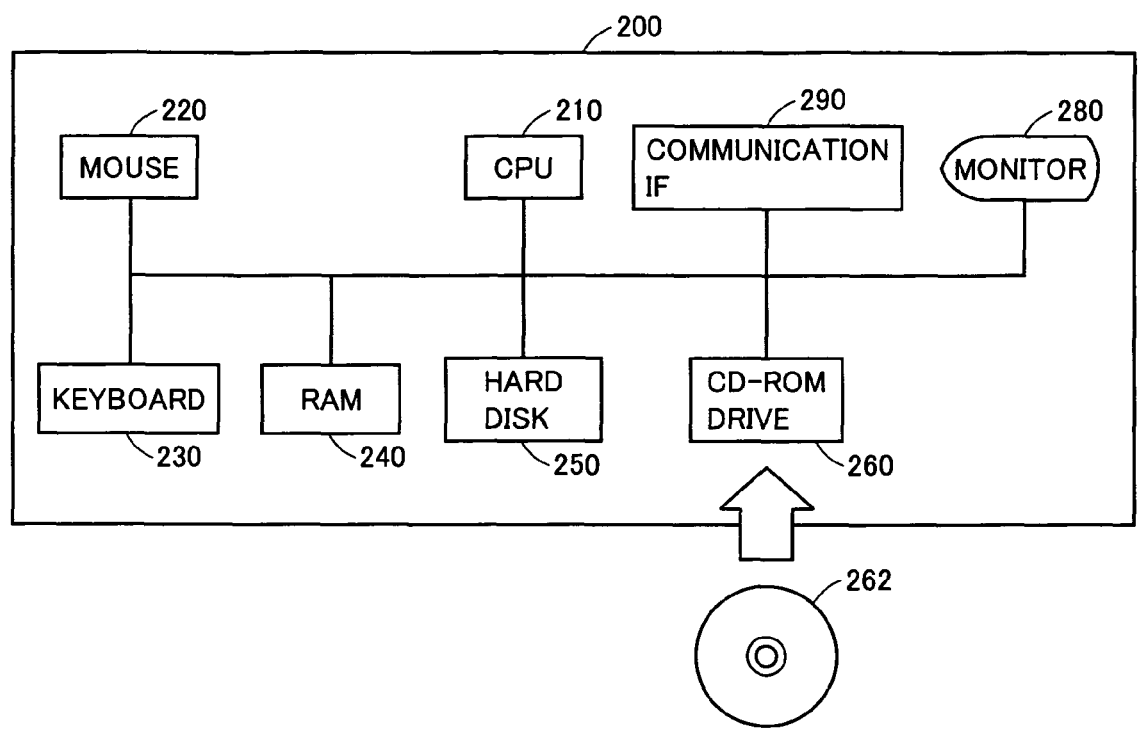
FIG. 2 is a block diagram illustrating a hardware structure of a computer system 200 functioning as a server device transmitting the ringing tones.

Referring to FIG. 2, description will now be given on computer system 200 operating as a music distribution server device. FIG. 2 is a block diagram illustrating a hardware structure of computer system 200. Computer system 200 includes a CPU (Central Processing Unit) 210, a mouse 220 for accepting input of instructions, a keyboard 230 for accepting input of instructions, a RAM (Random Access Memory) 240 temporarily storing input data or data produced by processing that is executed according to programs, a hard disk 250 that can nonvolatilely stores data, a CD-ROM (Compact Disc-Read-Only Memory) drive 260, a monitor 280 and a communication interface (IF) 290, which are connected together by a data bus. A CD-ROM 262 that is a data storage medium is loaded into CD-ROM drive 260.

Processing in computer system 200 is implemented by software that is executed by various kinds of hardware and CPU 210. The above software is prestored in RAM 240 or hard disk 250. The software may be stored in CD-ROM 262 or other data storage mediums for distribution as program products. Further, the software may be provided as program products that can be downloaded from information providers connected to the Internet or other communications lines. The software is stored on hard disk 250 after it is read from the data storage medium by CD-ROM drive 260 or another reading device, or is downloaded via communication interface 290. The software is read in an executable form from hard disk 250 into RAM 240, and is executed by CPU 210.

Computer system 200 illustrated in FIG. 2 has general hardware. Therefore, it should be noted that the essential part or substance of the invention to be described later is the software that is stored in RAM 240, hard disk 250, CD-ROM 262 or other data storage mediums or can be downloaded over the network. Operations of various parts of the hardware of computer system 200 are well known, and therefore detailed description thereof is not repeated.

Figure 3:
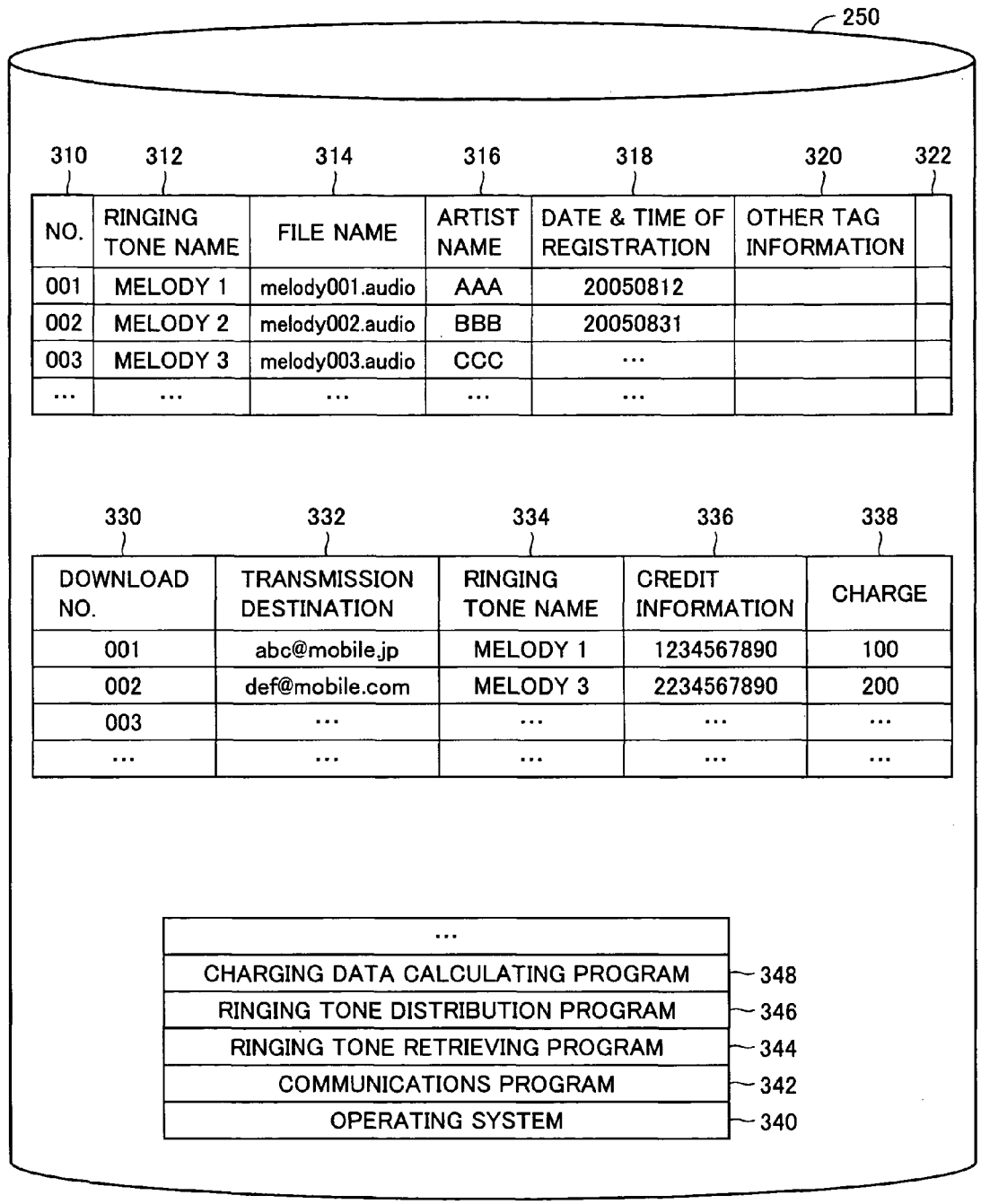
FIG. 3 conceptually illustrates a form of data storage on a hard disk 250.

Referring to FIG. 3, description will now be given on a data structure of the music distribution server device implemented by computer system 200. FIG. 3 conceptually illustrates a form of storage of the data on hard disk 250. Hard disk 250 includes areas 310 to 322 for data storage.

Hard disk 250 has stored ringing tones to be distributed in response to externally received requests for download. More specifically, area 310 stores names specifying data records representing respective ringing tones. Area 312 stores names of the ringing tones. Area 314 stores sound files of ringing tones. Areas 316-322 store so-called tag information annexed to the ringing tones. These kinds of information are well known to those skilled in the art, and therefore will now be specifically described hereinafter.

Hard disk 250 further includes areas 330-338 for storing data that is produced in response to provision of the ringing tone. More specifically, area 330 stores the data for specifying the record that is produced in response to every provision of the ringing tone. Area 332 stores data specifying destinations of the provided ringing tones. Area 334 stores the names of provided ringing tones. Area 336 stores, as credit information, information such as a credit cart number that is obtained for charging from the user receiving the ringing tone. Area 338 stores amounts charged for provision of the ringing tones. As can be understood from the data illustrated in area 330, each record is produced every time the ringing tone is downloaded, and hard disk 250 successively stores these records.

Hard disk 250 further includes areas 340-348 for storing the programs. Area 340 stores the operating system for defining the basic operation of computer system 200. Area 342 stores a program for performing communications by computer system 200 over network 120 with mobile telephone 100 and other communication terminals. Area 344 stores a program for retrieving the ringing tone that is selected according to a request received from mobile telephone 100 or another mobile terminal. Area 346 stores a program for distributing to a mobile terminal the data of retrieved ringing tone. Area 348 stores a program for calculating charging information when the ringing tone is distributed. CPU 210 reads these programs and writes them in the executable form into an area of RAM 240 that is reserved for executing these programs. CPU 210 executes these programs in the executable form to achieve the various kinds of processing already described.

Figure 4:
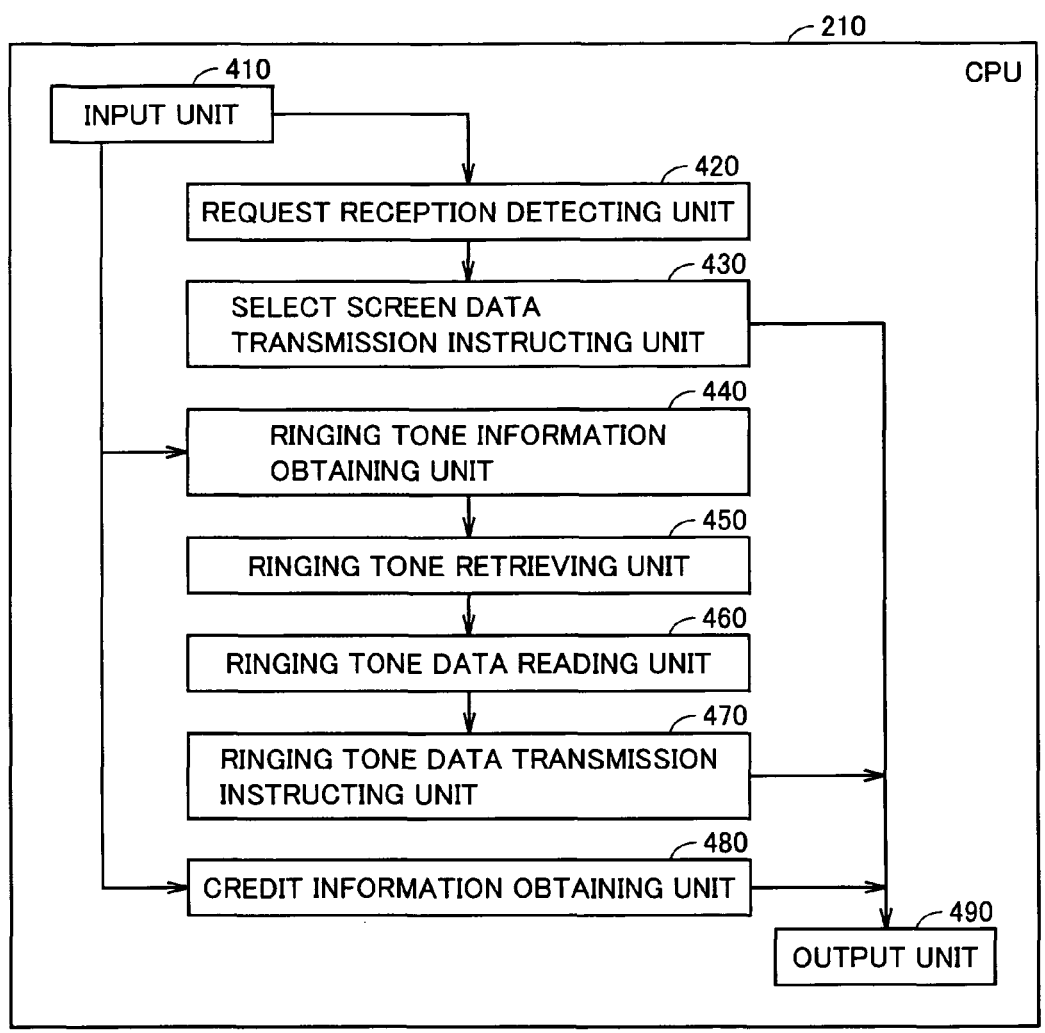
FIG. 4 is a block diagram illustrating a structure of functions implemented by executing programs by a CPU 210.

Referring to FIG. 4, description will now be given on CPU 210 that realizes computer system 200 operating as the music distribution server device according to the embodiment. FIG. 4 is a block diagram illustrating a structure of functions implemented by CPU 210 executing the programs. CPU 210 includes an input unit 410, a request reception detecting unit 420, a select screen data transmission instructing unit 430, a ringing tone information obtaining unit 440, a ringing tone retrieving unit 450, a ringing tone data reading unit 460, a ringing tone data transmission instructing unit 470, a credit information obtaining unit 480 and an output unit 490.

Input unit 410 accepts an input of an external instruction via the data bus. Request reception detecting unit 420 detects the reception of the request that is made for distribution of the ringing tone and is obtained from the information transmitted from mobile telephone 100. In response to the request for distribution of the ringing tone by request reception detecting unit 420, select screen data transmission instructing unit 430 instructs the transmission of data of the screen for allowing selection of the ringing tone. In response to this instruction, the screen data stored in advance on hard disk 250 is read into an area kept in RAM 240, and further is transmitted by CPU 210 to network 120 via communication interface 290. Mobile telephone 100 receiving the screen data thus transmitted displays screen contents for selecting the ringing tone according to the received data. The manner of display on the screen of mobile telephone 100 will be described later.

Ringing tone information obtaining unit 440 obtains information for specifying the ringing tone that is specified by mobile telephone 100 through input unit 410. This information includes data for identifying the user of mobile telephone 100 and data for specifying the ringing tone selected for distribution (e.g., names of a ringing tone and an artist, and the like). Using the information obtained by ringing tone information obtaining unit 440, ringing tone retrieving unit 450 retrieves a data file of the specified ringing tone from the must data stored in hard disk 250. When the data file selected for distribution is present, ringing tone data reading unit 460 reads the data file from hard disk 250, and writes it into RAM 250. The above artist is an example of a voice or music performer. The data for specifying the ringing tone is not restricted to the above data, and may be a producer of music or image. For example, the performer relating to the image is an actor, actress, model or the like. The producer of the image is a painter, photographer or the like.

Ringing tone data transmission instructing unit 470 instructs an other-end party (i.e., an address of mobile telephone 100) that requested the distribution of the ringing tone to transmit the data file that is read. When this instruction is issued, the data stored in RAM 240 is transmitted onto network 120 via communication interface 290. The structure of the data thus transmitted takes a packet form. This form can be easily understood by those skilled in the art, and therefore description thereof is not repeated.

Credit information obtaining unit 480 obtains information such as a credit card number, an expiration data and other information required for charging from the information of which input is accepted via input unit 410, and successively stores the obtained information in areas 320-338 on hard disk 250. Output unit 490 provides the instruction produced by CPU 210 as well as data and other signals to respective specified addresses.

Figure 5:
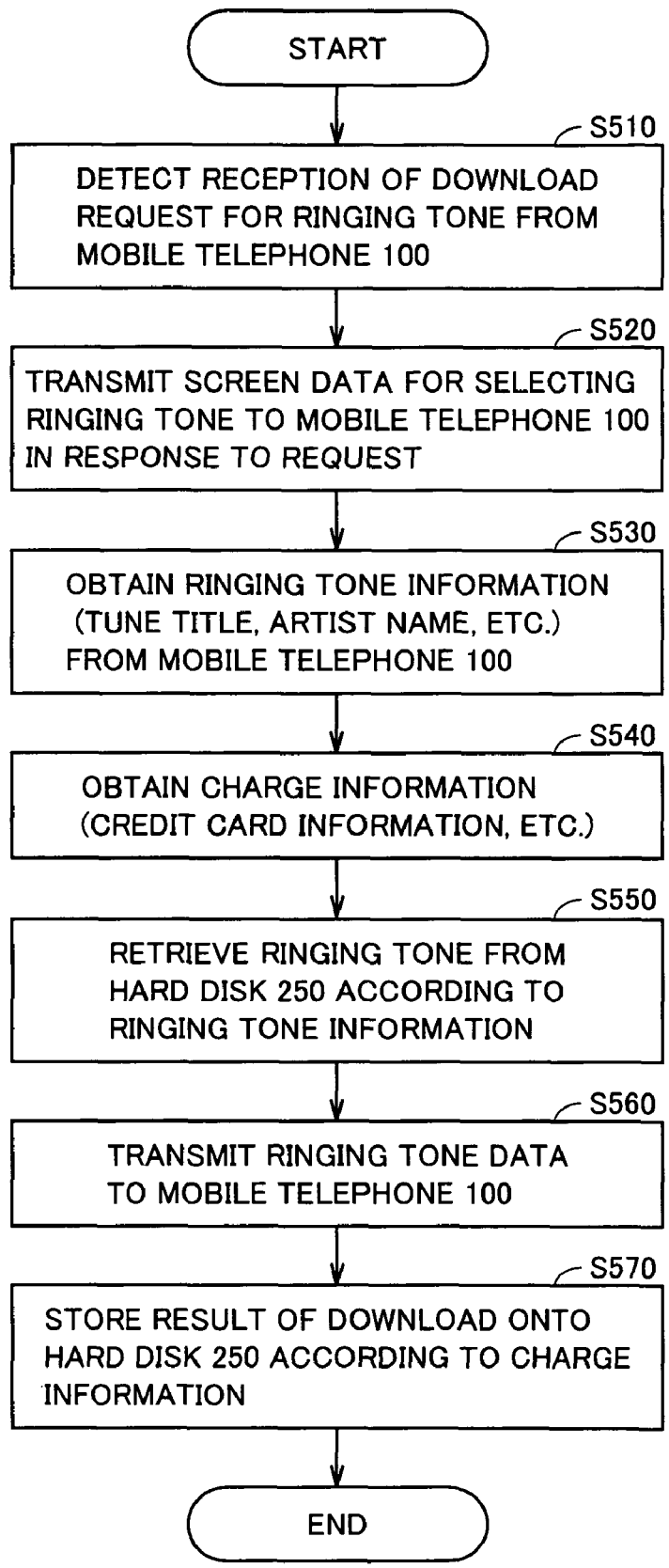
FIG. 5 is a flowchart illustrating a procedure of processing executed by CPU 210.

Referring to FIG. 5, description will now be given on a control structure of computer system 200 that functions as the music distribution server device. FIG. 5 is a flowchart illustrating a procedure of the processing executed by CPU 210.

In step S510, CPU 210 detects reception of a request for downloading the ringing tone based on the information of which input over network 120 is accepted. In step S520, CPU 210 responds to this request by transmitting screen data for selecting the ringing tone to mobile telephone 100. Upon transmission of this data, mobile telephone 100 displays screen contents corresponding to the data, and enters a state in which the user of mobile telephone 100 can select the ringing tone. Thereafter, if the user of mobile telephone 100 selects a specific ringing tone as will be described later, and performs an operation for transmitting the information that includes the data for specifying the selected ringing tone, the data is transferred to computer system 200.

In step S530, CPU 210 receives the information of the ringing tone from mobile telephone 100, and obtains specific data (e.g., the names of the ringing tone and artist) included in the received data. In step S540, CPU 210 further obtains the charge information (the credit card number, expiration data and other credit cart information) from the information transmitted from mobile telephone 100. The obtained data is successively stored in the area reserved on hard disk 250.

In step S550, CPU 210 retrieves the specified ringing tone from the ringing tone database stored on hard disk 250 according to the obtained information. In this operation, the data including the distributable ringing tone is transmitted when the screen contents for selecting the ringing tone is transmitted. Therefore, it is apparent from the result of retrieving that the specified ringing tone reliably present. However, in view of that case where the specified ringing tone is not present, screen contents notifying of the absence thereof may be prepared according to predetermined data.

In step S560, CPU 210 transmits the data file of the ringing tone to mobile telephone 100 according to the result of the retrieval of the ringing tone. In step S570, in response to the completion of transmission of the ringing tone data, CPU 210 stores an actual result of the download of the ringing tone in the database on hard disk 250 according to the charge information that is already obtained. A record stored by this operation includes the name of distributed ringing tone, distribution destination, credit information providing a base or ground for charging and the like.

Figure 6:
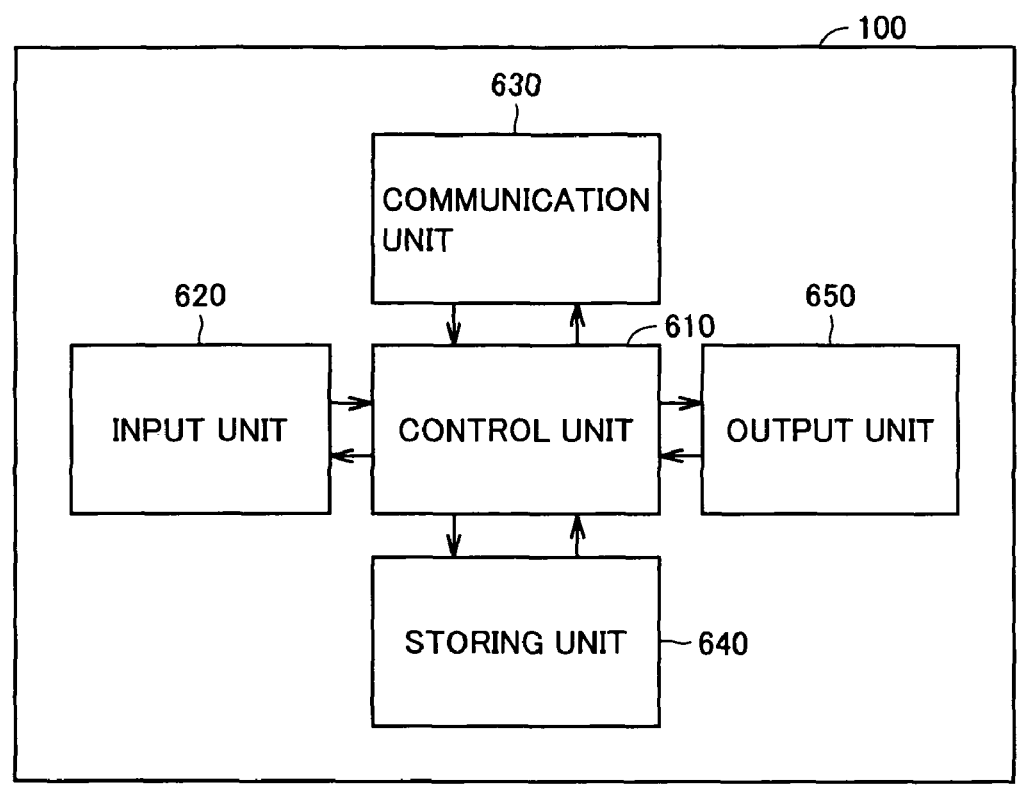
FIG. 6 is a block diagram illustrating a functional structure of mobile telephone 100.

Referring to FIG. 6, description will now be given on a structure of mobile telephone 100 according to an embodiment of the invention. FIG. 6 is a block diagram illustrating a functional structure of mobile telephone 100. Mobile telephone 100 includes a control unit 610, an input unit 620, a communication unit 630, a storing unit 640 and an output unit 650.

Input unit 620 accepts an input of external data or instruction. The data or instruction thus accepted is transmitted to control unit 610. Control unit 610 executes processing required for implementing mobile telephone 100. For example, control unit 610 operates according to the operation or data of which input through input unit 620 is accepted, and executes a program for implementing the processing defined by the operation of data thus accepted. Alternatively, control unit 610 operates according to data stored in storing unit 640, and executes the processing that refers to such data.

Control unit 610 detects update of the data stored in storing unit 640. For example, control unit 610 detects the update of the address book data or the update of the ringing tone, movie and other contents data. Alternatively, control unit 610 keeps the time based on a signal provided from an internal clock (not shown). For example, control unit 610 keeps the time that elapsed after assignment (which will be described later) is once executed, and detects the elapsing of a preset time. When the above detection is performed, control unit 610 provides the instruction for reexecuting the assignment processing. Control unit 610 collectively and simultaneously updates the data stored in storing unit 640 based on the external instruction. For example, when control unit 610 receives the instruction indicating the "collective updating" from input unit 620, control unit 610 deletes all the contents data stored in storing unit 640, and writes the newly entered contents data into storing unit 640. Consequently, the data stored in storing unit 640 is collectively updated.

Communication unit 630 implements the radio communication function. The implemented function includes communications for telephone, e-mail, data displayed in web page and other data. Storing unit 640 holds the data that was preentered in the process of manufacturing mobile telephone 100. Storing unit 640 further stores the data of which external input through input unit 620 or communication unit 630 is accepted. The data of which input is accepted includes so-called contents data, e.g., of sound, music, image and others. Storing unit 640 stores the identification data for identifying a plurality of the other-end parties of communications. The identification data includes the address book of the name, telephone name, e-mail address book of the other-end party of communications, the attribute of the communication other-end party, a relation between the communication other-end party and the information communication terminal, and other items.

Storing unit 640 also stores the data produced by control unit 610. Output unit 650 outputs the images, sounds, music and the like according to the instruction produced by control unit 610. The images are specifically character strings, still images, movies, animations and the like. Output unit 650 includes, e.g., a display displaying images and a speaker outputting sounds or music.

Figure 7:
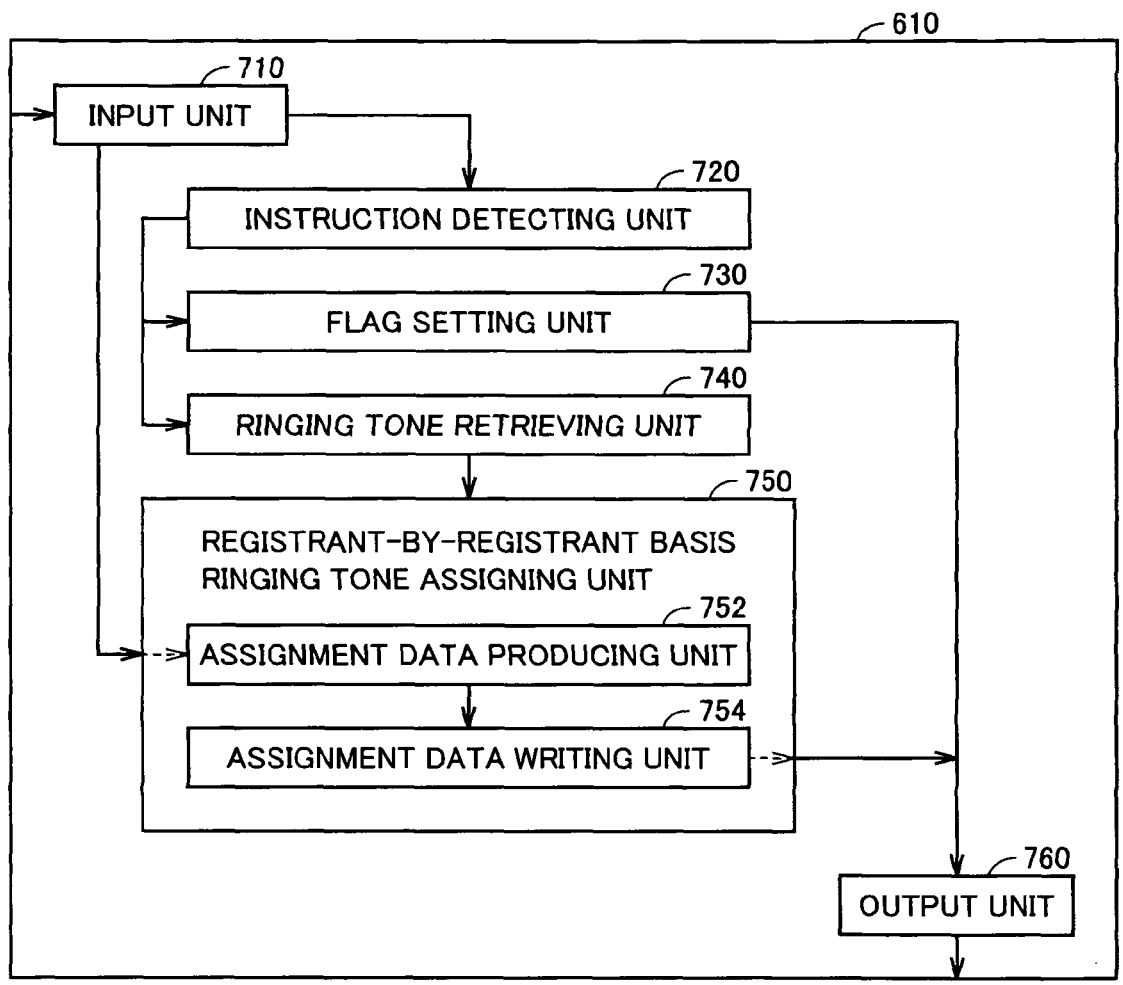
FIG. 7 is a block diagram illustrating a structure of functions implemented by a control unit 610.

Referring to FIG. 7, the structure of mobile telephone 100 will now be described further in detail. FIG. 7 is a block diagram illustrating the structure of functions realized by control unit 610. Control unit 610 includes an input unit 710, an instruction detecting unit 720, a flag setting unit 730, a ringing tone retrieving unit 740, a registrant-by-registrant basis ringing tone assigning unit 750 and an output unit 760. Registrant-by-registrant basis ringing tone assigning unit 750 includes an assignment data producing unit 752 and an assignment data writing unit 754.

Input unit 710 accepts the input of data from a component (e.g., input unit 620 or communication unit 630) other than control unit 610 of mobile telephone 100. Instruction detecting unit 720 detects an instruction for causing mobile telephone 100 to execute operations specific to mobile telephone 100 based on the data entered via input unit 710. The detected instructions include an instruction, e.g., for assigning the ringing tones to the address book that is preregistered in the mobile telephone.

Flag setting unit 730 sets a flag for dividing the processing of the data records stored in storing unit 640, in response to the detection of the instruction by instruction detecting unit 720. For example, flag setting unit 730 sets, for each address, a flag for discrimination between an address to be handled as a target of the ringing tone assignment and an address not to be handles as such a target.

Ringing tone retrieving unit 740 retrieves from storing unit 640 the ringing tone that can be assigned to the address book, in response to the result of the detection by instruction detecting unit 720. A result of the retrieval is transmitted to registrant-by-registrant basis ringing tone assigning unit 750.

Registrant-by-registrant basis ringing tone assigning unit 750 executes the operation of assigning the ringing tone to each address book stored in storing unit 640, based on the instruction entered via input unit 710 and the result of retrieval by ringing tone retrieving unit 740. More specifically, registrant-by-registrant basis ringing tone assigning unit 750 retrieves the address that is a target of the assignment. Further, registrant-by-registrant basis ringing tone assigning unit 750 assigns the ringing tone retrieved by ringing tone retrieving unit 740 to the retrieved address in a one-to-one relationship.

This assignment is performed by associating the respective data items in the address book that are arranged in the ascending order of data numbers with the sound files of the ringing tones arranged in the ascending order of sound file numbers, respectively. In this case, it is not necessary that the address book data items or the sound files are arranged in the ascending order. These may be arranged in the descending order, or in a combination of the ascending and descending orders.

Data other than the data number of the address book may be used as the key for the assignment. For example, the assignment may be performed according to the arrangement based on the order of names of registrants in the address books or names of sound files (e.g., phonetic order or alphabetical order).

In registrant-by-registrant basis ringing tone assigning unit 750, assignment data producing unit 752 produces data for associating the ringing tones thus assigned with the registrants. Assignment data writing unit 754 operates according to the data produced by assignment data producing unit 752, and thereby writes the data for specifying the ringing tone with respect to the data record of each registrant in the associate fashion in the area reserved in storing unit 640.

Output unit 760 writes the flag set by flag setting unit 730 in storing unit 640. Output unit 760 further stores the data produced by registrant-by-registrant basis ringing tone assigning unit 750 in storing unit 640.

Figure 8:
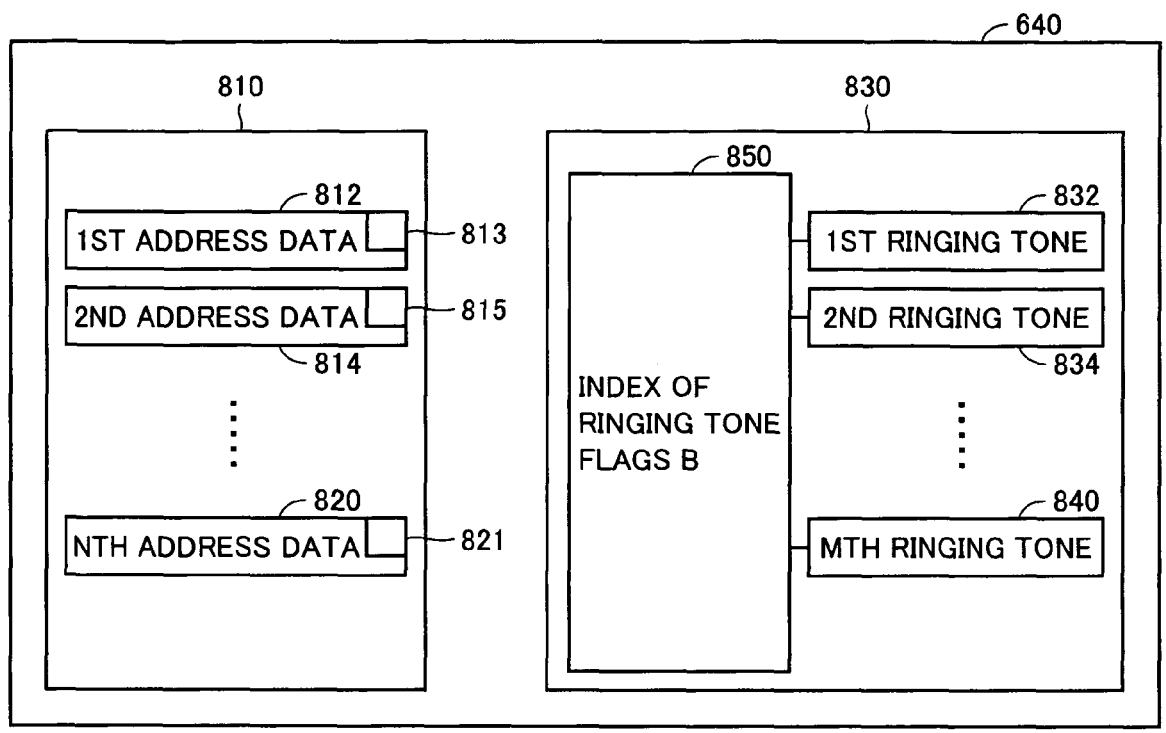
FIG. 8 conceptually illustrates a form of data storage in a storing unit 640 of mobile telephone 100.

Referring to FIG. 8, a data structure of mobile telephone 100 will now be described. FIG. 8 conceptually shows a form of data storage in storing unit 640 of mobile telephone 100. Storing unit 640 includes an address book storing unit 810 storing address data representing the other-end party of communications of mobile telephone 100, and a ringing tone storing unit 830 storing the ringing tones. The address data is, e.g., one of a name of the communication other-end party, information specifying whether the name of the communication other-end party is a private person, a company or a group, a telephone number, an e-mail address, information representing a relation between the user of the information communication terminal and the communication other-end party, an age or a gender of the communication other-end party, information for specifying a communication device used by the communication other-end party, a name for identifying the group to which the address book of the communication other-end party belongs and data representing a history of assignment of the contents data to the communication other-end party. However, the address data may be data other than the above.

Address book storing unit 810 stores a data record for each of the communication the communication other-end parties. More specifically, address book storing unit 810 includes address data items of N in number, i.e., first, second, . . . and Nth address data items 812, 814 . . . and 820. The number of address data items stored in address book storing unit 810 is not restricted to that illustrated in FIG. 8. The number of storable data items depends on a capacity of the memory implementing storing unit 640.

First address data 812 includes an area 813 for storing a flag. Second address data 814 includes a similar area 815. Nth address data 820 includes a similar area 821. The flag stored in each area 813, 815 or 821 is data representing whether the assignment of the ringing tone can be performed or not. When the processing for assigning the ringing tone is executed, the data representing whether the assignment of the ringing tone can be performed or not is written in areas 813, 815 and 821, and the processing of assigning the ringing tone is executed. When the flag representing that the ringing tone can be assigned is stored in area 813, 815 or 821, or when a flag inhibiting the assignment is not stored in the above area, the assignment of the ringing tone is executed.

The data of assignment is not restricted to the above. For example, a flag representing a state of use of contents data may be employed.

Ringing tone storing unit 830 stores the data of the ringing tone that is entered via input unit 620 or is received via communication unit 630. More specifically, ringing tone storing unit 830 includes first, second and Mth ringing tones 832, 834 and 840. Each ringing tone is assigned an index 850 of the ringing tone flag. This index is used when the assignment to the address data is performed.

Figure 9:
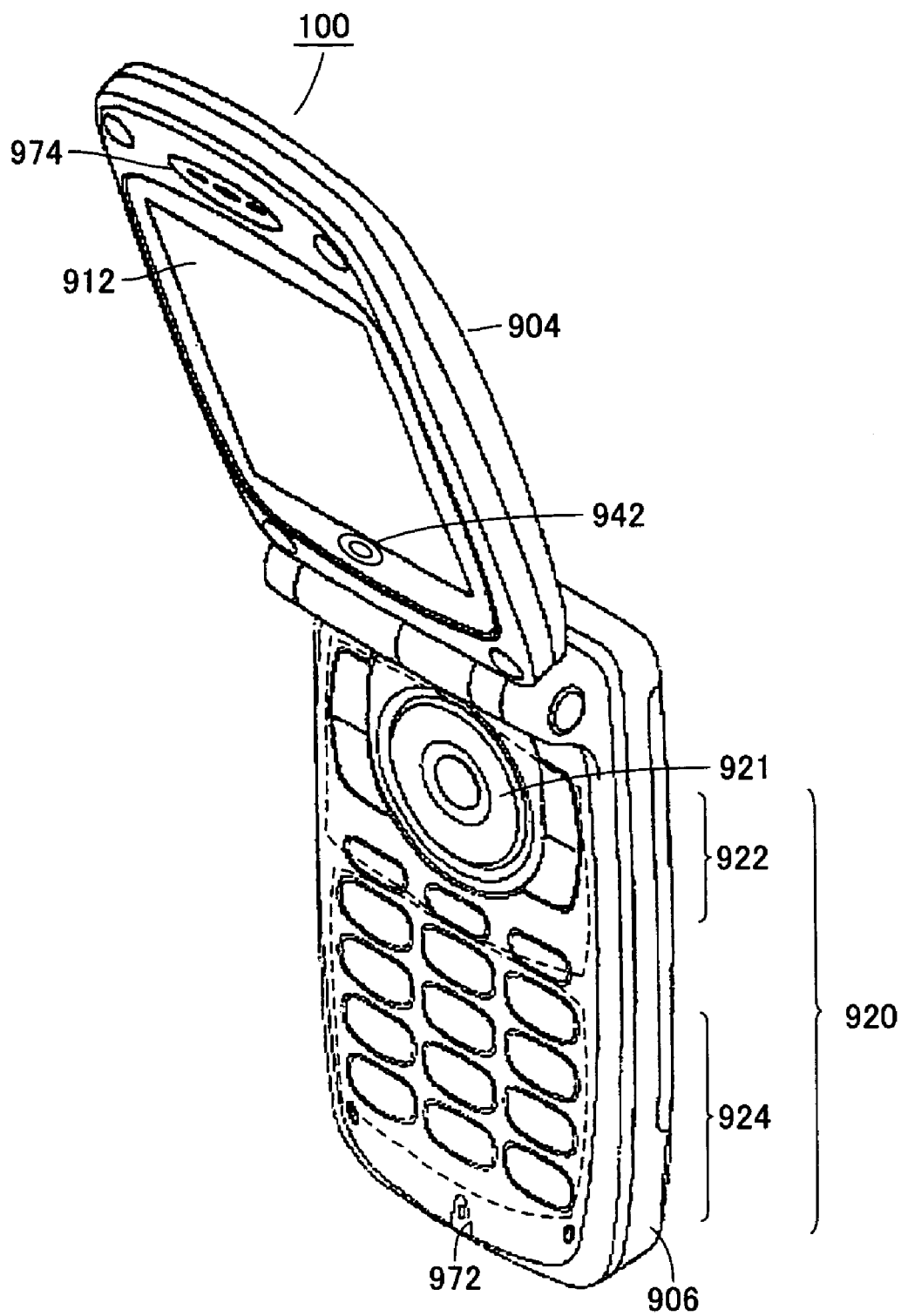
FIG. 9 schematically shows an outer appearance of mobile telephone 100.
Figure 10:
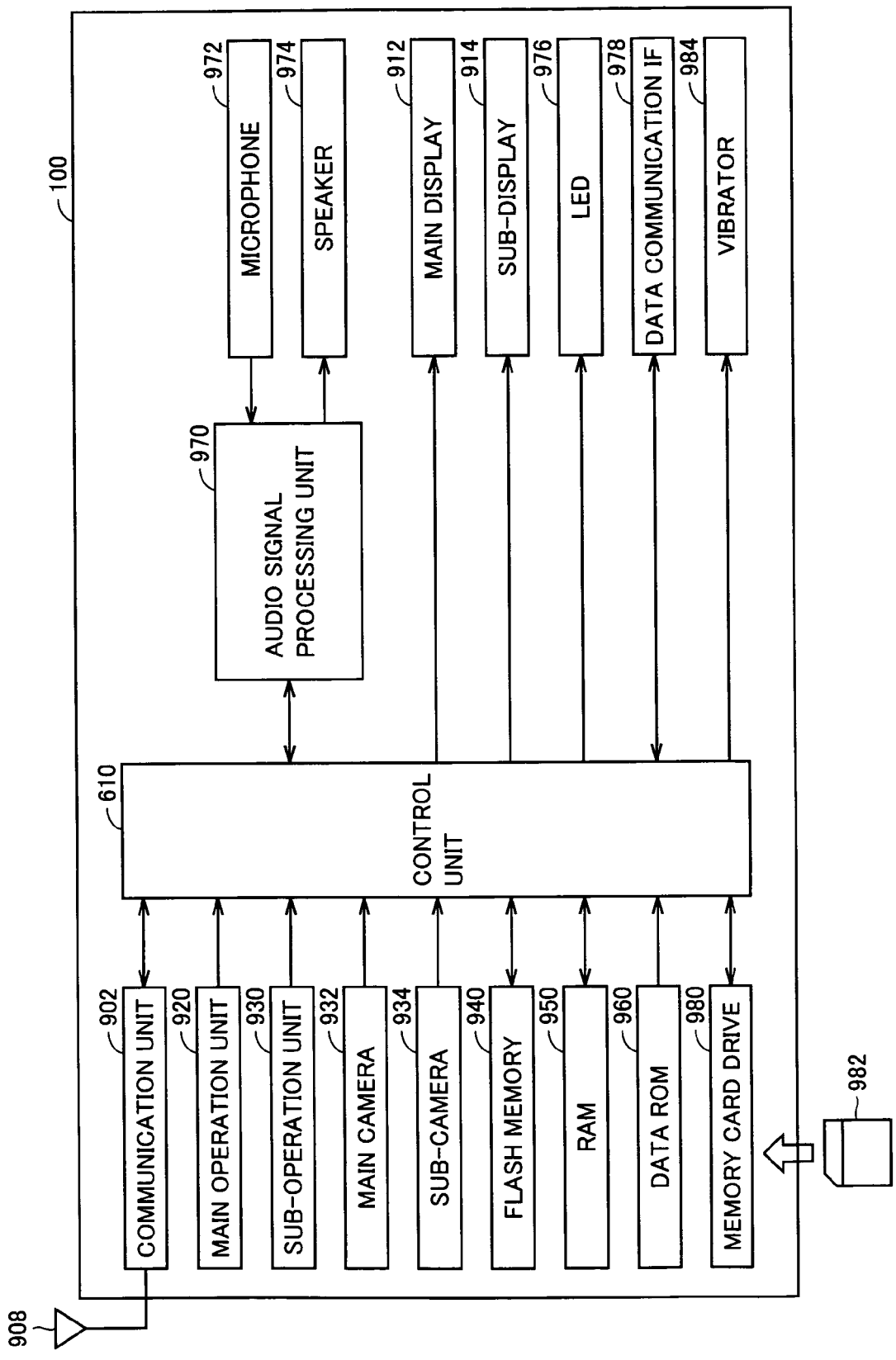
FIG. 10 is a block diagram illustrating a hardware structure of mobile telephone 100.

Referring to FIGS. 9 and 10, a specific structure of mobile telephone 100 will be described below. FIG. 9 schematically shows an outer appearance of mobile telephone 100. FIG. 10 is a block diagram illustrating a hardware structure of mobile telephone 100.

As shown in FIG. 9, mobile telephone 100 is of a foldable type, and includes first and second casings 904 and 906, a speaker 974, a main display 912, a sub-camera 942, a main operation unit 920 and a microphone 972. Main operation unit 920 includes a button 921 accepting an input of an instruction in response to depression thereof, a cursor moving key 922 for moving a cursor displayed on main display 912 and a twelve-key set 924 formed of twelve keys such as numeric keys.

As shown in FIG. 10, mobile telephone 100 includes, in addition to the structure illustrated in FIG. 9, a communication unit 902, a control unit 610, a sub-operation unit 930, a main camera 932, a flash memory 940, a RAM 950, a data ROM 960, a memory card drive 980, an antenna 908, an audio signal processing unit 970, a sub-display 914, an LED (Light Emitting Diode) 976, a data communication interface 978 and a vibrator 984. A memory card 982 is loaded into memory card drive unit 980. Main operation unit 920 and sub-operation unit 930 correspond to input unit 620 shown in FIG. 6. Communication unit 902 corresponds to communication unit 630. Flash memory 940, RAM 950, data ROM 960 and memory card 982 loaded into memory card drive 980 correspond to storing unit 640. Speaker 974, main display 912, sub-display 914, LED 976 and vibrator 984 correspond to output unit 650.

When antenna 908 receives the signal, it provides the signal to communication unit 902. Communication unit 902 executes predetermined processing on the input signal, and transmits the processed signal to control unit 610. A signal that is output from control unit 610 for transmission from mobile telephone 100 enters communication unit 902. When communication unit 902 performs predetermined transmission processing, the signal provided by this processing is transmitted from antenna 908 by radio.

When the user enters an instruction into main operation unit 920, main operation unit 920 provides a signal corresponding to the instruction to control unit 610, which executes processing defined by the received signal. The user's instruction includes an instruction for transmitting a request for downloading the ringing tones, an instruction for assigning the ringing tones to the registrants included in the address book, and the like.

Sub-operation unit 930 accepts an input of instruction by the user, similarly to main operation unit 920. Sub-operation unit 930 is arranged on a surface that is located on the outer side when mobile telephone is closed. Main camera 932 is implemented, e.g., by a solid state imaging device CCD (Charge Coupled Device). Main camera 932 takes an image of a subject, and produces an image signal of the subject for output. The output image signal is provided to control unit 610. Control unit 610 executes predetermined image processing on the signal, and transmits the signal thus processed to main display 912 and sub-display 914. The image processing includes, e.g., processing for producing display data of sizes corresponding to the image display region of main display 912 or sub-display 914.

A sub-camera 934 is implemented by a solid state imaging device CCD, similarly to main camera 932. The number of cameras arranged in mobile telephone 100 is not restricted to two, and may be one. Also, mobile telephone 100 may not employ any camera.

Flash memory 940 stores the data produced or obtained by the operation of mobile telephone 100. The stored data also includes the address book of the communication other-end party, the data files of the ringing tones obtained via communication unit 902 and the like. RAM 950 temporarily stores the data that is used in the processing executed by control unit 610. More specifically, control unit 610 reads the data stored in RAM 950, and executes the instructed processing. This processing includes processing for assigning a ringing tone to a registrant included in the address book.

Data ROM 960 has stored application programs (e.g., a mail editing program, image processing program, music reproducing program and other programs) held in mobile telephone 100. Control unit 610 reads each program, converts it into an executable form and writes it in RAM 950. Main display 912 displays the address book based on the data thus written in RAM 950. Alternatively, speaker 974 obtains the above data via audio signal processing unit 970 to generate a ringing tone.

LED 976 is one of forms of light emitting means. When an incoming call of telephone or reception of an e-mail is detected in mobile telephone 100, LED 976 emits light in a predetermined color. In this operation, LED 976 is not restricted to exhibit a specific color, but may exhibit multiple colors. LED 976 may be replaced with another light-emitting form. Contents data may include data defining the light emission. In this case, when control unit 610 detects the above data, LED 976 emits the light based on the detected data. According to this configuration, LED 976 can emit the light corresponding to the details of contents. For example, intervals of light emission may be changed or the color of light may be changed according to the intensity or volume of music.

Data communication interface 978 is an interface for performing data communications via a communication cable (not shown). The form of the interference is not particularly restricted.

Vibrator 984 is an example of vibrating means, which is one of forms of means for notifying of the incoming call of telephone, reception of e-mail and other states. When the incoming call of telephone or the e-mail reception is detected, control unit 610 activates vibrator 984 with a predetermined frequency. The manner of vibration may be changed according to the caller of telephone or the sender of e-mail. Thereby, the user can easily identify the caller of telephone or the sender of e-mail even when the ringing does not occur. The form of the vibrating means is not restricted to vibrator 984.

When the contents data include data for controlling the vibration of vibrator 984, vibrator 984 may be configured to vibrate in response to the detection of such data. This data includes, e.g., data defining intervals between vibrations of vibrator 984 and/or data defining a pattern of vibrations.

Memory card drive 980 drives a readable and writable memory card 982 that can be removably loaded thereinto. When memory card 982 is loaded into memory card drive 980, the data stored in memory card 982 is read out. The read data is temporarily written in RAM 950. Since mobile telephone 100 includes the removable data storage medium, the data set by the user as well as the data stored in various storage devices of mobile telephone 100 can be transferred to another information communication device.

As described above, the functions of mobile telephone 100 according to the embodiment are implemented by software executed by the hardware and control unit 610. Such software may be prestored in flash memory 940, RAM 950, data ROM 960 and other storage devices. Alternatively, the software may be stored in memory card 982 or other removable information storage mediums for distribution as a program product. The software thus stored is read by memory card drive 980 from the information storage medium and is temporarily stored in flash memory 940. The software is read from flash memory 940 into RAM 950, and is executed by control unit 610. The hardware structure of mobile telephone 100 shown in FIGS. 9 and 10 corresponds to the computer system in connection with the scope of the above structures and operations, and is general in this scope. Therefore, it can be understood that the most essential part of the invention is the software recorded in flash memory 940, RAM 950, data ROM 960, memory card 982 and/or other storage devices. The operations of hardware of mobile telephone 100 are well known so that description thereof is not repeated.

Mobile telephone 100 may take a form other than the foldable form. It is not necessary that mobile telephone 100 has the multiple display devices, and it is merely required to employ at least one display device. It is not necessary that mobile telephone 100 has memory card drive 980. The structure of the storage device is not restricted to that shown in FIG. 10, and it is merely required that mobile telephone 100 has at least one storage device for nonvolatilely storing data.

Referring to FIG. 11, description will now be given on a data structure of mobile telephone 100 according to the embodiment. FIG. 11 conceptually illustrates a form of data storage in flash memory 940. Flash memory 940 includes areas 1110-1118 reserved for storing the ringing tones.

Area 1110 stores data for identifying the record that forms the database of the ringing tones. Area 1112 stores the names of the ringing tones. Area 1114 stores data file names for producing the ringing tones. Area 1116 stores players (artist names of the ringing tones. Instead of the players, data representing performers or producers may be stored. In the following description, the data representing the performer or the producer is handled substantially in the same manner as the data representing the player. Area 1118 stores the flags associated with the ringing tones. When the flag is not set, area 1118 stores, e.g., "NULL". The data stored in area 1110 is automatically numbered according to the storage of the ringing tones. The name stored in area 1112 is obtained, e.g., when the ringing tone is downloaded, and may be changeable according to an external input by the user's operation.

Flash memory 940 further includes areas 1120-1128 for storing the data forming the address book. Area 1120 stores data specifying the records of database of the address book. Area 1122 stores names for specifying the communication other-end parties of telephone or e-mail communications. Telephone numbers of the communication other-end parties are stored, e.g., in areas 1124 and 1126.

In the example illustrated in FIG. 11, two telephone numbers are stored. The address book, however, may include one, three or more telephone numbers. Area 1128 stores the e-mail addresses. The data items stored in areas 1120-1128 are associated with each other. Therefore, by specifying the data stored in area 1120, respective records constituting the address book are specified.

Figure 12:
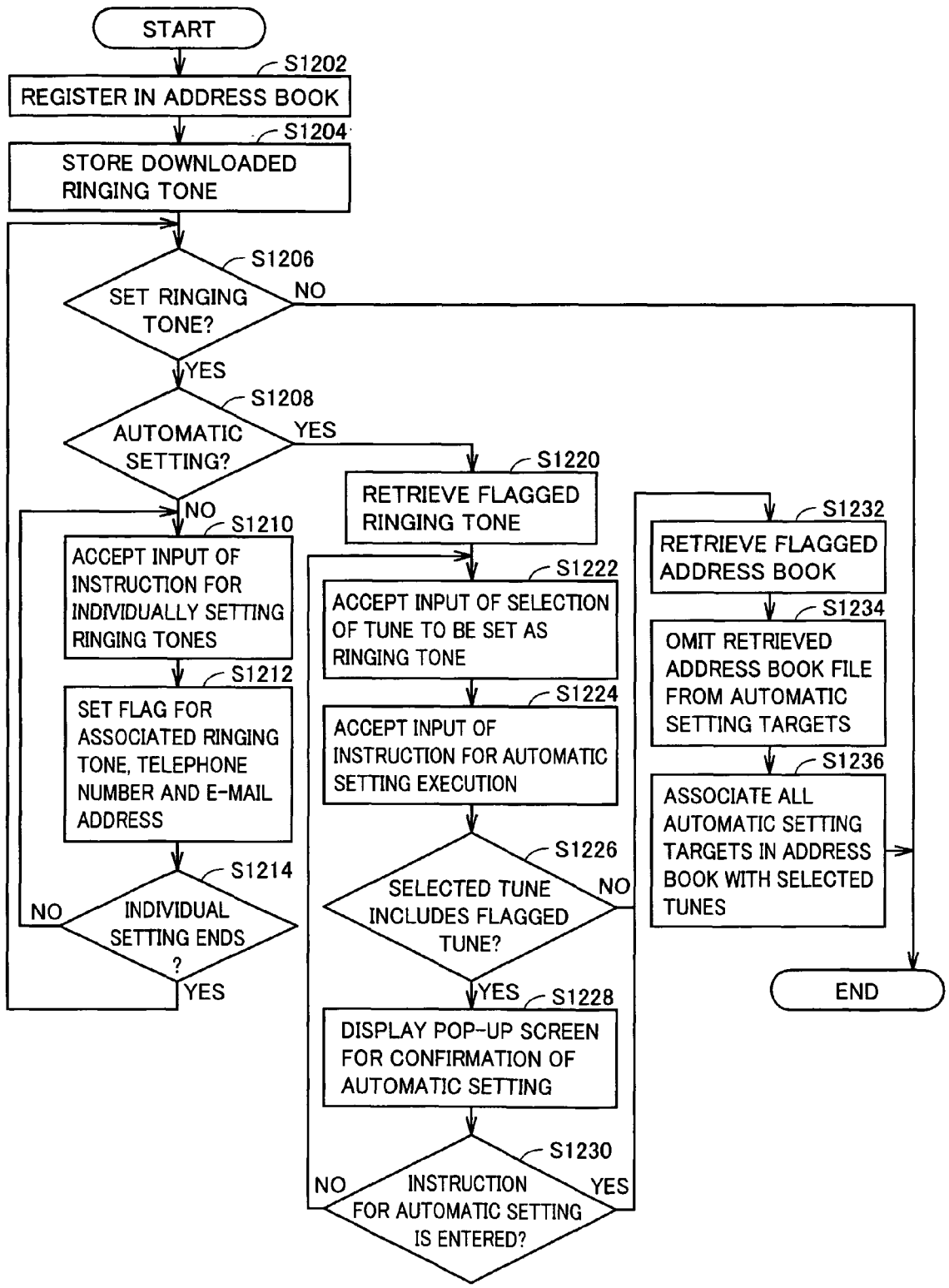
FIG. 12 is a flowchart illustrating a procedure of processing executed by control unit 610 for assigning the ringing tones to address book registrants.

Referring to FIG. 12, description will now be given on the control structure of mobile telephone 100. FIG. 12 is a flowchart representing a procedure of the processing executed by control unit 610 for assigning the ringing tones to the registrants of the address book.

In step S1202, control unit 610 accepts an input of registration data to the address book. The input data is stored, e.g., in a reserved space of flash memory 940. In step S1204, control unit 610 stores the ringing tone downloaded from computer system 200 in flash memory 940. For example, this ringing tone is obtained by downloading it from computer system 200 that functions as a music distribution device (FIG. 1).

In step S1206, control unit 610 determines whether the setting for assigning the ringing tone to the registrant and the like is to be performed or not. This determination is performed based on whether the instruction for such setting is entered or not. When the setting for assigning the ringing tone to the registrant is to be performed (YES in step S126), the process proceeds to step S1208. Otherwise (NO in step S1206), the processing ends.

In step S1208, it is determined whether the setting for such is automatic setting or not. This determination is performed, e.g., based on the instruction entered via input unit 620. When the setting for the assignment is automatic setting (YES in step S1208), the process proceeds to step S1220. Otherwise (NO in step S1208), the process proceeds to step S1210. In step S1210, control unit 610 accepts an input of the instruction for individually setting the ringing tones through input unit 620.

In step S1212, control unit 610 sets flags for the ringing tone, telephone number and e-mail address that are associated with each other. In step S1214, control unit 610 determines whether the setting for individually assigning the ringing tone to the registrant is to be ended or not. When the setting is to be ended (YES in step S1214), the processing returns to step S1206. Otherwise (NO in step S1214), the process returns to step S1210.

In step S1220, control unit 610 retrieves the flagged ringing tone from storing unit 640. In step S1222, control unit 610 accepts an input of selection of the tune to be set as the ringing tone. In step S1224, control unit 610 accepts an input of the instruction for automatically executing the setting of assignment of the ringing tone to the registrant.

In step S1226, control unit 610 determines whether the selected tunes include a flagged tune(s) or not. When the flagged tune is present (YES in step S1226), the process proceeds to step S1228. Otherwise (NO in step S1226), the process proceeds to step S1232.

In step S1228, control unit 610 displays a pop-up screen for confirmation of the automatic setting. Contents on the pop-up screen include a message "MANUALLY SET RINGING TONE IS SELECTED. DO YOU WANT AUTOMATIC SETTING?".

In step S1230, control unit 610 determines whether the instruction for the automatic setting is entered or not. When the instruction is entered (YES in step S1230), the process proceeds to step S1232. Otherwise NO in step S1230), the process returns to step S1222.

In step S1232, control unit 610 retrieves the flagged address book. In step S1234, control unit 610 omits the retrieved data record in the address book from the targets of the automatic setting. In step S1236, control unit 610 assigns the selected tunes to all the targets of the automatic setting in the address book. This assignment is implemented, e.g., in such a manner that the retrieved registrant data items and the ringing tones are arranged in an ascending order, and are associated with each other in a one-to-one relationship. If the registrants are different in number from the ringing tones, the first and following items in one group of fewer items are successively assigned again to the remaining items in the other group so that the assignment of all the data records is performed.

Figure 13:
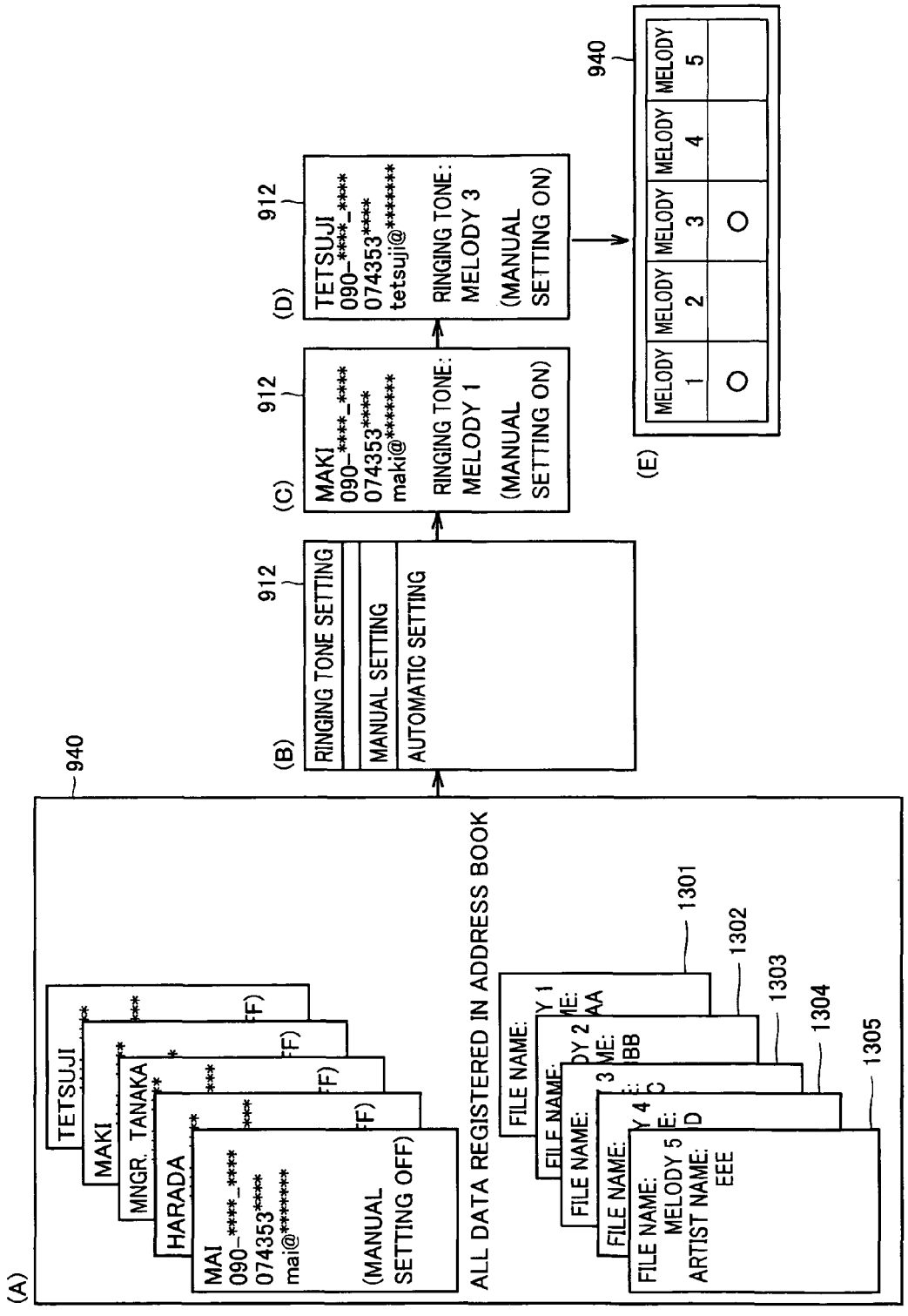
FIG. 13 illustrates progress of processing performed by a user for assigning the ringing tones to the address book registrants.
Figure 14:
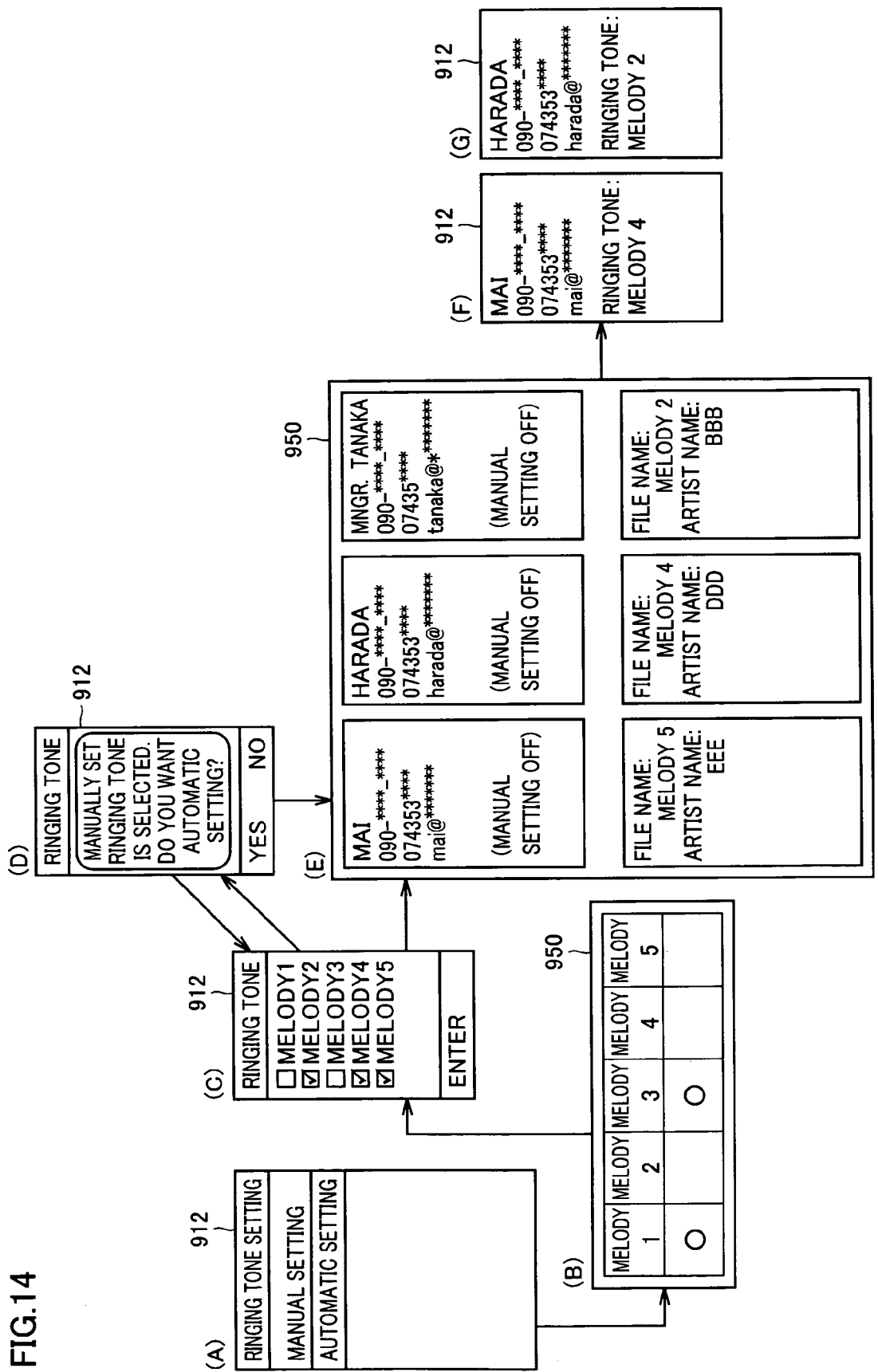
FIG. 14 illustrates progress of states realized when control unit 610 performs processing to assign the ringing tones to the address book registrants.

Referring to FIGS. 13 and 14, the concept of the assignment of the ringing tone to the registrant will now be described. FIG. 13 illustrates a flow of processing performed by the user for assigning the ringing tones to the registrants.

For example, as can be seen from a state A, flash memory 940 stores the data registered in the address book and the ringing tones. For example, index keys 1301-1305 are given to the ringing tones, respectively. When index key 1305 is designated, the ringing tone of the title "MELODY 5" is specified.

As can be seen in a state B, main display 912 of mobile telephone 100 displays initial screen contents for setting the ringing tone. This display is performed, e.g., by selecting "SET RINGING TONE" on the main screen. In this state B, when the user selects "MANUAL SETTING", mobile telephone 100 changes the screen contents to those for setting the ringing tone and the registrant by the user's operation.

As can be seen in a state C, main display 912 displays the respective data records in the address book, and displays the screen for accepting the input of the ringing tone that is a target of the setting. In the state C, for example, "MELODY 1" is set. In the state C, when the user performs input for fixing confirming the assignment of the ringing tone, main display 912 displays the next record registered in the address book.

More specifically, as can be seen in a state D, data of another registrant (e.g., "TETSUJI") is displayed. On this screen contents, the user can perform input of another ringing tone (e.g., "MELODY 3"). By repeating the above operations, the user can set the ringing tone for the data of each registrant included in the address book.

When the above setting is completed, flash memory 940 stores, as an index, the data representing that the user performed the manual setting, as can be seen in a state E. For example, "MELODY 1" and "MELODY 3" are flagged. From these flags, it can be recognized that each melody is already assigned to a certain registrant, when the automatic processing is performed later.

FIG. 14 illustrates a state transition realized when control unit 610 performs processing to assign ringing tones to the address book registrants. First, as can be seen in a state A, when the "SET RINGING NOTE" is selected on the menu screen of mobile telephone 100, main display 912 displays the screen contents for accepting selection of "MANUAL SETTING" and "AUTOMATIC SETTING". When the user performs an operation of selecting the "AUTOMATIC SETTING", the data stored in flash memory 940 is read to RAM 950 in response to the user's operation.

More specifically, as can be seen in a state B, a flag is already annexed to the ringing tone of which assignment is already performed, and therefore the data thereof is referred to in the automatic setting processing. Based on the data stored in RAM 950, main display 912 displays a list of the ringing tones that can be set by control unit 610.

As can be seen in a state C, the ringing tones other than "MELODY 1" and "MELODY 3" that are already assigned bear checkmarks in checkboxes for representing that these can be assigned. When the user places a checkmark in the checkbox, e.g., of "MELODY 1" or "MELODY 3", a confirmation for notification to that effect is displayed in a pop-up screen.

As can be seen in a state D, main display 912 displays a message "MANUALLY SET RINGING TONE IS SELECTED. DO YOU WANT AUTOMATIC SETTING?". Since this message is displayed, the user who unintentionally placed a checkmark can confirm the assignment before executing it so that the assignment that is not intended by the user can be prevented.

Referring to the state C in FIG. 14 again, when the user who completed the selection of the ringing tone entered the instruction for the assignment, the ringing tones are assigned to the registrants who are not assigned the ringing tones. More specifically, as can be seen in a state E, the data of the address book that is the target of the assignment processing is read to RAM 950. As can be seen in the state C, the data for specifying the ringing tones (MELODY 2, MELODY 4 AND MELODY 5) that are selected as the assignment targets is written in an area reserved in RAM 950.

For the sake of simplicity, three address book data items and three ringing tones are present without being associated in this example. In this case, according to the arrangement, e.g., of the address book data items, the data items of the ringing tones are associated with them in the one-to-one relationship. Alternatively, a random number generating circuit may be used to provide the arrangement in a random fashion, whereby the assignment can be performed without depending on the initial arrangement or order of the data records read into RAM 950. When the records of the address book data are different in number from the ringing tones, the data items that are fewer than the items in the other group may be assigned repeatedly to the items in the other group so that the assignment of all the records is performed.

When the assignment based on the data in RAM 950 is performed, flash memory 940 nonvolatilely stores the data. When the user executes the operation for displaying the address book, main display 912 displays the address book data that are already assigned the ringing tones, e.g., as can be seen in a state F. Further, the user operates the mobile telephone to enter the instruction for changing the data items in the address book so that another registrant is displayed (state G).

As described above, mobile telephone 100 according to the embodiment of the invention can store the association between the registrants in the address book and the ringing tones. The association is achieved by the processing of control unit 610 according to the user's instruction. Thereby, the user is not required to set the ringing tone for each registrant. Therefore, when a plurality of ringing tones are present and, for example, when many ringing tones obtained by the download are present, it is possible to remarkably reduce a load that may be imposed due to the setting to the user. The mobile telephone and other mobile communication terminals have a button operation unit or a keyboard smaller than an ordinary keyboard. Therefore, the operability or manipulatability is lower than that of a computer having ordinary keyboards. According to the invention, however, the user can enter the instruction for the automatic setting, whereby the assignment of the ringing tones to the registrants is executed so that the setting can be implemented by each operation.

More specifically, the user can select desired ringing tones at any time, and can associate the ringing tones in the selected range with the registrants in the address book. Thereby, the user can easily recognize the use and nonuse of the ringing tones that were externally obtained by the download or other methods, and can easily delete the unnecessary ringing tones. This can improve the situation of use of the data storage area of the memory.

The downloaded contents can be effectively used. Since the assignment can be performed easily, the user can easily determine whether the unassigned contents are to be deleted or not, after the assignment processing is executed. Consequently, unnecessary data can be deleted, which promotes effective use of the memory.

Since the convenience is improved as described above, the downloaded contents increase, which contributes to development of industries relating to the contents distribution.

Since the reproduction contents can be collectively and easily changed and, for example, all the contents can be replaced with contents relating to Christmas so that more interesting terminals can be provided.

The manner of changing the contents is not restricted to the above. For example, instead of replacing all the contents, the contents that are selected for deletion by the user of mobile telephone 100 can be replaced with the contents that are selected by the user for new assignment targets.

More specifically, when the user selects the contents to be deleted and the contents for the new assignment, the data for identifying each selected contents is stored in flash memory 940. When mobile telephone 100 accepts the input of the instruction for changing the contents, control unit 610 changes, based on the instruction, the contents associated with the registrants from the contents selected for deletion to the contents selected as the new assignment targets. Flash memory 940 stores the data for identifying the registrant and the data for identifying the changed contents in the associated fashion. Thereby, the assignment of the selected contents is completed. In this case, the contents to be changed are not specifically restricted, and only one or a plurality of contents may be selected.

Second Embodiment

A second embodiment of the invention will now be described. The mobile telephone according to the embodiment differs from that of the first embodiment in that the ringing tone can be assigned to each group of the registrants constituting the address book. The mobile telephone according to the second embodiment has the same hardware structure as the mobile telephone according to the first embodiment, and also has the same functions unless otherwise specified. Therefore, description thereof is not repeated.

Figure 15:
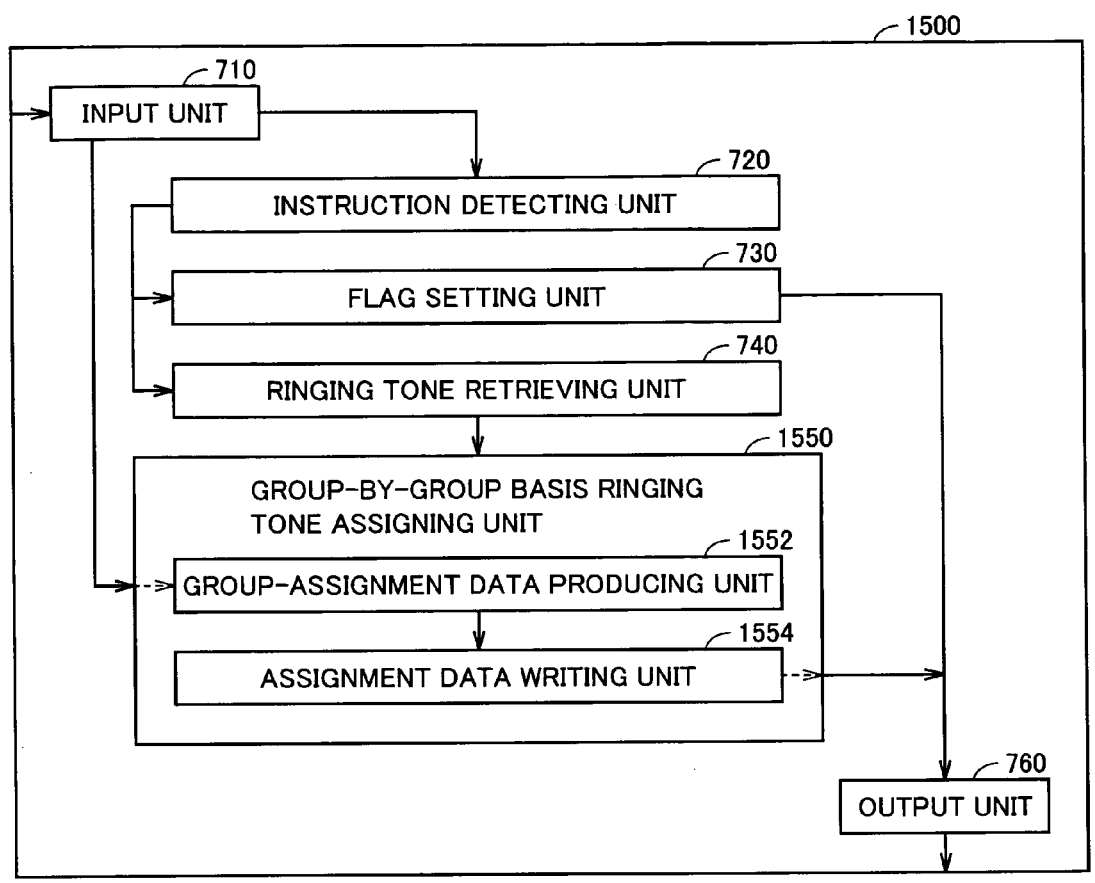
FIG. 15 is a block diagram illustrating a structure of functions implemented by a control unit 1500.

Referring to FIG. 15, a control unit 1500 implementing the mobile telephone according to the second embodiment will be described below. FIG. 15 is a block diagram illustrating a functional structure of control unit 1500. Control unit 1500 includes input unit 710, instruction detecting unit 720, flag setting unit 730, ringing tone retrieving unit 740, a group-by-group basis ringing tone assigning unit 1550 and output unit 760. Group-by-group basis ringing tone assigning unit 1550 includes a group-assignment data producing unit 1552 and an assignment data writing unit 1554.

Group-by-group basis ringing tone assigning unit 1550 assigns the ringing tone to each of the group of registrants constituting the address book based on the instruction entered via input unit 710 and the ringing tone retrieved by ringing tone retrieving unit 740. More specifically, group-assignment data producing unit 1552 determines the ringing tone to be associated with each group, and produces assignment data that associates the group with the data for identifying the determined ringing tone. Assignment data writing unit 1554 stores the data produced by group-assignment data producing unit 1552 in flash memory 940 or another storage device.

Referring to FIG. 16, the data structure of the mobile telephone according to the second embodiment will now be described. FIG. 16 conceptually illustrates a form of data storage in flash memory 940. Flash memory 940 includes areas 1610-1618 for storing the data associated with the ringing tones.

Area 1610 stores the data for specifying the data record for each ringing tone. Area 1612 stores the name of the ringing tone. Area 1614 stores the data file of the ringing tone. Area 1616 stores the name of the artist playing the tune of the ringing tone. Area 1618 stores the flags defining the attributes of the ringing tones. When a flag is not specified in area 1618, area 1618 stores data, e.g., of "NULL".

Flash memory 940 further includes areas 1620-1628 for storing the data associated with the registrants constituting the address book. Area 1620 stores the data for identifying each data record constituting the address book. Area 1622 stores the name of the registrant in question. Area 1624 stores the telephone number. Area 1626 stores the name of the group to which the registrant belongs. The name of the group may be entered by the user of mobile telephone 100 via input unit 620 and more specifically by operating various buttons on main operation unit 920. Also, a plurality of group names for it may be prepared in advance. Area 1628 stores the flags defining the attributes of the registrant data. When the value of flag is not specified, area 1628 stores the data of "NULL".

The manner of data storage in flash memory 940 is not restricted to that shown in FIG. 16. For example, the manners of storage of the ringing tones may be stored in a distributed fashion in a plurality of areas, using the ringing tone names stored in area 1612 as keys. In this case, the data items are associated with each other with reference to the key (the ringing tone name in this case) included in each area. Therefore, by specifying any one of the numbers, the ringing tone can be retrieved.

The data about the registrants constituting the address book may be stored in the form other than that illustrated in FIG. 16. The items constituting the address book are not restricted to those illustrated in FIG. 16. For example, a plurality of telephone numbers may be associated with each registrant. In addition to the telephone numbers, the e-mail address may be associated with the registrant.

Referring to FIG. 17, description will now be given on a control structure of the mobile telephone according to the second embodiment. FIG. 17 is a flowchart illustrating a procedure of processing executed by control unit 1500. The processing similar to that of the first embodiment bears the same step numbers. Therefore, description thereof is not repeated.

In step S1710, control unit 1500 registers the information of the registrants constituting the address book in flash memory 940 on a group-by-group basis. In step S1720, control unit 1500 accepts an input for selecting the group based on the input performed via input unit 620. In step S1730, control unit 1500 accepts an input of the instruction for selecting the tune to be set as the ringing tone for the selected group.

In step S1740, control unit 1500 determines whether the tune selection for each group has ended or not. This determination is performed based on whether the instruction for notifying of the end of the tune selection is performed via input unit 620 or not. When control unit 1500 determines that the tune selection for each group ends (YES in step S1740), the process proceeds to step S1224. Otherwise (NO in step S1740), the process returns to step S1720.

In step S1750, control unit 1500 executes the processing of assigning all the automatic setting target tunes and the selected tunes to the respective groups in connection with the registrants constituting the address book. In this processing, as already described in connection with the first embodiment, the data items, e.g., for identifying the groups are arranged in the ascending order, the data items for identifying the selected tunes are likewise arranged in the ascending order and these kinds of data items are associated with each other in the one-to-one relationship. In this case, when the number of groups is larger or smaller than that of the selected tunes, the processing returns to the initial step for repeating the one-to-one assignment.

Referring to FIG. 18, description will now be given on the assignment of the ringing tones for respective groups in the mobile telephone according to the embodiment. FIG. 18 illustrates correspondence between the groups and the registrants in the data illustrated in FIG. 16. An area 1810 stores the group names. An area 1820 stores the registrants included in each group. In the example illustrated in FIG. 18, the registrants are divided into six groups (unspecified, family, school, part-time job, local and shop). The number of the groups to be associated with the ringing tones is not restricted to that in FIG. 18.

In the group structure described above, the ringing tone is assigned to every group. In this case, the assignment is not restricted to that executed by the processing of control unit 1500, and may be performed manually by the user of the mobile telephone for only the specific registrants (i.e., by the user's operation). In this case, flags are set so that control unit 1500 may discriminate between the processing targets and the untargeted items.

Referring to FIG. 19, description will now be given on the manner of using the flag. FIG. 19 illustrates a form of the data storage in flash memory 940. When the user performs the operation to instruct the execution of the processing for assigning the ringing tones to the respective groups, flash memory 940 reserves areas 1910 to 1940 for storing the data.

Area 1910 stores index keys for identifying the ringing tones. Area 1920 stores the data of the ringing tones. Area 1930 stores the registrants set by the user. Area 1940 stores flags to which control unit 1500 refers for executing the processing.

For example, the user manually assigns ringing tone "MELODY 1" of which index key is "1" to the registrant "MOTHER". Therefore, a flag B is set in area 1940 for representing the fact that the above setting is performed. Likewise, the data is stored for the ringing tones of which index keys are "4" and "5", respectively.

Figure 20:
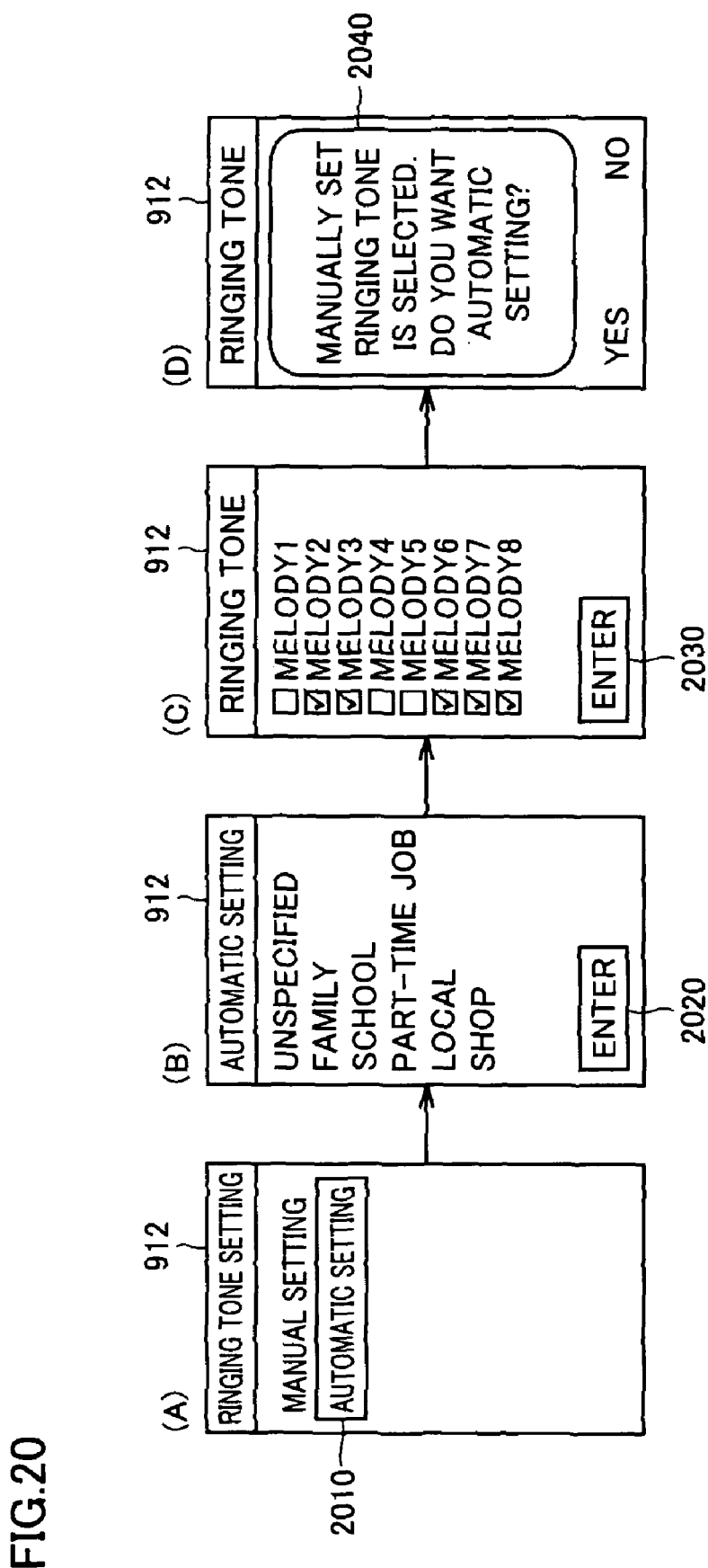
FIG. 20 illustrates changes on a screen of a main display 912.

Referring to FIG. 20, description will now be given on a manner of the screen display of the mobile telephone according to the embodiment. FIG. 20 illustrates changes in screen contents of main display 912.

As can be seen in a screen A, when the user performs an input operation for setting the ringing tone, main display 912 displays a "ringing tone setting" screen. When the user selects a region 2010 representing "AUTOMATIC SETTING" in the display, the displayed contents on main display 912 change into "AUTOMATIC SETTING" screen represented as a screen B. The foregoing six groups are displayed on this screen. This state may be configured to allow the selection of the group to be handled as the target of the assignment. Alternatively, all the groups that are currently present may be handled as the assignment targets. When the user selects a region 2020 representing "ENTER" in the above display, and depresses the button on main operation unit 920, the screen for selecting the ringing tone to be assigned is displayed.

More specifically, as can be seen on a screen C, main display 912 displays the screen contents representing "RINGING TONE". On its screen, a list of the ringing tones stored in flash memory 940 is displayed. Checkboxes for accepting the input of instructions for selection are annexed to the respective ringing tones. The checkmarks are not placed on "MELODY 1", "MELODY 4" and "MELODY 5". This represents that these are not the targets of the assignment by control unit 1500.

In this display, the target of the assignment by control unit 1500 can be changed by annexing the checkmark to the ringing tone ("MELODY 1", "MELODY 4" and/or "MELODY 5", as is done on "MELODY 2". Conversely, the checkmark may be removed from the ringing tone that has already bearing the checkmark, whereby the melody can be removed from the assignment targets.

In the above display, when the user selects the ringing tone and performs the operation of selecting a region 2030 of "ENTER", main display 912 displays the screen for confirmation.

For example, when the user performs the operation of selecting "MELODY 5" by placing the checkmark, main display 912 displays in a text display region 2040 a message "MANUALLY SET RINGING TONE IS SELECTED. DO YOU WANT AUTOMATIC SETTING?", as can be seen on a screen D. When this message is displayed, the user of the mobile telephone can confirm that the ringing tones that are intentionally selected by the user, i.e., the ring tones other than the default and thus preselected ringing tones are handled as the targets of the assignment.

Referring to FIG. 21, description will now be given on the result of the assignment of the ringing tone. FIG. 21 represents a form of storage, in RAM 950, of the data produced by completing the processing of assigning the ringing tones. RAM 950 includes areas 2110-2130 storing the data for the assignment.

Area 2110 stores the group names. This data corresponds to the data represented in area 1810 in FIG. 18. More specifically, when the assignment processing is instructed, the data is retrieved from area 1626 (FIG. 16) in flash memory 940, and is extracted as the group included in the address book.

Area 2120 stores the names of the registrant. This data corresponds to that represented in area 1820 of FIG. 18. When the instruction for the assignment is issued, the data is retrieved from area 1622 of flash memory 940, and the retrieved data items are associated on the group-by-group basis, and are successively stored in area 2120.

Area 2130 stores the data for identifying the ringing tone that is set by the processing of assigning the ringing tones to the groups. More specifically, when the processing is executed in step S1750, the ringing tones of the registrants are stored in area 2130.

Referring to FIG. 22, description will now be given on the assignment of the ringing tones to the registrants in each group. When the ringing tones are larger in number than the groups, different ringing tones can be set for the respective registrants included in the same group. For example, the group "FAMILY" includes three registrants, i.e., a father, a sister and a brother. After the forgoing assigning processing, two ringing tones "MELODY 8" and "MELODY 9" can be assigned to this group. Only one of the ringing tones may be assigned to the group, or all the ringing tones may be assigned to the respective ringing registrants in the group. In this case, the ringing tones and the registrants are associated with each other in the one-to-one relationship as already described, and thereby all the registrants are assigned the ringing tones. When the number of the ringing tones is different from that of the registrants, the data items identifying the ringing tones are successively assigned in the ascending order to the respective data items identifying the registrants so that the ringing tones can be assigned to all the registrant.

When the mobile telephone having the above assigned data receives an incoming call, the mobile telephone reads the data of the ringing tone associated with the group of the caller, and outputs the sound. Therefore, the user of the mobile telephone can easily presume the group to which the caller belongs.

Even when there are many registrants, the ringing tones can be easily set. Therefore, as compared with the case where independent setting is performed for each registrant, fewer operations are required for selecting the ringing tones that are the targets of the setting by the control unit of the mobile telephone.

The hierarchy of the registrants and the groups is not restricted to that illustrated in this embodiment. The groups may have a hierarchical structure including two or more levels. A higher group containing the groups may be present. In this case, the ringing tone can be assigned to each group belonging to the highest level, and can also be assigned to each of the groups included in another group.

Third Embodiment

A third embodiment of the invention will now be described. A mobile telephone of the third embodiment differs from those of the foregoing embodiments in that the association can be made based on the attributes of the registrants in the address book and the attributes of the ringing tones. More specifically, the music distribution server device in this embodiment distributes, in addition to the ringing tones, the attributes that are added in advance to the ringing tones. These attributes include a type (pops, classical, rock, instrument and others) of the ringing tones as well as a gender, age or age group, hobby or another taste, kind of occupation and/or the like of the user of the ringing tone. When the mobile telephone obtains the ringing tones bearing the above attributes, it associates the ringing tones with the registrants with reference to such attributes, using the attribute of the address book registrant as a key.

Figure 23:
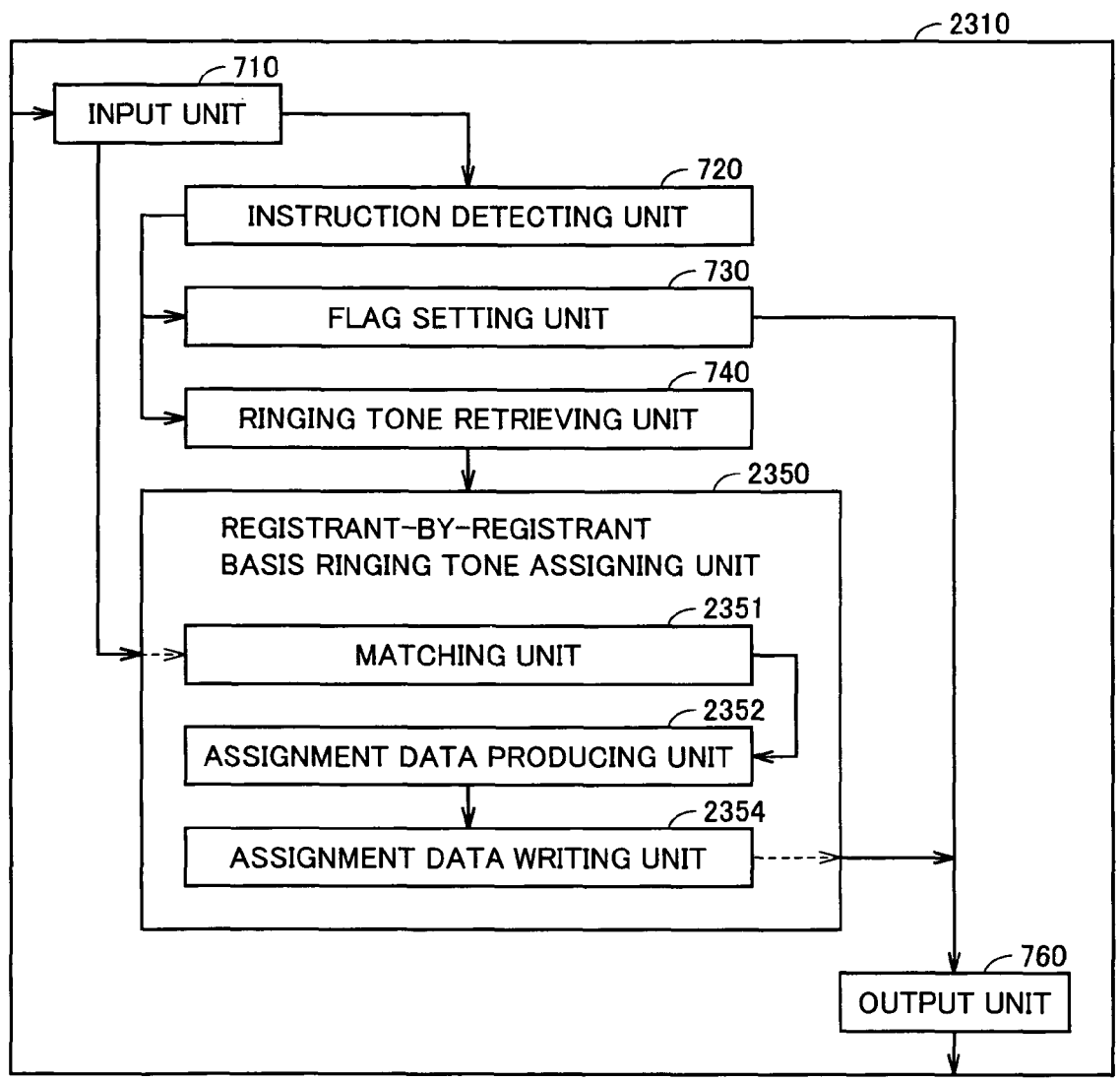
FIG. 23 is a block diagram illustrating a functional structure of a control unit 2310.

Referring to FIG. 23, description will now be given on a control unit 2310 implementing the mobile telephone according to the third embodiment. FIG. 23 is a block diagram illustrating a functional structure of control unit 2310. The same portions as those in the foregoing embodiments bear the same reference numbers, and description thereof is not repeated.

Control unit 2310 includes a registrant-by-registrant basis ringing tone assigning unit 2350 in addition to the structures of control unit 610 illustrated in FIG. 7. Registrant-by-registrant basis ringing tone assigning unit 2350 includes a matching unit 2351 associating the attributes of the ringing tones with the attributes of the registrants in the address book, an assignment data producing unit 2352 producing the data used for assigning the ringing tones to the registrants based on a result of the association by matching unit 2351, and an assignment data writing unit 2354 that writes the data produced by assignment data producing unit 2352 into flash memory 940.

Referring to FIG. 24, description will now be given on the data structure of the server device that can distribute the ringing tones to the mobile telephones according to the embodiment. FIG. 24 illustrates a form of the data storage on hard disk 250 of computer system 200 that functions as a music distribution server device for distributing the ringing tones bearing the attributes. Hard disk 250 includes areas 2410-2460 for storing the data associated with the respective ringing tones.

Area 2410 stores the data specifying each data record. Area 2420 stores the name of the ringing tone. Area 2430 stores the data file of the ringing tone. Area 2440 stores the name of the player of the tune included in the ringing tone. Area 2450 stores the attribute associated with the ringing tone (e.g., the "relation" of the registrant associated with the ringing tone with respect to the user of the ringing tone). Area 2460 stores other tag information associated with the ringing tone. By specifying the number in area 2410, one of the ringing tones is retrieved.

The form of data storage on hard disk 250 is not restricted to that shown in FIG. 24. More specifically, the data may be stored in a plurality of areas in a distributed fashion provided that such a configuration is employed that can perform the specification according to the name of the ringing tone or another data item.

When computer system 200 receives the distribution request for the ringing tone, it distributes the data including the relation with respect to the ringing tone based on the data stored on hard disk 250, e.g., in the form of packets.

Referring to FIG. 25, description will now be given on a data structure of the mobile telephone according to the embodiment. FIG. 25 illustrates a form of the data storage in flash memory 940. Flash memory 940 includes areas 2510-2550 storing the data associated with the registrants in the address book.

Area 2510 stores the data for specifying each registrant. Area 2520 stores the name of the registrant. Area 2530 stores the telephone number of the registrant. Area 2540 stores the attribute (e.g., "relation" between the registrant and the user of the mobile telephone) associated with the registrant. Area 2550 stores the name of the ringing tone associated with the registrant. When the registrant is not associated with any ringing tone, area 2550 stores, e.g., "NULL".

Referring to FIG. 26, description will now be given on a data structure of the mobile telephone at the time of the ringing tone assignment. FIG. 26 illustrates a form of the data storage in RAM 950. In the operation of associating the ringing tone with the registrant, RAM 950 reserves areas 2610-2640 for storing the data used for the association.

Area 2610 stores data specifying the records including the respective ringing tones. Area 2620 stores the names for identifying the ringing tones. Area 2630 stores the attribute (e.g., the relation that is the same as that illustrated in area 2450 of FIG. 24) associated with the ringing tone. Area 2640 stores the flags for specifying the states of the ringing tones.

These data items are read from flash memory 940 into RAM 950, e.g., after the input of the assignment instruction for the ringing tone.

Figure 27:
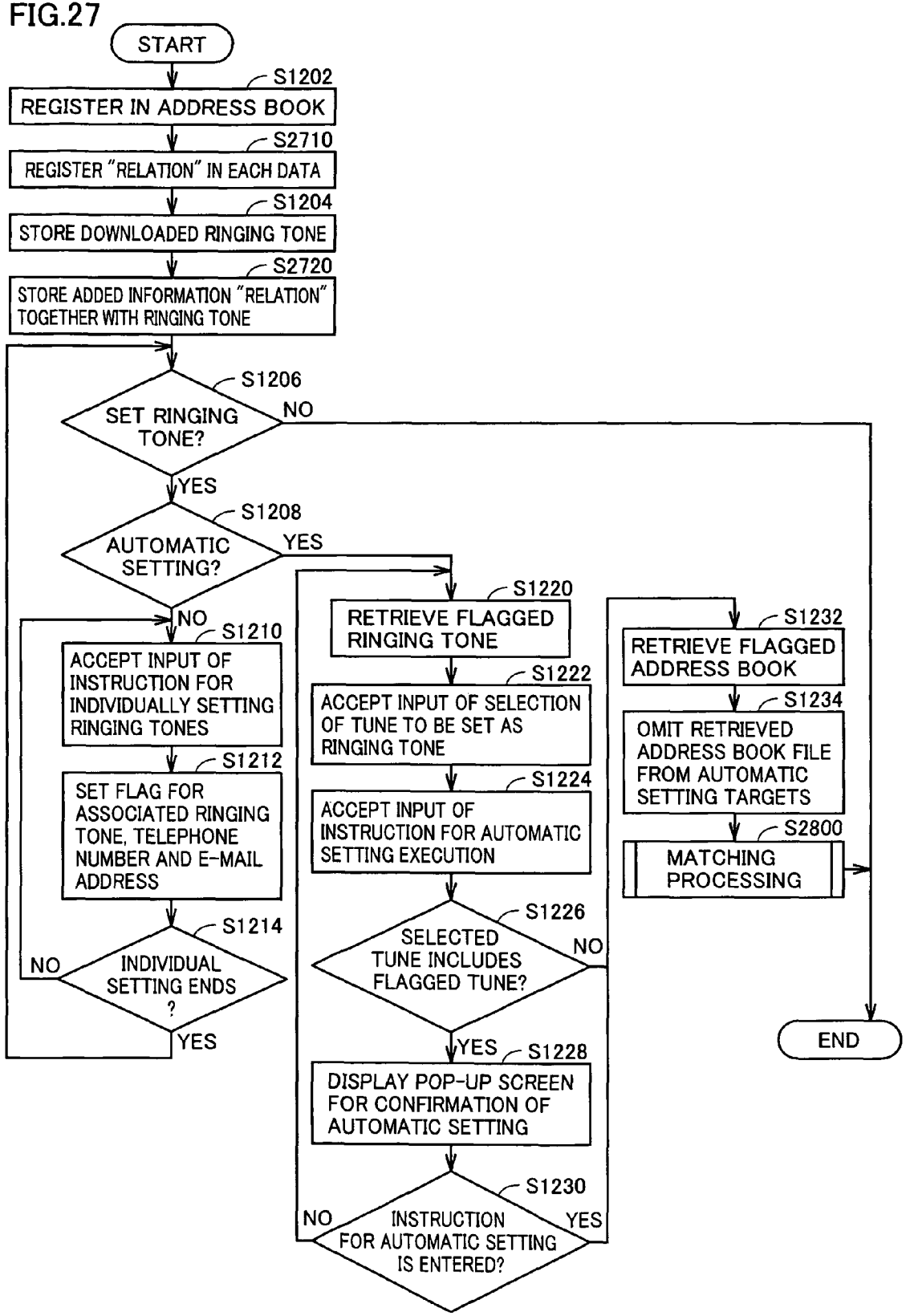
FIG. 27 is a flowchart (1) illustrating a procedure of processing executed by control unit 2310.
Figure 28:
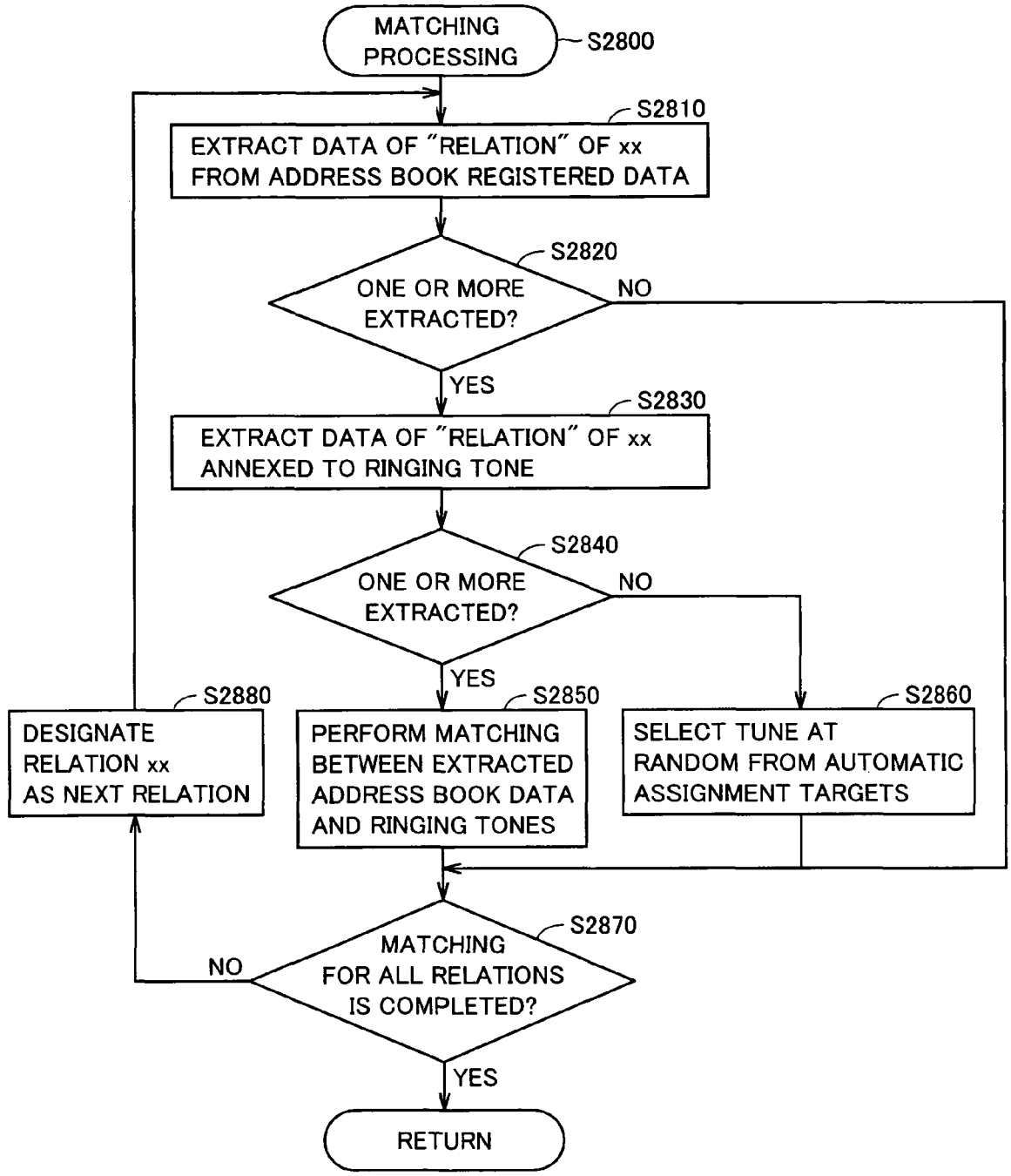
FIG. 28 is a flowchart (2) illustrating the procedure of processing executed by control unit 2310.

Referring to FIGS. 27 and 28, description will now be given on a control structure of the mobile telephone according to the embodiment. FIGS. 27 and 28 are flowcharts illustrating procedures of the processing executed by control unit 2310.

In step S2710, control unit 2310 accepts an input of the "relation" for each of the registrants constituting the address book, and stores the "relation" in the area reserved in flash memory 940. Thereby, the registrant is associated with the "relation" that is an example of the attribute of the registrant. The "relation" defines the relation or connection between the user of the mobile telephone and the registrant, using the user as the reference.

In step S2720, control unit 2310 associates the information "relation" that is annexed to the downloaded ringing tone with the ringing tone, and stores it in flash memory 940. Consequently, the ringing tone associated with the relation is specified when the relation is specified.

In step S2800, control unit 2310 executes matching processing to be described later. When this processing is executed, the registrants and the ringing tones are associated with each other, using the "relation" that is one of the attributes included in the address book as a key.

As illustrated specifically in FIG. 28, control unit 2310 extracts the data record, of which "relation" is "xxx", from the data of the registrants included in the address book in step S2810. In step S2820, control unit 2310 determines whether one or more data records of the relation of "xxx" are extracted or not. When one or more records are present (YES in step S2820), the process proceeds to step S2830. Otherwise (NO in step S2820), the process proceeds to step S2870.

In step S2830, control unit 2310 extracts the data of which "relation" annexed to the ringing tone is "xxx". In step S2840, control unit 2310 determines whether one or more records of the ringing tones are extracted or not. When one of more records is extracted (YES in step S2840), the process proceeds to step S2850. Otherwise (NO in step S2840), the process proceeds to step S2860.

In step S2850, control unit 2310 performs the matching between the data items of the registrants in the extracted address book and the extracted ringing tones. More specifically, the matching is performed by associating, in the one-to-one relationship, the address book data items with the ringing tone data items arranged in the ascending or descending order.

In step S2860, control unit 2310 selects one of the tunes that are determined as the automatic assignment targets by control unit 2310. This selection may be performed by fixedly selecting the record in a leading position from among the plurality of records. Alternatively, random selection may be performed based on random number data generated by the random number generating circuit as described before.

In step S2870, control unit 2310 determines whether the matching is completed for all the "relation" items or not. When the matching is completed for all the "relation" items (YES in step S2870), the process returns to the main processing. Otherwise (NO in step S2870), the process proceeds to step S2880. In step S2880, control unit 2310 sets the "relation" to the next "relation" (i.e., the data record that is present in the next position on the data record). Thereafter, the control returns to step S2810, and similar processing is executed again.

Referring to FIG. 29, the data structure of the mobile telephone according to the embodiment will be further described.

FIG. 29 illustrates the state that was set by the user before the assignment of the ringing tones is performed based on the "relation".

In an area 2250, the ringing tones are already assigned to the registrants "MOTHER", "MAKI" and "JUNPEI" as well as each data items in "PART-TIME JOB" of the address book. For example, the ringing tone "MELODY 2" is already assigned to "MOTHER". Based on the above data, control unit 2310 executes the ringing tone assignment processing.

FIG. 30 illustrates a form of the data storage in RAM 950. When the user instructs control unit 2310 to perform the assignment processing, RAM 950 reserves areas 3010 and 3020 for storing the data used in the assignment processing. Area 3010 stores the names of the registrants of the assignment targets. Area 3020 stores the "relation" assigned to each registrant. These data items are obtained by extracting the data records including "NULL" in area 2550 form the data stored in flash memory 940 (FIG. 29). Therefore, RAM 950 does not store the foregoing registrants ("MOTHER", "MAKI", "JUNPEI" and persons relevant to "PART-TIME JOB") who are already assigned the ringing tones.

Likewise, RAM 950 temporarily stores the data of the ringing tones. More specifically, an area 3030 stores the title of the ringing tone. Area 3040 stores the "relation" associated with the ringing tone. As illustrated in FIG. 29, area 2550 has already stored the ringing tones "MELODY 2", "MELODY 4", "MELODY 7" and "MELODY 13". Therefore, area 3030 stores the other ringing tones as the targets of the automatic assignment to be performed by control unit 2310.

Referring to FIG. 31, description will be given on a result of the assignment based on the relation in the mobile telephone according to the embodiment. FIG. 31 illustrates a form of the data storage in flash memory 940 after the association is made between the registrants and the ringing tones.

The data illustrated in areas 2510-2540 are the same as those illustrated in FIG. 25, and therefore description thereof is not repeated. Area 2550 stores the registrants that are assigned to the respective registrants. Thereby, when the mobile telephone receives an incoming call, it generates the ringing tone corresponding to the registrant.

Referring to FIG. 32, description will be given on the matching between the ringing tones and the registrants, using the "relation" as a key. An area 3210 stores the relation corresponding to each registrant in the address book. An area 3220 includes the ringing tones that are assigned the same relation as the relation. In this case, the relation "YOUNGER" does not match any ringing tone so that the data for identifying the ringing tone is not included. Therefore, a prespecified ringing tone may be assigned to it as a default. For example, the ringing tone forming the first data record in the database of the ringing tones may be assigned thereto.

An area 3230 includes the names of the registrants who are the targets of the assignment performed by control unit 2310. Each registrant is associated with the relation. As can be seen from the names in an area 3230, area 3230 does not include "MOTHER", "MAKI", "JUNPEI" and people relevant to "PART-TIME JOB", i.e., the targets to which the user of the mobile telephone has already assigned the ringing tones. As described above, the setting by the user is independent of the setting by control unit 2310 when the ringing tones are associated with the registrants.

In the mobile telephone according to the embodiment, as described above, the control unit associated the registrants and the ringing tones with each other using the "relation" as a key. The user can easily have an idea about the "relation". By setting the ringing tones based on the "relation" about which the user can easily have the idea, the user who listened to the ringing tone can easily recollect the "relation". Therefore, the association by which the user can easily specify the caller is implemented without difficulty.

Fourth Embodiment

A fourth embodiment of the invention will now be described. A mobile telephone according to the fourth embodiment differs from that of the third embodiment in that the association of the ringing tones with the registrants is performed using a "genre" as a key. The mobile telephone according to the fourth embodiment has the same hardware structure as that of the third embodiment, and the functions thereof are the same. Therefore, description thereof is not repeated.

The "genre" is one of the attributes, and is an item used for classification according to type of sound, music and image, hobby of the mobile telephone users, sports, movies or another field. In the data structure, the "genre" is used instead of the "relation" as the data item associated with each registrant. Further, in the music distribution server device, the "genre" is associated with each ringing tone.

As described above, the mobile telephone according to the embodiment can associate the ringing tone with the registrant, using the "genre" as a key. The items used as the key may be defined in advance, or may be newly registered by an operator of the music distribution server device or the user of the mobile telephone. In contrast to the foregoing "relation", an item reflecting the user's taste can be set as the "genre" so that the association can be established in various manners. The user can enjoy such association by simple operations.

Fifth Embodiment

A fifth embodiment of the invention will be described below. A mobile telephone according to the fifth embodiment differs from the foregoing embodiments in that the assignment of the ringing tones is performed according to the number of the incoming and outgoing calls per registrant in the address book. According to this embodiment, newer tunes can be reproduced more frequently.

Figure 33:
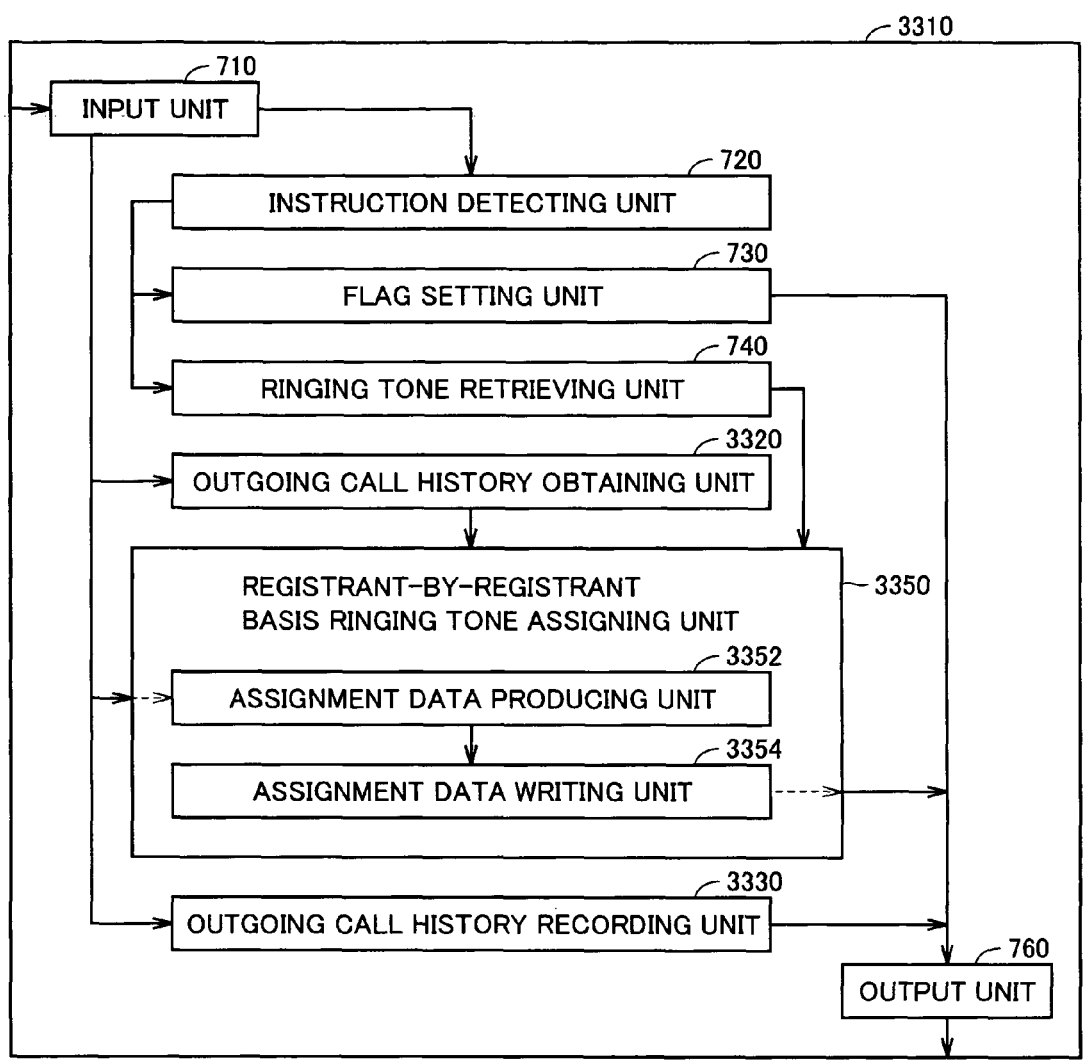
FIG. 33 is a block diagram illustrating a functional structure of a control unit 3310.

Referring to FIG. 33, description will now be given on a control unit 3310 implementing the mobile telephone according to the embodiment. FIG. 33 is a block diagram illustrating a functional structure of control unit 3310. In addition to the structures shown in FIG. 7, control unit 3310 includes an incoming and outgoing call history obtaining unit 3320 obtaining a history of the incoming and outgoing calls per registrant in the address book, a registrant-by-registrant basis ringing tone assigning unit 3350 that assigns the ringing tones to the respective registrants based on the obtained history and the ringing tones retrieved by ringing tone retrieving unit 740, and an incoming and outgoing call history recording unit 3330 that stores the history of each of the incoming and outgoing calls of the mobile telephone in an area reserved in flash memory 940. Registrant-by-registrant basis ringing tone assigning unit 3350 includes an assignment data producing unit 3352 that produces data associating the ringing tones with the registrants according to the number of the incoming and outgoing calls, and an assignment data writing unit 3354 that associates the produced data with each registrant and writes it in flash memory 940.

Referring to FIG. 34, description will now be given on a data structure of the mobile telephone according to the embodiment. FIG. 34 illustrates a form of the data storage in flash memory 940. Flash memory 940 includes areas 3410-

3418 storing a record of the incoming and outgoing calls obtained for each registrant constituting the address book.

More specifically, area 3410 stores the data specifying the records included in the database of the incoming and outgoing calls. Area 3412 stores the names of registrants. Area 3414 stores the telephone numbers used for the calling. Area 3416 stores the numbers of the outgoing calls that have been made. Area 3418 stores the numbers of incoming calls that have been received. The data items stored in areas 3410-3418 are associated with each other. Therefore, control unit 3310 can designate the data stored in area 3410 to obtain the history of the incoming and outgoing calls.

Further, flash memory 940 includes areas 3420-3428 storing the data that represents the history of the download of the ringing tones. Area 3420 stores the data specifying the database relating to the history of download. Area 3422 stores the names of the downloaded ringing tones. Area 3426 stores the names of each player playing the tune of the ringing tone. Area 3428 stores date and time when the download is performed. The data items stored in areas 3420-3428 are associated with each other. Therefore, the intended date and time of the downloading of the ringing tone can be obtained by designating the data stored, e.g., in area 3420.

Figure 35:
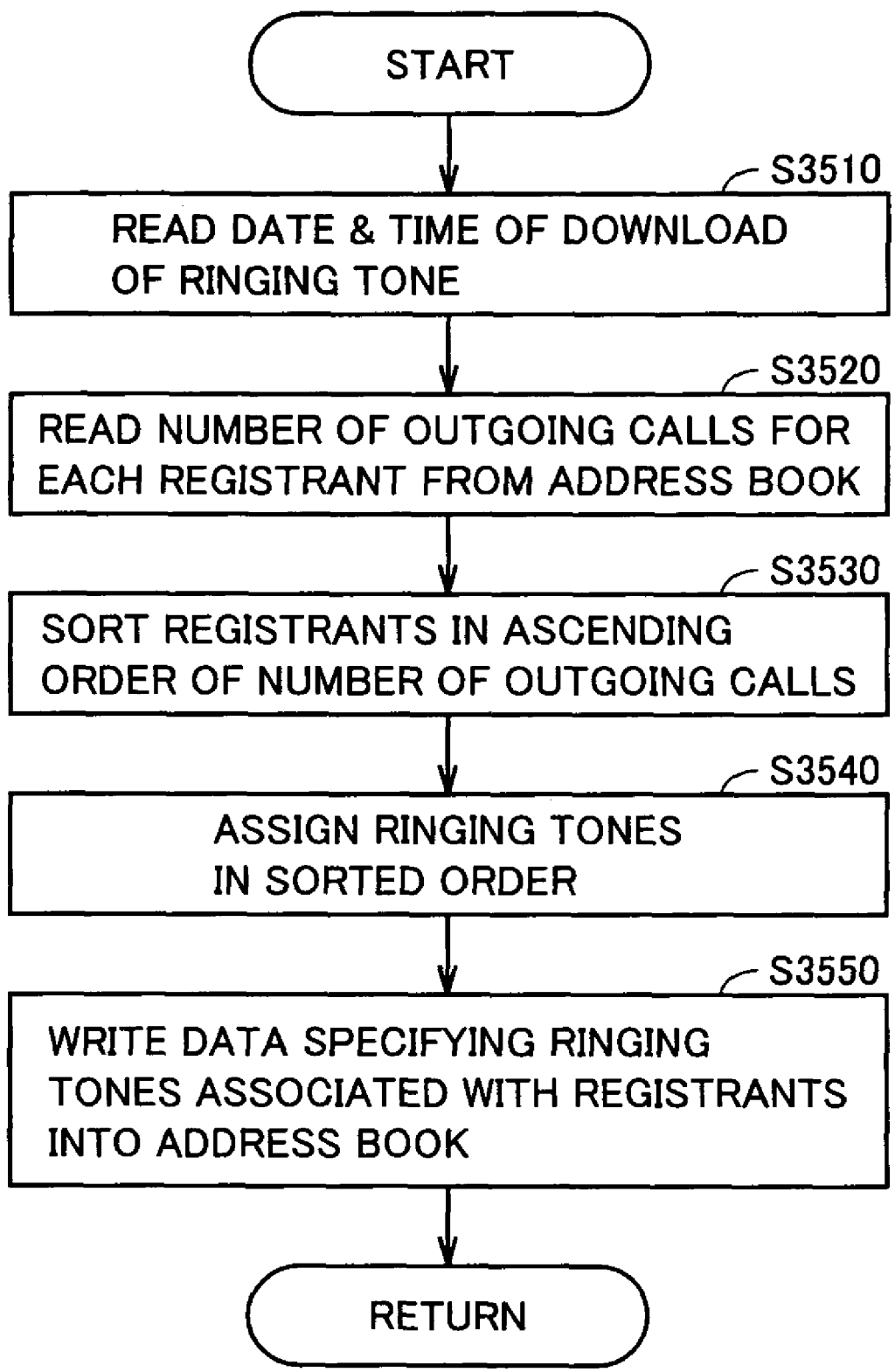
FIG. 35 is a flowchart illustrating a procedure of processing executed by control unit 3310.

Referring to FIG. 35, a control structure of the mobile telephone according to the embodiment will now be described. FIG. 35 is a flowchart illustrating a procedure of the processing executed by control unit 3310.

In step S3510, control unit 3310 reads the date and time of the downloading of the ringing tone from flash memory 940. In step S3550, control unit 3310 reads the number of the incoming and outgoing calls per registrant in the address book. In step S3530, control unit 3310 sorts the registrants constituting the address book in the ascending order of the number of incoming and outgoing calls. More specifically, RAM 950 keeps the registrants in the ascending order. In step S3540, control unit 3310 assigns the ringing tones in the above order, respectively. In step S3550, control unit 3310 writes the data specifying the ringing tones and associated with the registrants in the address book. Thereby, the registrants are associated with the ringing tones according to the number of the incoming and outgoing calls.

According to the mobile telephone of this embodiment, as described above, control unit 3310 automatically sets the ringing tones for the registrants arranged in the descending order of the possibility of ringing. Thereby, the user can associate, by a simple operation, the intended tunes with the registrants who may frequently call the user. Therefore, the user can enjoy such tunes.

Sixth Embodiment

A sixth embodiment of the invention will now be described. The mobile telephone of the sixth embodiment differs from the foregoing embodiments in that the ringing tones can be assigned to the registrants constituting the address book, using the players of the ringing tones as a "key". The mobile telephone according to the sixth embodiment has the same hardware structure as those of the foregoing embodiments, and the functions thereof are the same. Therefore, description thereof is not repeated.

Figure 36:
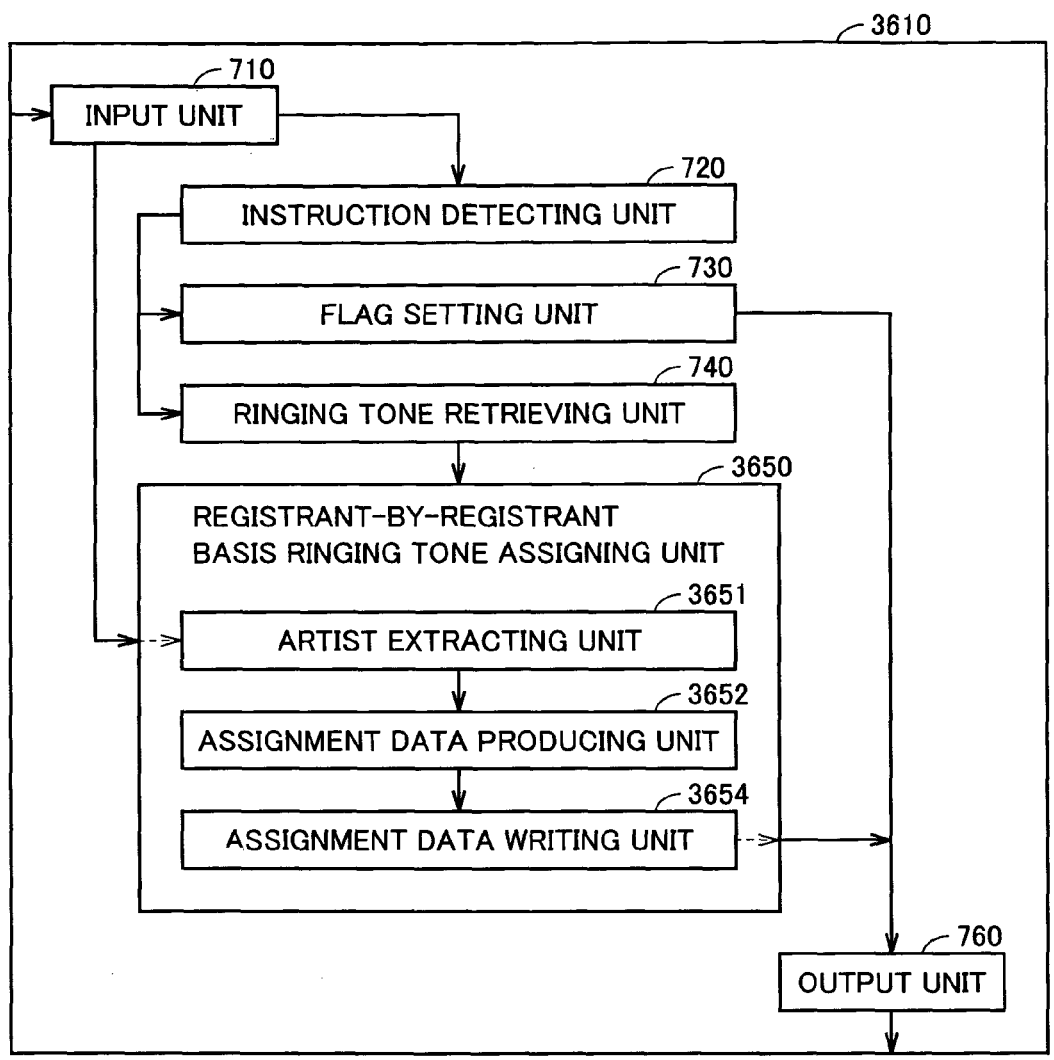
FIG. 36 is a block diagram illustrating a functional structure of a control unit 3610.

Referring to FIG. 36, description will now be given on a control unit 3610 implementing the mobile telephone according to the sixth embodiment. FIG. 36 is a block diagram illustrating a functional structure of control unit 3610. In addition to the structure illustrated in FIG. 7, control unit 3610 includes a registrant-by-registrant basis ringing tone assigning unit 3650 that can associate the ringing tones with the registrants for each player of the ringing tone. Registrant-by-registrant basis ringing tone assigning unit 3650 includes an artist extracting unit 3651 obtaining a player associated with the ringing tone, an assignment data producing unit 3652 that assigns the ringing tone to the registrant based on the ringing tone retrieved by ringing tone retrieving unit 740 and the extracted player, and an assignment data writing unit 3654 storing the data produced by assignment data producing unit 3652 in flash memory 940 in a fashion associated with the respective registrants in the address book.

Referring to FIG. 37, the data structure of the mobile telephone according to the embodiment will now be described. FIG. 37 illustrates a form of the data storage in flash memory 940. Flash memory 940 includes areas 3710-3718 for storing the data associated with the ringing tones.

Area 3710 stores the data for identifying each ringing tone. Area 3712 stores the names for identifying the ringing tones. Area 3714 stores the data files of the ringing tones. Area 3716 stores the artist names representing the players of the ringing tones. Area 3718 stores the flags representing the states of the ringing tones. The data items stored in areas 3710-3718 are associated with each other. Therefore, by designating any one of the items, the ringing tone corresponding to designated item can be specified.

Further, flash memory 940 includes areas 3720-3732 storing the data that are associated with the registrants constituting the address book. Area 3720 stores the data specifying the records in the database of the address book. Area 3722 stores the names of the registrants. For example, areas 3724 and 3726 store the telephone numbers of the registrants. Area 3728 stores the e-mail addresses. Area 3730 stores the artist names assigned to the registrants. This data is externally entered by the user of the mobile telephone.

Area 3732 stores the names of the ringing tones assigned to the respective registrants. Area 3732 is blank or stores "NULL" before the assignment of the ringing tones. The data items illustrated in areas 3720-3728 can be easily understood as a structure of a telephone directory by those skilled in the art, and therefore detailed description is not performed.

Figure 38:
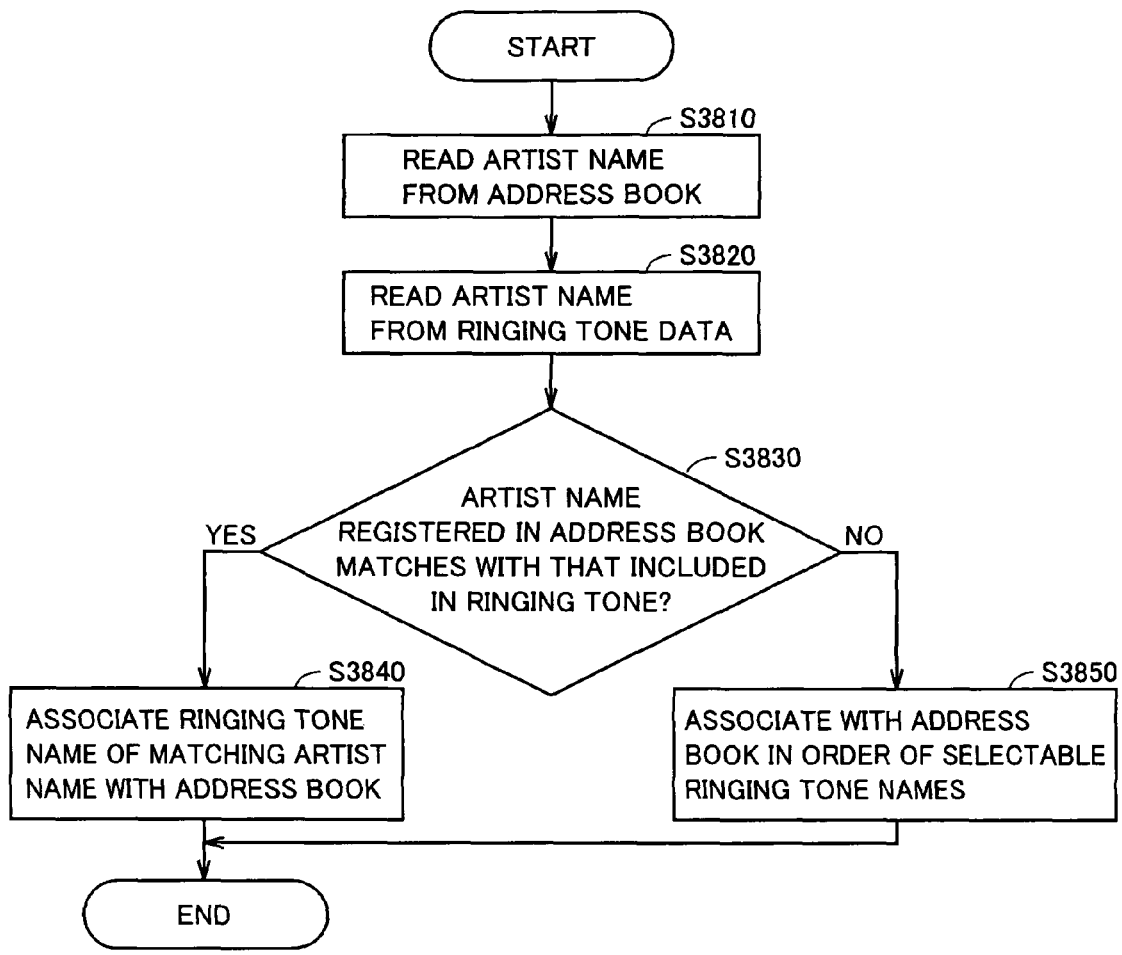
FIG. 38 is a flowchart illustrating a procedure of processing executed by control unit 3610.

Referring to FIG. 38, description will now be given on a control structure of the mobile telephone according to this embodiment. FIG. 38 is a flowchart illustrating a procedure of the processing executed by control unit 3610. This processing is executed when the assignment of the ringing tone to the registrant is instructed.

In step S3810, control unit 3610 reads the artist name (area 3730) from the address book in flash memory 940. In step S3820, control unit 3610 reads the artist name (area 3716) from the database of the ringing tones. In step S3830, control unit 3610 determines whether the name of the artist registered in the address book matches with the name of the artist associated with the ringing tone or not. When the names match with each other (YES in step S3830), the process proceeds to step S3840. Otherwise (NO in step S3830), the process proceeds to step S3860.

In step S3840, control unit 3610 associates the name of the ringing tone of the matching artist with the address book. More specifically, control unit 3610 write the name of the ringing tone in area 3732 of the registrant. In step S3850, control unit 3610 associates the ringing tones with the respective registrants in accordance with the names of the selectable ringing tones. This association is first made, e.g., on the ringing tones that are not yet assigned to the registrants prior to those already assigned. Alternatively, the association is made in the ascending or descending order of the number indicated in area 3710. In this case, the determination whether the assignment is already performed or not can be performed by setting the flags in area 3718. More specifically, the ringing tone that is assigned in step S3840 is changed have the data item that represents the completion of the flag setting in area 3718. Owing to this manner, the unassigned ringing tones are likewise associated with the address book so that such a situation can be prevented that the downloaded ringing tone is not reproduced.

According to the mobile telephone of the embodiment, as described above, control unit 3610 can make the associated of the ringing tones based on the key formed of the artist associated with each registrant by the user. By this association, the user can listen to the tunes of various artists as the ringing tones in connection with each registrant.

When the data of the artist is not annexed to the downloaded ringing tone, this data is not used as the target of the ringing tone assignment in this embodiment. When the "artist" is not set for any one of the registrants in the address book, one of the ringing tones selected as the target of the automatic assignment may be selected as the ringing tone to be associated with the registrant. In this case, the ringing tone, e.g., in the first or last position according to the data record number is selected. In view of the above case, the ringing tone that is preselected by the user may be associated with the registrant that is not yet assigned the ringing tone.

Seventh Embodiment

A seventh embodiment of the invention will now be described. The mobile telephone according to this embodiment differs from the embodiments already described in that the mobile telephone has a function of feeding back the information of the user to the music distribution server. The mobile telephone according to this embodiment has the same hardware structure as those already described, and the functions thereof are also the same. Therefore, description thereof is not repeated.

Figure 39:
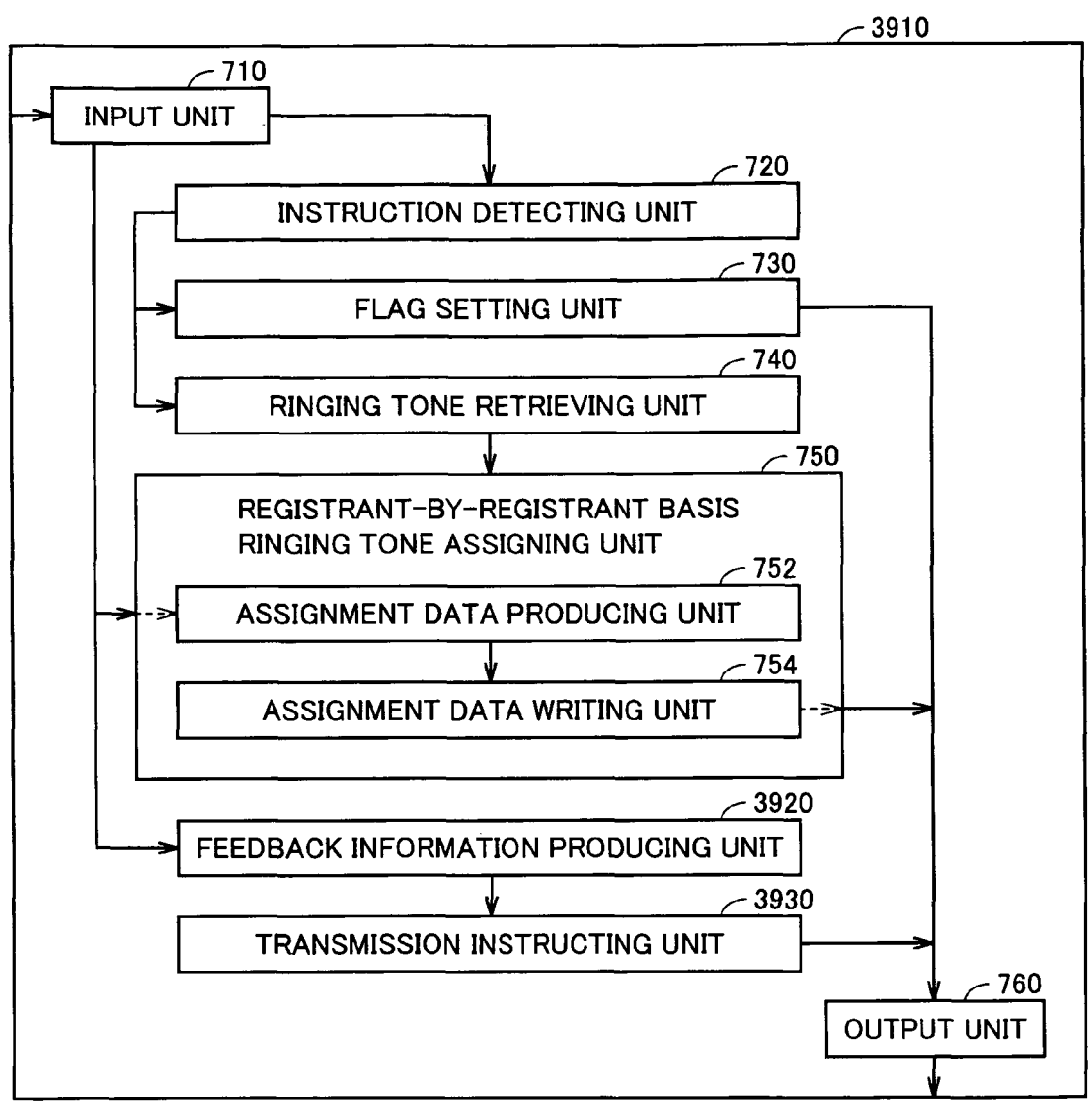
FIG. 39 is a block diagram illustrating a functional structure of a control unit 3910.

Referring to FIG. 39, description will now be given on a control unit 3910 implementing the mobile telephone according to the embodiment. FIG. 39 is a block diagram illustrating a functional structure of control unit 3910. Control unit 3910 includes, in addition to the structures illustrated in FIG. 7, a feedback information producing unit 3920 producing the user information to be transmitted to the music distribution server device, and a transmission instructing unit 3930 that issues an instruction to communication unit 630 to transmit the information produced by feedback information producing unit 3920.

Figure 40:
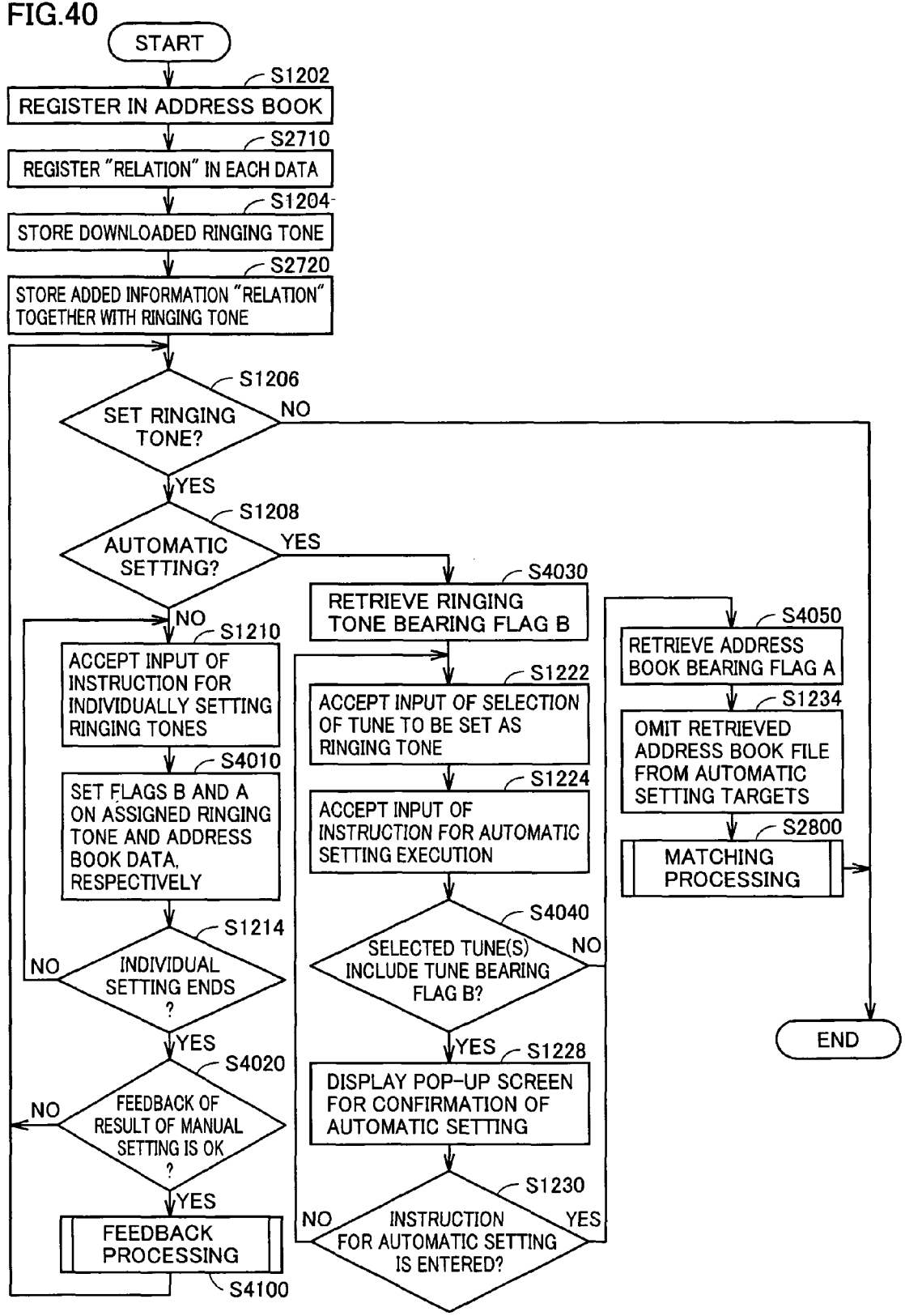
FIG. 40 is a flowchart (1) illustrating a procedure of processing executed by control unit 3910 for transmitting feedback information.
Figure 41:
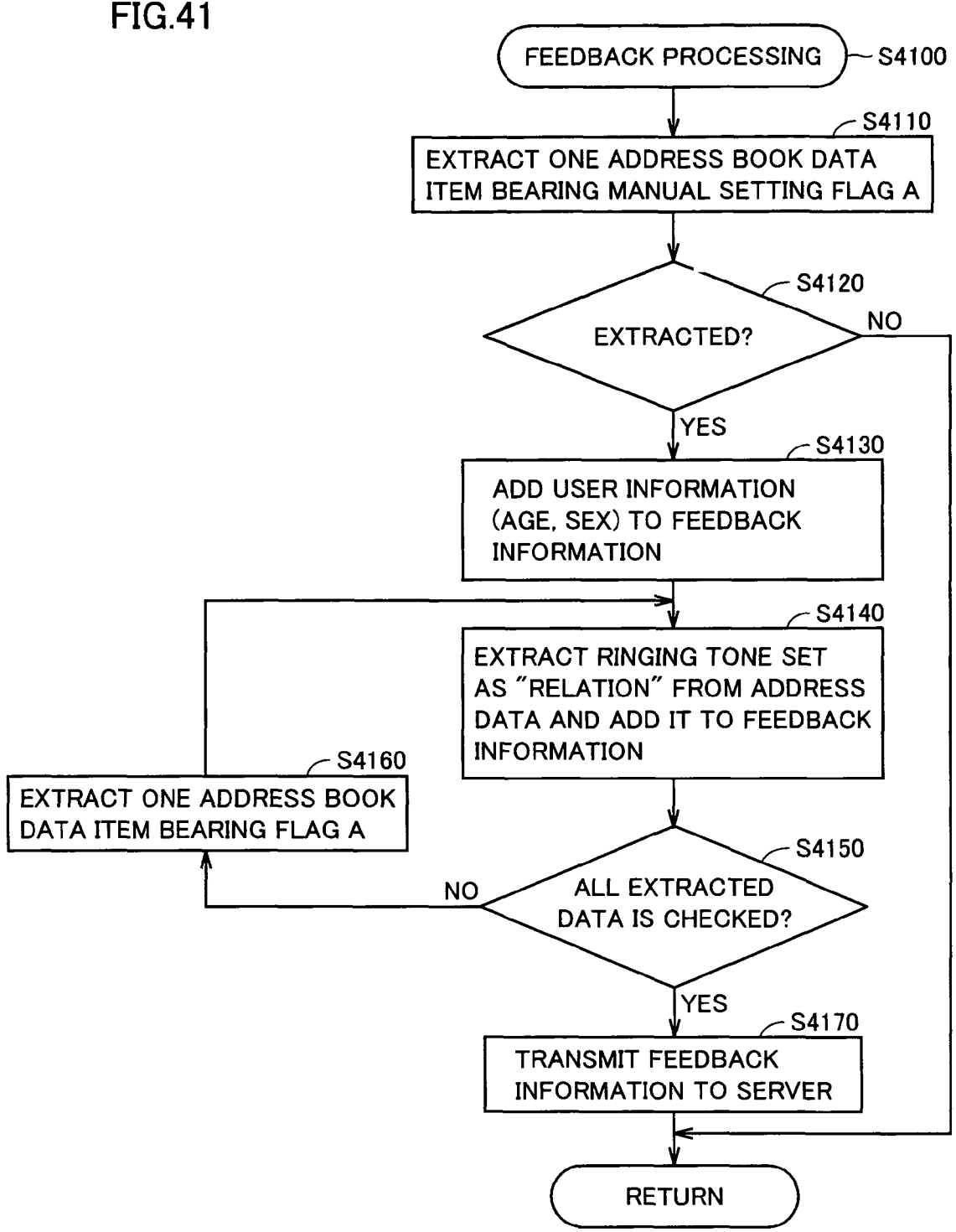
FIG. 41 is a flowchart (2) illustrating the procedure of processing executed by control unit 3910 for transmitting the feedback information.

Referring to FIGS. 40 and 41, description will now be given on a control structure of the mobile telephone according to the embodiment. FIGS. 40 and 41 are flowcharts illustrating procedures of the processing executed for transmitting the feedback information by control unit 3910. The steps of the same processing as those in the embodiments already described bear the same step numbers. Therefore, description thereof is not repeated.

In step S4010, control unit 3910 sets a flag B on the assigned ringing tone, and sets a flag A on the data of the corresponding registrant in the address book. In step S1214, control unit 3910 determines whether individual setting is to be ended or not. When the setting is to be ended (YES in step S1214), the process proceeds to step S4020. Otherwise (NO in step S1214), the process returns to step S1210.

In step S4020, control unit 3910 determines whether "OK" is entered or not, from the feedback of the result of manual setting. When the "OK" is entered (YES in step S4020), the process proceeds to step S4100. Otherwise (NO in step S4020), the process returns to step S1206. In step S4100, control unit 3910 executes the feedback processing to be described later. When this processing is executed, the information of the "relation" associated with the registrant and the ringing tone that are associated by the user of the mobile telephone is transmitted to the server device operated by the information provider that provides the service of distributing the ringing tones over the Internet or other communications lines.

In step S4030, control unit 3910 retrieves the ringing tone bearing flag B. In step S4040, control unit 3910 determines whether the selected tunes include a tune(s) bearing flag B or not. When the flagged ringing tone is present (YES in step S4040), the process proceeds to step S1228. Otherwise (NO in step S4040), the process proceeds to step S4050.

In step S4050, control unit 3910 retrieves the data record from the address book bearing flag A.

Referring to FIG. 41, control unit 3910 operates in step S4110 to extracting one data record from the address book bearing flag A representing that the manual setting was performed. In step S4120, control unit 3910 determines whether the above data can be extracted or not. From this determination, it is possible to determine whether the record bearing the flag A is present or not. When it is determined that the above record could be extracted (YES in step S4120), the process proceeds to step S4130. Otherwise (NO in step S4120), the processing ends, and the processing returns to the main processing.

In step S4130, control unit 3910 adds the user information (age, gender and others) to the feedback information. In step S4140, control unit 3910 extracts the ringing tone that is set as the "relation" from the data included in the address book, and adds it to the feedback information. More specifically, the name of the ringing tone or the identification code predetermined for each ringing tone is added to the feedback information.

In step S4150, control unit 3910 determines whether the feedback information has been produced for all the extracted data records or not. From this determination, control unit 3910 can determine whether the data not handled as the feedback target is present or not. When it is determined that all the data records are checked (YES in step S4150), the process proceeds to step S4170. Otherwise (NO in step S4150), the process proceeds to step S4160.

In step S4160, control unit 3910 extracts one data record in the flagged address book bearing flag A. After this processing, the process returns to step S4140.

In step S4170, control unit 3910 transmits the produced feedback information to the music distribution server device. Thereafter, the process returns to the main processing.

Figure 42:
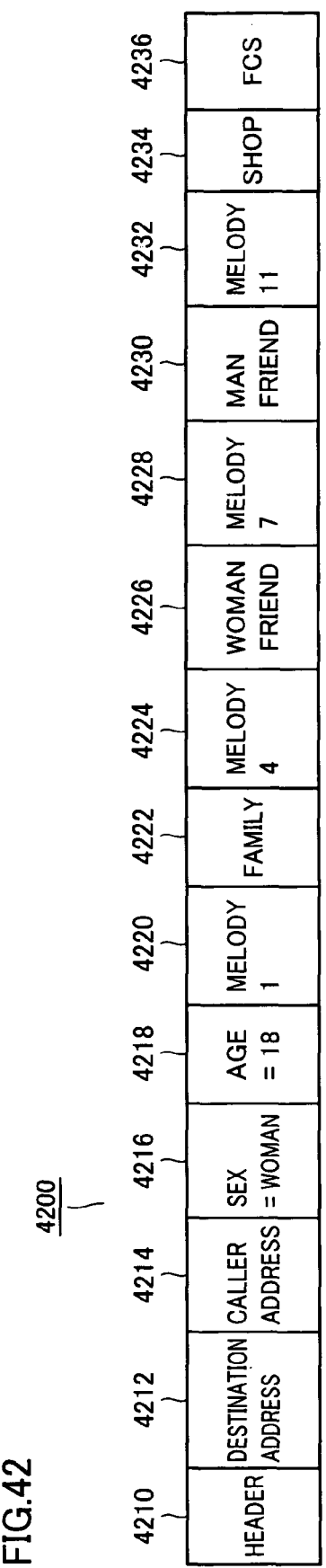
FIG. 42 conceptually illustrates a structure of data 4200.

Referring to FIG. 42, description will now be given on data 4200 that is transmitted from the mobile telephone to the server device. FIG. 42 conceptually illustrates a structure of data 4200. Data 4200 includes areas 4210-4236 storing individual data items. Area 4210 stores a header. Area 4212 stores a destination address (i.e., data for specifying the location of the server device). Area 4214 stores a caller address (i.e., data for specifying the location of the mobile telephone that sends data 4200).

Areas 4216 and 4218 store the attributes of the senders of data 4200. For such attributes, the gender and ages are used. Other information may be used. For example, the user name that is preregistered in the music distribution server device may be included. The user name may be different from a real name and, e.g., a virtual name on the network.

Areas 4220, 4224, 4228 and 4232 store the data for identifying the ringing tones of which relations are individually set by the user. In the example illustrated in FIG. 42, the "relation" is set for the four ringing tones by the user. Areas 4222, 4226, 4230 and 4234 store the data representing the relations set for each ringing tone. In connection with the information about the ringing tone that is to be fed back, when the ringing tone, e.g., set by the user's operation is one in number, the notification is performed for only areas 4220 and 4222. When the user performs the settings about the ringing tone other that those illustrated in FIG. 42, data 4200 includes more items. Area 4236 stores the data representing the ending portion of data 4200, e.g., as FCS (Frame Check Sequence). When the mobile telephone transmits the feedback information to the above server device, the server device takes out the respective items from the transmitted information, and accumulates them as a database.

The structure of the above data is not restricted to that illustrated in FIG. 42. The format for transmitting the data is not particularly restricted. For example, it may be a form of a text file or another form.

The details of the data transmitted from the mobile telephone to the server are not restricted to those illustrated in FIG. 42. For example, a user's place of residence, another district, hobby and/or other items may be transmitted. By transmitting many items as the feedback information from the mobile telephone to the server, the server device can compile the data based on fine units using such items.

The feedback information can be transmitted according to any timing. For example, when the download of the ringing tones is completed, the feedback information may be transmitted in response to the notification of the completion. Alternatively, the feedback information may be accumulated, and may be transmitted in response to the input for the transmission of the feedback information.

Figure 43:
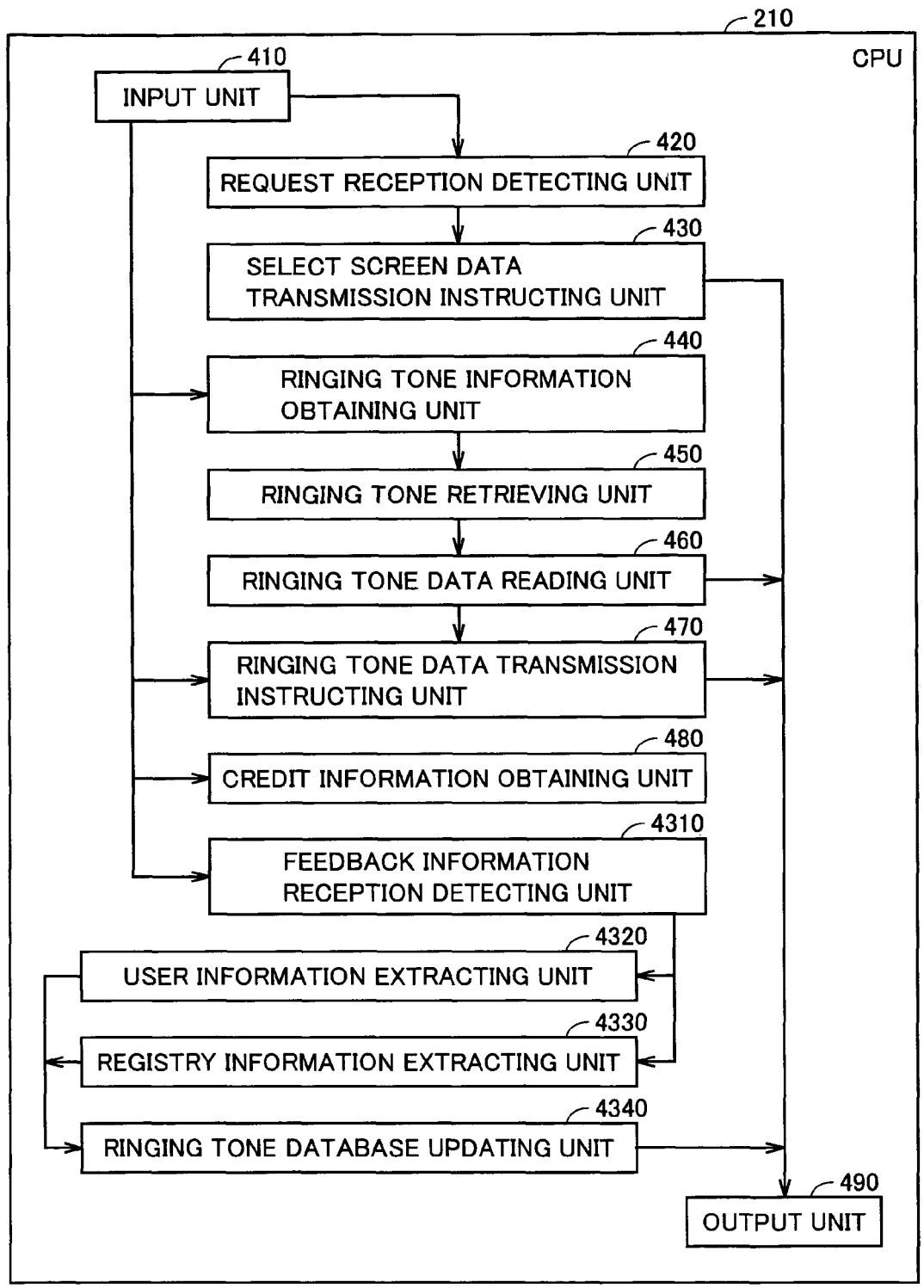
FIG. 43 is a block diagram illustrating structures of functions implemented by CPU 210 of computer system 200 implementing a server in question.

Referring to FIG. 43, the serve according to the embodiment will be described below. FIG. 43 is a block diagram illustrating a structure of the function implemented by CPU 210 of computer system 200 implementing the server.

CPU 210 includes, in addition to the structures illustrated in FIG. 4, a feedback information reception detecting unit 4310 detecting the reception of the feedback information from the user of the mobile telephone based on the information that is externally obtained over network 120, a user information extracting unit 4320 extracting the user information from the feedback information, a registry information extracting unit 4330 extracting the registry information set by the user from the feedback information, and a ringing tone database updating unit 4340 storing the data extracted by user information extracting unit 4320 and registry information extracting unit 4330 in the areas reserved on hard disk 250. When CPU 210 having the above structure receives the feedback information from the mobile telephone, the database of the ringing tones is updated based on the received information.

Figure 44:
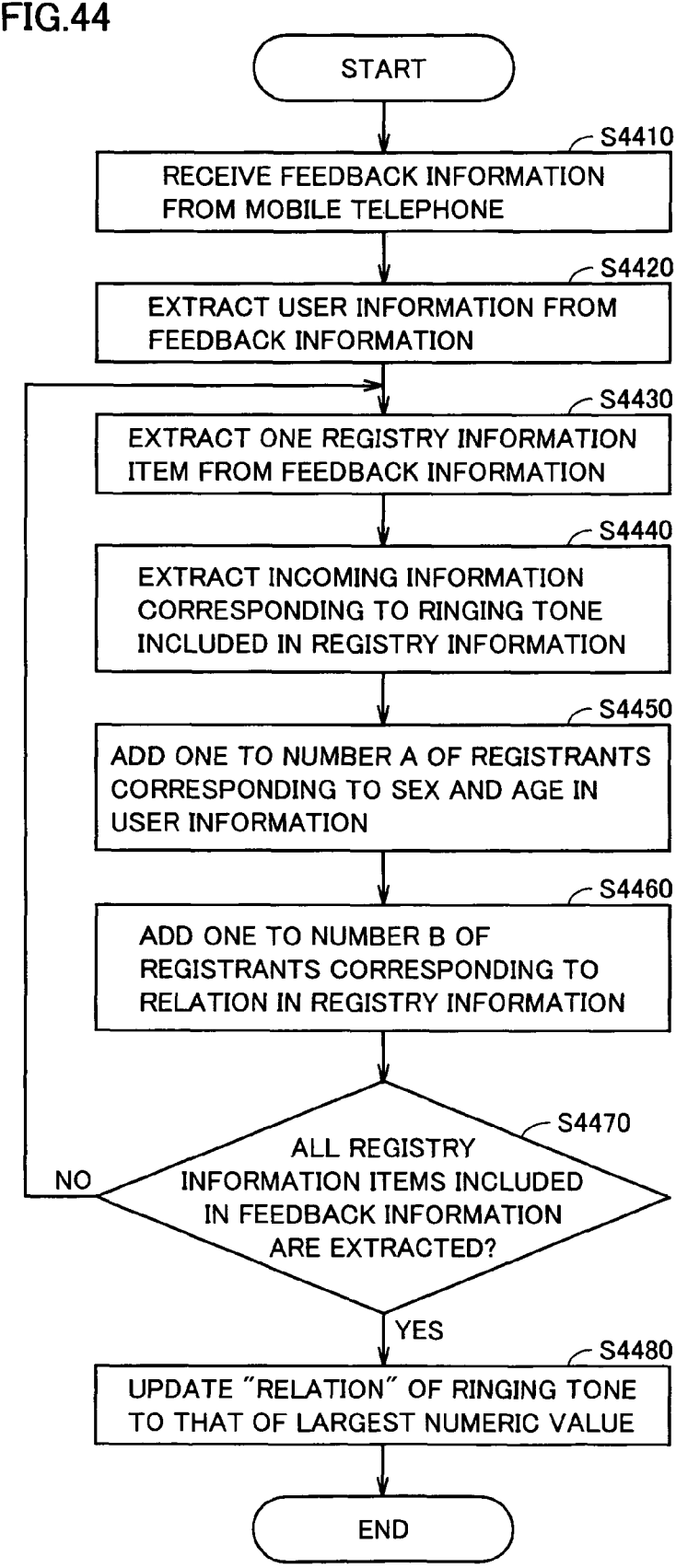
FIG. 44 is a flowchart illustrating a procedure of processing executed by CPU 210.

Referring to FIG. 44, description will now be given on a control structure of the computer system that can update the database of the ringing tones. FIG. 44 is a flowchart illustrating a procedure of the processing executed by CPU 210.

In step S4410, CPU 210 detects the reception of the feedback information from the mobile telephone. The reception of the feedback information is performed by using the data of the format that is determined in advance for CPU 210 and the mobile telephone.

In step S4420, CPU 210 operates as user information extracting unit 4320 and extracts the user information from the feedback information. In step S4430, CPU 210 operates as registry information extracting unit 4330 and extracts one registry information item from the feedback information. In step S4440, CPU 210 extracts the ringing tone information corresponding to the ringing tone and included in the registry information. The extracted information includes the name of the ringing tone, the name of the artist and the "relation" determined by the user of the mobile telephone with respect to the ringing tone.

In step S4450, CPU 210 adds one to a number A of the registrants corresponding to the gender and ages included in the user information. This processing is implemented in an area temporarily kept for this processing in RAM 240. In step S4460, CPU 210 adds one to a number B of the registrants corresponding to the "relation" in the obtained registry information. In step S4470, CPU 210 determines whether all the registry information included in the feedback information is extracted and processed or not. When it is determined that all the information is processed (YES in step S4470), the process proceeds to step S4480. Otherwise (NO in step S4470), the process proceeds to step S4430.

In step S4480, CPU 210 updates the database of the ringing tones included on hard disk 250 and particularly updates the data items related to the ringing tones of about which the feedback information was transmitted. The update may be performed once a day, once a week or the like, and the cycles of update may be longer or shorter than the above.

Figure 45:
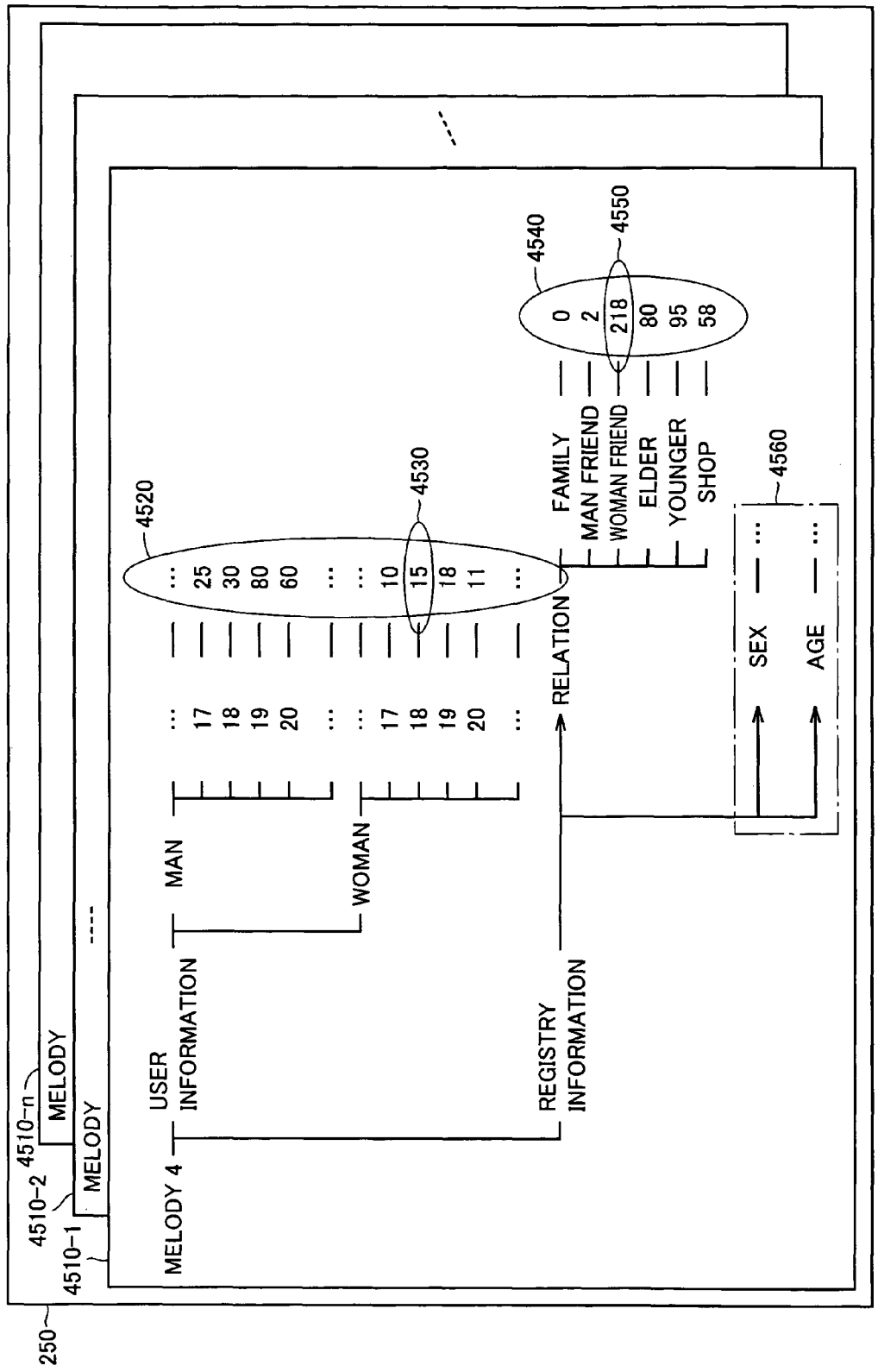
FIG. 45 conceptually illustrates a structure of database about ringing tones on hard disk 250.

Referring to FIG. 45, description will now be given on a data structure of the server having the function of updating the data records of the ringing tones. FIG. 45 conceptually illustrates a structure of the database of the ringing tones on hard disk 250. Hard disk 250 includes, as the database of the ringing tones, tables 4510-1, 4510-2, . . . and 4510-*n* (which may be collectively indicated by "4510" hereinafter) using, e.g., the ringing tone as the key.

For example, in table 4510-1, ringing tone (Melody 4) is associated with the data items "user information" and "registry information". The user information includes "man" and "woman" as an attribute. Each attribute further includes ages as an attribute. For example, as illustrated in FIG. 45, sections corresponding respective ages are present for each gender. For each age, the table stores the number of users to which the melody was distributed. In a data group 4520, each number of the persons is calculated per age, but may be calculated per another age bracket. For example, the data may be compiled based on the certain age brackets of 16 to 20, 21 to 25 and the like.

Referring to FIG. 42 again, the gender of the sender of data 4200 is woman (area 4216), and the age is 18 (area 4218). Therefore, in connection with table 4510-1 of melody 4 in FIG. 45, one is added to the present value "15" of a data item 4530 to update the database, and the value becomes equal to 16.

Further, ringing tone "MELODY 4" includes the attribute "registry information", which includes a sub-attribute "relation". This relation further includes family, man friends, woman friends, elder persons, younger persons and shops as attributes. Referring to FIG. 42 again, the "relation" associate with the melody 4 (area 4220) in data 4200 is a woman friend (area 4226). Therefore, the server device receiving the feedback information in question updates the corresponding data items in table 4510-1 on hard disk 250. More specifically, as can be seen in a data item 4550, the number of current woman friends is 218. When the database is updated after the reception of data 4200 in FIG. 42, this value changes to 219.

Thereby, the server device of the ringing tone provider can calculate the data representing the tendency of download of the ringing tones based on the feedback information. This provider can change the structure of the ringing tones to be distributed based on the calculated data, and therefore can prepare the ringing tones that are likely to be downloaded by more users. Conversely, the provider can determine the deletion of the ringing tones that will be not be downloaded many times from the database. Therefore, the situation of use of the hard disk device and other storage devices can be improved.

Feedback information is not present in connection with the ringing tone that is newly added to the database of the provider for distribution. In this case, the server device retrieves the feedback information for other ringing tone(S) of the same artist as the above, and the average values are calculated from the data items included in them. Thereby, the server device obtains the data (e.g., the number of users and the "relation") representing the tendency of setting of the "relation" of the artist in question. The server device can use the data thus obtained as the feedback information for the newly added tune. In this case, a flag is added to each feedback information item for discrimination between the feedback information thus calculated and the actual feedback information obtained of the user who performed the downloading. Based on this flag, the server device can detect that the predetermined number of actual feedback information items are accumulated. Thereby, the server device can use the actual feedback information instead of the provisional information so that the details of the "relation" can be changed. Accordingly, the server device can distribute the ringing tones bearing the more appropriate "relation".

Eighth Embodiment

An eighth embodiment of the invention will now be described. The server device according to the embodiment that can distribute the ringing tones is different from those of the foregoing embodiments in that the server device has a function of providing ringing tone information corresponding to each user based on the feedback information received from each user.

Figure 46:
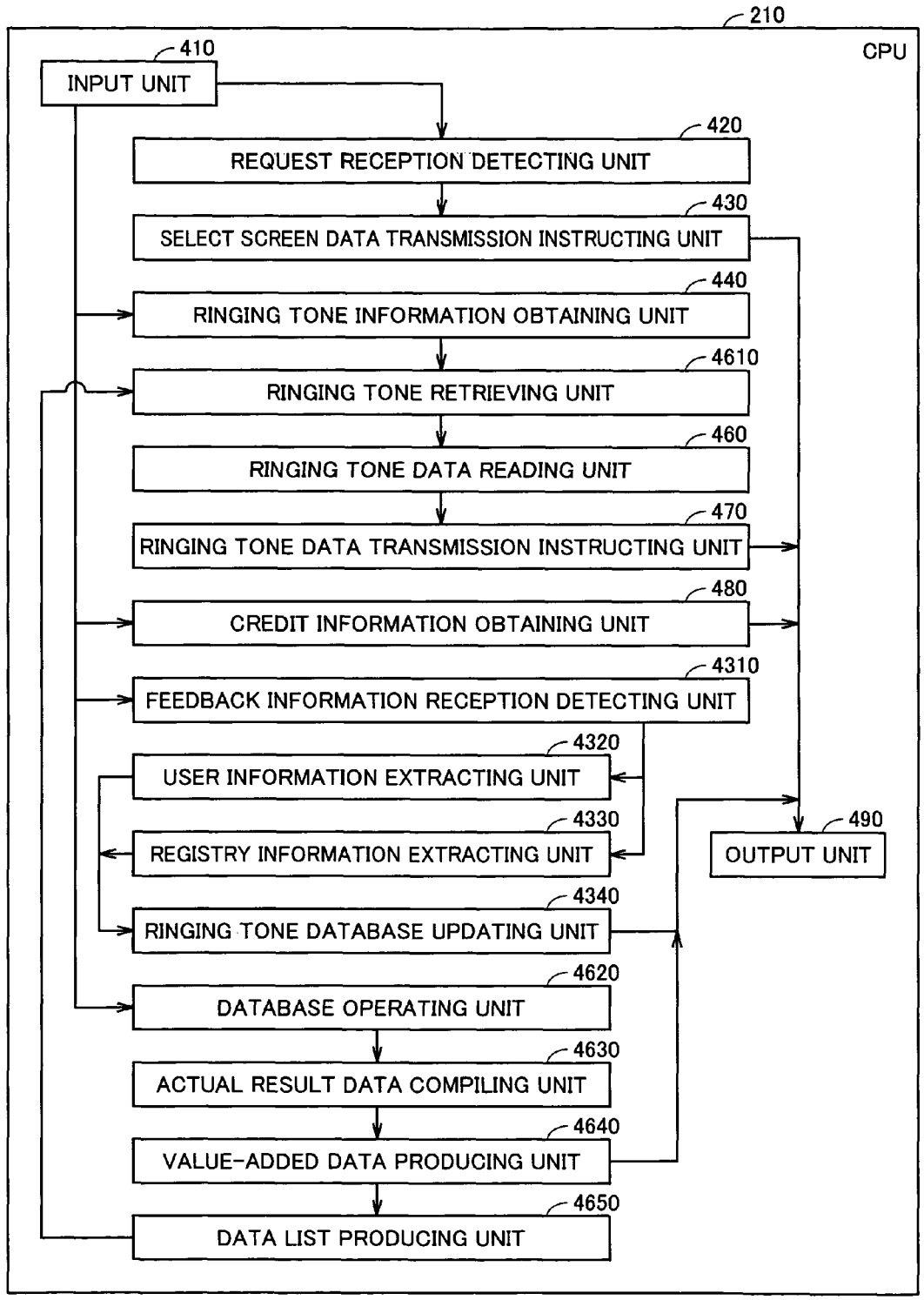
FIG. 46 is a block diagram illustrating structures of functions implemented by CPU 210.

Referring to FIG. 46, description will now be given on CPU 210 implementing the server according to the embodiment. FIG. 46 is a block diagram illustrating a functional structure of CPU 210. CPU 210 includes, in addition to the structures illustrated in FIG. 43, a database operating unit 4620 that operates the database stored on hard disk 250, an actual result data compiling unit 4630 compiling the distribution situations of the ringing tones based on the data extracted by database operating unit 4620, a value-added data producing unit 4640 extracting specific data items according to an extraction criterion that is preset based on the data complied by actual result data compiling unit 4630, a data list producing unit 4650 producing a list of the ringing tones for distributing the plurality of ringing tones based on the data produced by value-added data producing unit 4640, and a ringing tone retrieving unit 4610 retrieving the plurality of ringing tones based on the data produced by data list producing unit 4650.

Figure 47:
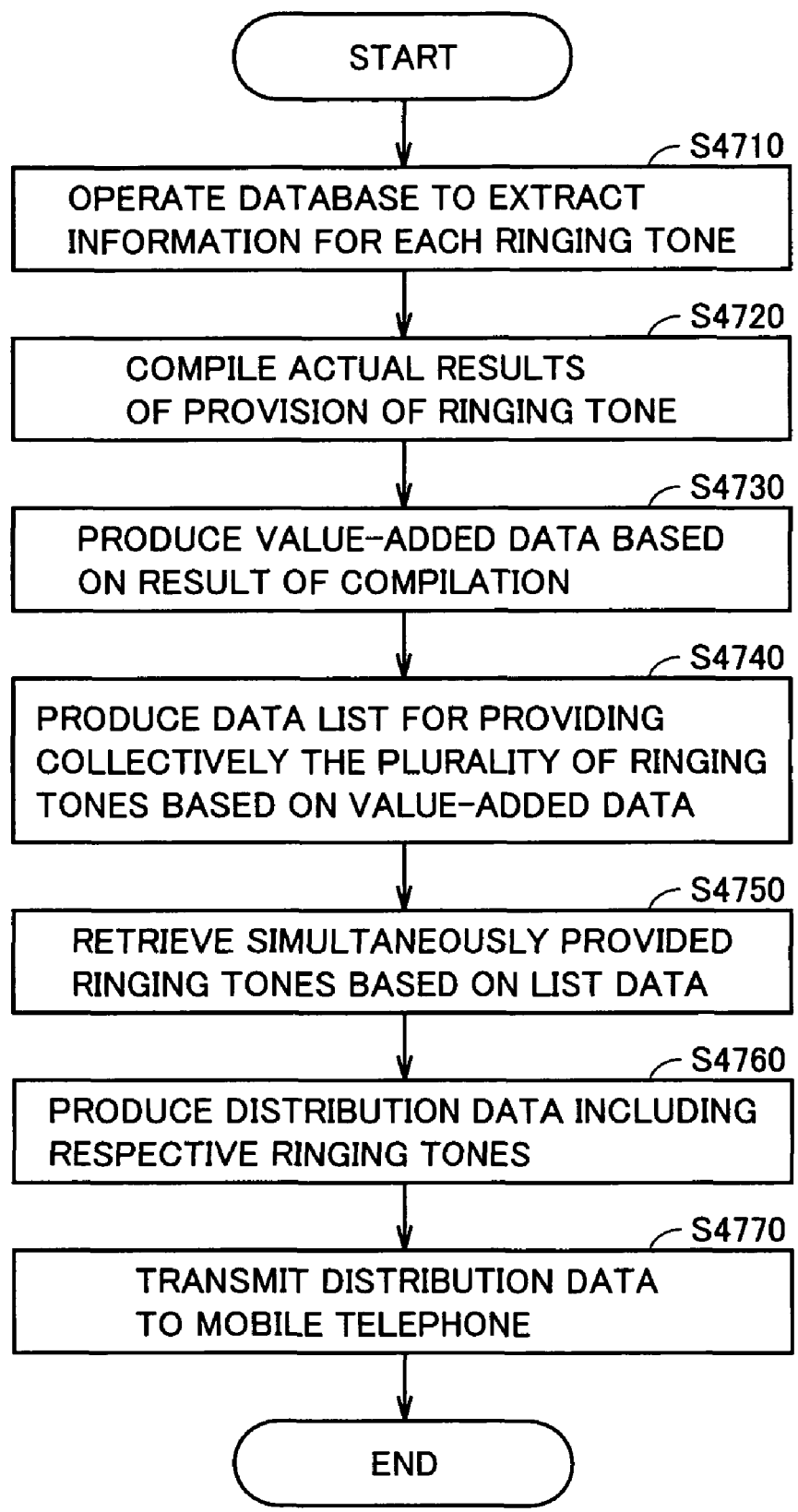
FIG. 47 is a flowchart illustrating a procedure of processing executed by CPU 210 implementing a server device.

Referring to FIG. 47, a control structure of the server according to the embodiment will now be described. FIG. 47 is a flowchart illustrating a procedure of the processing executed by CPU 210 implementing the server. This processing is executed at every preset time or when the server receives an instruction for compilation using the database.

In step S4710, CPU 210 of the server operates the database stored on hard disk 250, and extracts the information for each ringing tone. In step S4720, CPU 210 compiles the actual results of provision of each ringing tone. In step S4730, CPU 210 operates as value-added data producing unit 4640 and produces value-added data based on the result of the compilation. In step S4740, CPU 210 produces the data list for providing collectively the plurality of ringing tones, using this value-added data. This data list includes, e.g., the names of the ringing tones that can be collectively distributed, messages for notifying the users of the fact that the collective provision is preferably, and the like.

In step S4750, CPU 210 retrieves, from the database on hard disk 250, each of ringing tones that are simultaneously provided. In step S4760, CPU 210 produces the distribution data including respective ringing tones. In step S4770, CPU 210 transmits the distribution data thus produced to the mobile telephone.

When the mobile telephone receives the above distribution data, main display 912 displays a list of the ringing tones that can be collectively downloaded. When the user of the mobile telephone performs the operation requesting the collective downloading thereafter, CPU 210 successively transmits the sound files of the ringing tones included in each list in response to the reception of the signal corresponding to the user's operation. The user of the mobile telephone can collectively download the plurality of ringing tones by performing the operation only once for receiving the ringing tones. Thereby, the assignment of the ringing tones according to the specific theme can be implemented more easily.

Ninth Embodiment

The mobile telephone according to a ninth embodiment differs from the foregoing embodiments in that the mobile telephone has a function of correcting the "relation" in the third embodiment.

More specifically, the mobile telephone displays a list of the sound files of the ringing tones on the screen. The mobile telephone displays screen contents for accepting an editing operation performed by the user for changing the "relation". When the user selects a specific ringing tone, and performs the entry for changing the displayed contents of the "relation", the entered "relation" is associated with the ringing tone. Thereby, the user can assign the intended "relation" to the ringing tone. Further, the user can form a more convenient address book.

Tenth Embodiment

In the embodiments already described, the ringing tone is assigned to the "telephone number". However, it may be automatically assigned to another target in the invention. For example, such a configuration may be employed that the ringing tone is assigned in response to reception of an e-mail. This can be implemented by setting the e-mail address as the assignment target in a program implementing various kinds of processing.

Alternatively, both the telephone number and the e-mail address may be selected as the assignment targets.

Eleventh Embodiment

According to the ninth embodiment already described, the assigned ringing tone may not be suitable for an e-mail reception tone. For example, such ringing tones are long tunes or have long introductions. Therefore, such a configuration may be employed that the user can set the ringing tone as a telephone ringing tone and/or as an e-mail ringing tone independently of each other.

For example, determination processing such as "Set as telephone ringing tone?" may be added between steps S1206 and S1208 in FIG. 12. When the processing is executed, the mobile telephone displays the screen contents to that effect.

Thereby, the user can select, as the ringing tone which the user intends to assign to the e-mail reception, the ringing tone different from the ringing which the user intends to assign to the telephone number, although the operations for these selected ringing tones are the same.

Twelfth Embodiment

This embodiment differs from the foregoing embodiments in that the server device operated by the information provider providing the ringing tones has assigned in advance the data items other than the "relation" to the ringing tones. These other items include data (which will be referred to as "setting-target data" hereinafter) representing, e.g., whether the assignment target of the ringing tone for distribution is a "telephone number" or an "e-mail address".

When the mobile telephone receives the ringing tone bearing the above items, the control unit executing the assignment processing associates the ringing tone with the registrant in the address book with reference to the setting-target data. Thereby, the mobile telephone can automatically associate the ringing tone selectively with the telephone number and the e-mail address so that the user of the mobile telephone is not required to perform the operation of selecting the setting-target, and the association can be made more easily.

Thirteenth Embodiment

The processing of each of the embodiments already described may be implemented solely or in combination with the processing of the other(s). The combination of the plurality of kinds of processing can easily implement the accurate assignment according to the taste of the mobile telephone user.

For example, the function in the third embodiment may be combined with the function in the sixth embodiment. Thereby, when a boy friend likes a certain artist, the tune of which "relation" is "boy friend" can be selected from among the tunes of the above artist, and can be assigned as the ringing tone to the above boy friend.

Fourteenth Embodiment

The embodiments that have been described relate to the setting of the ringing tones. The technical ideas according to the invention, however, can be applied to data or the like other than sound data such as a ringing tone. For example, it can be applied to image data such as an incoming call image. The incoming call image is a still image or a movie that is displayed on main display 912 or sub-display 914 in response to a telephone incoming call or an e-mail reception (these may be collectively referred to as the "incoming call" hereinafter).

More specifically, an image data file is associated with a registrant constituting an address book, instead of a ringing tone that is an audio data file. Thereby, the mobile telephone can display the corresponding image on main display 912 or sub-display 914 in response to the incoming call.

Fifteenth Embodiment

The invention can be applied not only to the mobile telephone but also to stationary telephones having a storage device storing data for communications such as an address book as well as a control unit such as a CPU executing the foregoing kinds of processing, and can also be applied to information communication terminals such as a PHS.

Sixteenth Embodiment

In a sixteenth embodiment, a "flag B" can be added to the ringing tone for indicating that this ringing tone is selected by manual setting. The flag is managed, e.g., using an index, but discrimination between ringing tones can be performed in another manner.

For example, when special restrictions are not imposed on the ringing tone and, e.g., addition of attribute information is allowed, data representing contents indicated by flag B may be added, as the attribute information, to the ringing tone.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. An information communication terminal comprising:
a receiving unit configured to receive a signal including a communication data or a contents data, the contents data being associated with a first assignment data for assigning the contents data to a communication other-end party beforehand, the first assignment data being one of a first group of data predefined as the contents data's attribute;
a memory, said memory storing multiple kinds of contents data obtained from the signal received by said receiving unit, the first assignment data associated with each of the contents data, an identification data for identifying each of the plurality of communication other-end parties, and a second assignment data for assigning a contents data a communication other-end party, said identification data and said second assignment data being associated, said second assignment data being one of a second group of data predefined as the communication other-end party's attribute, the first group of data and the second group of data including the same data; and
a controller configured to assign said contents data to the communication other-end party based on the first assignment data associated with the contents data and the second assignment data associated with the identification data.

2. The information communication terminal according to claim 1, wherein said controller is configured to assign the contents data to the communication other-end party when the associated first assignment data and the second assignment data are the same.

3. The information communication terminal according to claim 1, wherein
a genre for classifying items is associated with said contents data and said communication other-end party, and
said controller is configured to assign said contents data to said communication other-end party based on said genre.

4. The information communication terminal according to claim 1, wherein said controller is configured to assign said contents data to said communication other-end party based on a history of communications between said communication other-end party and said information communication terminal.

5. The information communication terminal according to claim 1, wherein said controller is configured to set, in the assigned contents data, a flag representing the fact that the contents data is already assigned to the communication other-end party.

6. The information communication terminal according to claim 1, further comprising an operation unit configured to accept an operation for associating the contents data with the communication other-end party, wherein
said controller is configured to produce, based on said operation, data representing the fact that said contents data is associated with said communication other-end party, and configured to associate the data produced by said producing unit with said contents data.

7. The information communication terminal according to claim 1, wherein said controller is configured to associate said identification data with said contents data based on a random number data.

8. The information communication terminal according to claim 1, wherein said controller is configured to associate said contents data with said communication other-end party according to an arrangement defined based on each of said plurality of identification data items and an arrangement defined based on each of said plurality of contents data items.

9. The information communication terminal according to claim 1, wherein said controller is configured to associate said contents data with said communication other-end party when said controller detects an update of data in said information communication terminal.

10. The information communication terminal according to claim 1, wherein said controller is configured to assign said contents data to said communication other-end party when said controller detects that elapse of a predetermined period.

11. The information communication terminal according to claim 1, wherein, in response to the detection of an incoming call, said controller is configured to assign said contents data to said communication other-end party.

12. The information communication terminal according to claim 1, further comprising an output unit configured to perform an output operation based on said contents data.

13. The information communication terminal according to claim 1, wherein said controller is configured to change all of said contents data stored in said memory.

14. The information communication terminal according to claim 1, wherein said controller is configured to select said plurality of contents data items stored in said memory and changes the selected contents data items collectively and simultaneously.

15. A content distributing device for transmitting a content to the information communication terminal according to claim 1, comprising:
a communication unit configured to communicate with each of a plurality of information communication terminals, said communication unit receiving information from each information communication terminal;
a storing unit configured to store a plurality of distribution data items for distribution, and a database including attribute data associated with each of said distribution data items, said attribute data being associated with information for identifying an other-end party of the communications performed by said information communication terminal; and
a controller configured to control the content distributing device; said controller being configured to detect a request for distribution of the distribution data stored in said storing unit based on the information received by said communication unit, said request including sender information for specifying the information communication terminal requesting said distribution, wherein
said communication unit is configured to transmit said distribution-requested distribution data to the information communication terminal specified by said sender information,
said controller is configured to detect reception of feedback information transmitted from each of said information communication terminals based on the information received by said communication unit, said feedback information including attribute data associated with the distribution data stored in the information communication terminal having sent said request, and
said controller is configured to update said database based on said attribute data included in said feedback information.

16. A method for communicating information, comprising the steps of:
receiving a signal including a communication data or a contents data, the contents data being associated a first assignment data for assigning the contents data to a communication other-end party beforehand, the first assignment data being one of a first group of data predefined as the contents data's attribute;
loading multiple kinds of contents data obtained from the signal received, the first assignment data associated to each of the contents data, an identification data for identifying each of the plurality of communication other-end parties, and a second assignment data for assigning a contents data a communication other-end party, said identification data and said second assignment data being associated, said second assignment data being one of a second group of data predefined as the communication other-end party's attribute, the first group of data and the second group of data including the same data; and
assigning said contents data to the communication other-end party based on the first assignment data associated with the contents data and the second assignment data associated with the identification data.

17. The method according to claim 16, wherein the step of assigning includes the step of assigning the contents data to the other-end party when the associated first assignment data and the second assignment data are the same.

18. The method according to claim 16, wherein
a genre for classifying items is associated with said contents data and said communication other-end party, and
the step of assigning includes the step of said contents data to communication other-end party based on said genre.

19. The method according to claim 16, wherein the step of assigning includes the step of assigning said contents data to said communication other-end party based on a history of communications between said communication other-end party and said information communication terminal.

20. The method according to claim 16, wherein the step of assigning includes the step of setting, in the assigned contents data, a flag representing the fact that the contents data is already assigned to the communication other-end party.

* * * * *